(12) United States Patent
Cardente

(10) Patent No.: US 6,594,733 B1
(45) Date of Patent: Jul. 15, 2003

(54) CACHE BASED VECTOR COHERENCY METHODS AND MECHANISMS FOR TRACKING AND MANAGING DATA USE IN A MULTIPROCESSOR SYSTEM

(76) Inventor: John T. Cardente, 58 Whitewood Rd., Milford, MA (US) 01757

( * ) Notice: Subject to any disclaimer, the term of this patent is extended or adjusted under 35 U.S.C. 154(b) by 388 days.

(21) Appl. No.: 09/671,078

(22) Filed: Sep. 27, 2000

(51) Int. Cl.[7] .............................................. G06F 12/08
(52) U.S. Cl. ........................ 711/145; 711/144; 711/141
(58) Field of Search ................................ 711/141, 144, 711/145, 118

(56) References Cited

U.S. PATENT DOCUMENTS 6,457,100 B1 * 9/2002 Ignatowski et al. ......... 711/119

* cited by examiner

Primary Examiner—Reginald G. Bragdon
Assistant Examiner—Paul Baker
(74) Attorney, Agent, or Firm—Davis & Bujold, P.L.L.C.

(57) ABSTRACT

A shared line coherency method and mechanism for maintaining coherency of shared lines of information. Each line will have a single home node and may have a plurality of leaf nodes and a single owner node. The owner node is the first node to access the line or the last node to modify the line and tracks all leaf nodes. All requests to a line are directed to the home node of the line, which provides a copy of the line to the requesting node and forwards the request to the owner node for completion. Each node maintains a line tag for each line resident in the node and a line tag includes a line state value and an identifier of a current node to which the node is to direct communications relevant to the line. A distributed prepention queue mechanism orders concurrently pending requests for access to a line and includes the home node of the line with the queue is distributed across all nodes having a pending request to the line with each node in the queue spinning requests against the preceding node until each preceding request is completed. Communication among nodes regarding requests are through a packet communication mechanism providing request packets, response packets and forwarded request packets.

48 Claims, 31 Drawing Sheets

| STATE | DESCRIPTION |
|---|---|
| MS_HOME | ONLY THE HOME NODE HAS ACCESS TO THE LINE AND IT THEREFORE HAS READ-WRITE PRIVILEDGES TO IT. |
| MS_FRESH | A NON-HOME NODE HAS A READ-SHARED ONLY COPY OF THE LINE ENCACHED. AS A RESULT THE HOME NODE ALSO HAS A READ-ONLY COPY OF THE DATA. |
| MS_GONE | A NON-HOME NODE HAS A MODIFIED COPY OF THE LINE ENCACHED. THE HOME NODE DOES NOT HAVE ANY ACCESS TO THE LINE. IN ADDITION, THE LINE MAY BE READ-SHARED BY MULTIPLE NON-HOME NODES. |

FIG.2B

30SHA — MS_HOME
30SHB — MS_FRESH
30SHC — MS_GONE

| STATE | DESCRIPTION |
|---|---|
| CS_COWNER | ALL SHARING NODES (HOME-OWNER-LEAFS) HAVE A READ-ONLY COPY OF THE LINE. |
| CS_DOWNER | DATA HAS BEEN MODIFIED AND THE LINE'S HOME NODE DOES NOT HAVE A COPY OF THE LINE. IF ANY BITS ARE SET IN THE OWNER'S DIRECTORY THEN ALL NODES HAVE A READ-SHARED COPY OF THE LINE. IF NO BITS ARE SET IN THE DIRECTORY THE OWNER HAS WRITE ACCESS TO THE LINE. FINALLY, IT IS THE RESPONSIBILITY OF THE LAST NODE WITH A COPY OF THE LINE TO WRITE BACK A COPY OF THE DATA TO THE HOME NODE WHEN ITS CACHE ENTRY IS EVICTED. |

FIG.2C

30SOA — CS_COWNER
30SOB — CS_DOWNER

| | FIELD | REQUIRED/OPTIONAL | DESCRIPTION |
|---|---|---|---|
| 38A | TARGET CBV NODE ID | REQUIRED | CONTAINS THE CBV NODE ID OF THE NODE TO WHICH THE REQUEST IS BEING SENT |
| 38B | SOURCE CBV NODE ID | REQUIRED | CBV NODE ID OF THE NODE THAT SENT THE REQUEST PACKET |
| 38C | RQID | REQUIRED | CBV NODE ID OF THE NODE FROM WHICH THIS REQUEST ORIGINATED FROM. |
| 38D | TRANS_ID | REQUIRED | TRANSACTION ACTION ID USED BY THE ORIGINAL REQUESTING NODE (RQID) TO MATCH RESPONSES AGAINST. |
| 38E | TARGET ADDRESS | REQUIRED | TARGET ADDRESS OF REQUEST |
| 38F | COMMAND | REQUIRED | HIGH LEVEL COMMAND TYPE |
| 38G | QUALIFIER | REQUIRED | QUALIFIER FOR COMMAND REPRESENTING SPECIFIC ACTION BEING REQUESTED |
| 38H | DIRECTORY | OPTIONAL | BIT MASK ENCODING OF CURRENT NODES THOUGHT TO HAVE A CACHE COPY THE ASSOCIATED LINE |
| 38I | NEWID | OPTIONAL | CBV ID OF A NODE PROVIDED TO THE TARGET NODE FOR POINTER MAINTENANCE PURPOSES. |
| | VI | OPTIONAL | VERSION (FORWARDED REQUEST) |

FIG.3A

| FIELD | REQUIRED/OPTIONAL | DESCRIPTION |
|---|---|---|
| TARGET CBV NODE ID | REQUIRED | CONTAINS THE CBV NODE ID OF THE NODE TO WHICH THE REQUEST IS BEING SENT |
| SOURCE CBV NODE ID | REQUIRED | CBV NODE ID OF THE NODE THAT SENT THE REQUEST PACKET |
| TRANS_ID | REQUIRED | TRANSACTION ACTION ID USED BY THE ORIGINAL REQUESTING NODE (RQID) TO MATCH RESPONSES AGAINST. |
| COMMAND | REQUIRED | HIGH LEVEL COMMAND TYPE |
| QUALIFIER | REQUIRED | QUALIFIER FOR COMMAND REPRESENTING SPECIFIC ACTION BEING REQUESTED |
| DIRECTORY/POINTER | OPTIONAL | BIT MASK ENCODING OF CURRENT NODES THOUGHT TO HAVE A CACHE COPY THE ASSOCIATED LINE |
| RTYID | OPTIONAL | IDENTIFIER OF TARGET NODE FOR RETRY REQUEST |

40A — TARGET CBV NODE ID
40B — SOURCE CBV NODE ID
40C — TRANS_ID
40D — COMMAND
40E — QUALIFIER
40F — DIRECTORY/POINTER
40G — RTYID

_FIG.3B_

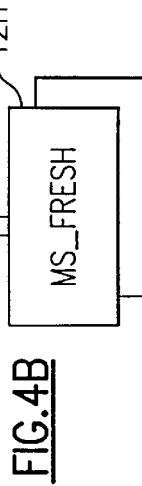

_FIG.4B_

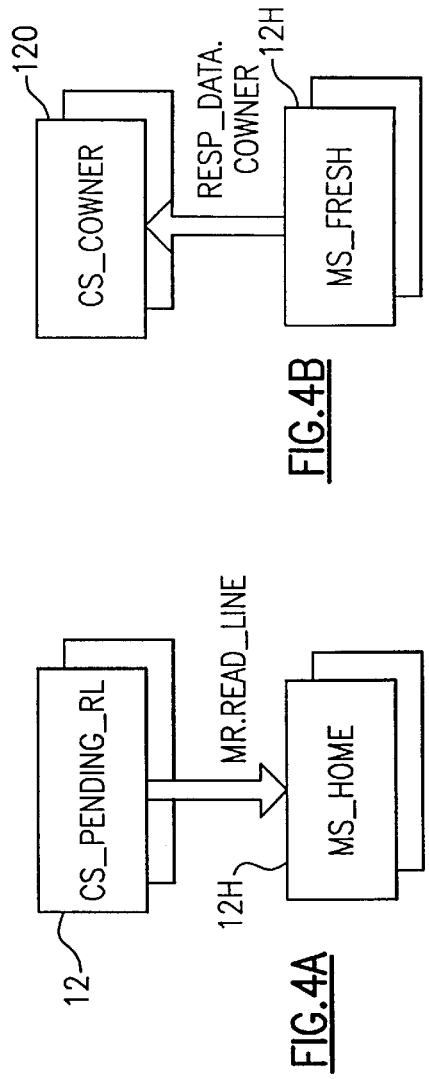

_FIG.4A_

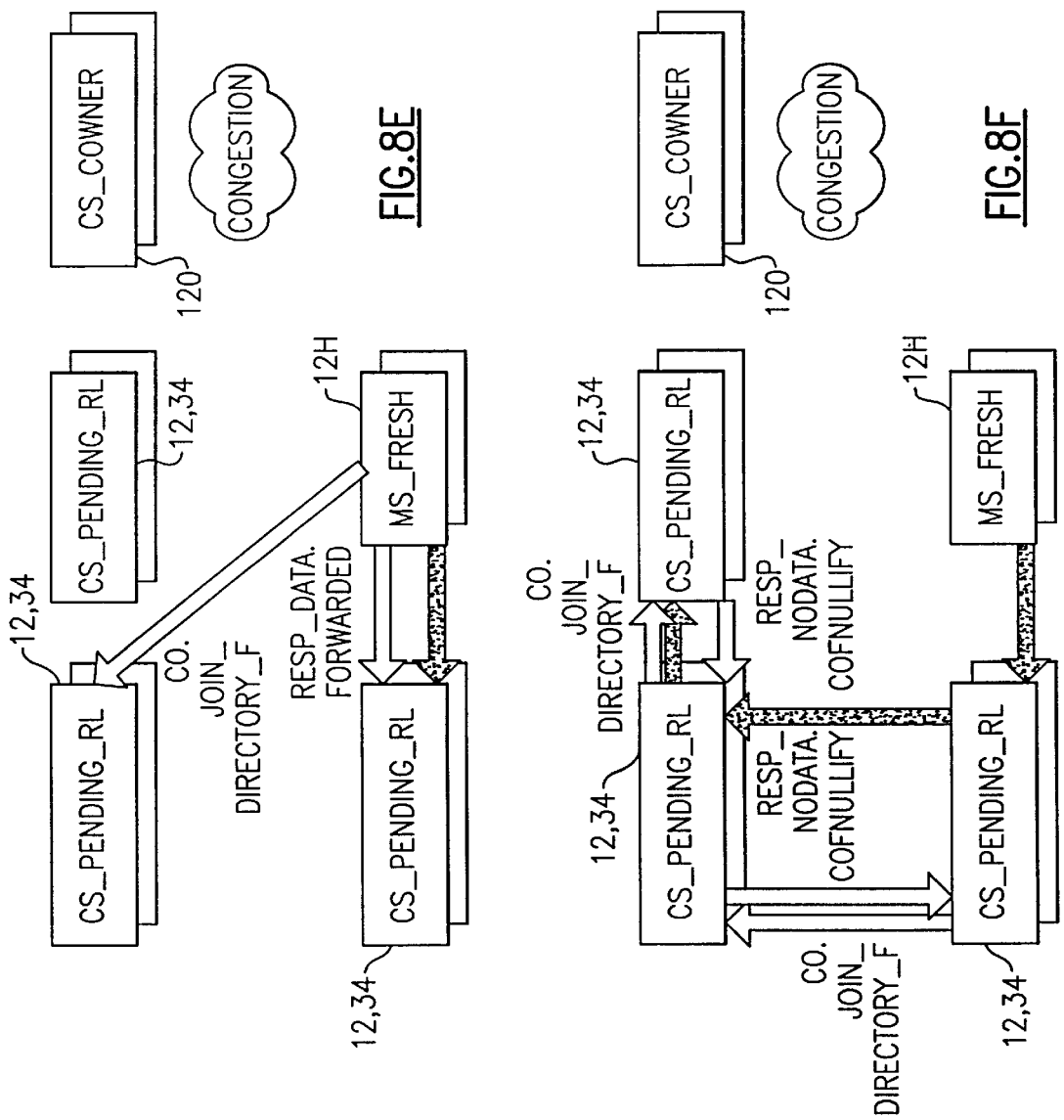

CACHE BASED VECTOR COHERENCY METHODS AND MECHANISMS FOR TRACKING AND MANAGING DATA USE IN A MULTIPROCESSOR SYSTEM

FIELD OF THE INVENTION

The present invention is related to a method and mechanism for tracking and managing cached data in a multiprocessor system and, in particular, to a cache based vector coherency method and mechanism for tracking and managing data use in a multiprocessor system.

BACKGROUND OF THE INVENTION

Present computer systems are commonly configured and function as shared multiprocessor node systems comprised of a plurality of processor nodes communicating through an interconnection structure, such as a wide or local area network or bus. Each processor node may typically be comprised of one or more processors, an input/output sub-system and a memory sub-system providing a node memory space which functionally includes both dynamic memory and storage devices such as disk drives.

One or the primary advantages of shared multiprocessor systems is that the processors may share information resident in the various processor nodes, including both data and program code. Because information is shared among the nodes and node processors, the information accessible to the processors is effectively distributed across and through the system, and the memory spaces of the processor nodes functionally form a single, global memory pool. The global memory pool and the information is typically shared at some predetermined granularity, which is often referred to as a "line" wherein a "line" is typically of a fixed size corresponding to a unit of data convenient to operations of the processors.

In a typical shared multiprocessor system, a line will reside in or be "owned" by one processor or node, which may change over time with operations of the system, and copies of the line may be encached in the memory space of other nodes or processors at different points in time. The processor nodes and processors will typically have rights to read, modify and write a given line or copy thereof, and these rights will vary with time, depending, for example, upon the operations of the processors. For this reason, the tracking and management of the locations and status of lines and copies of lines is a critical function of a shared multiprocessor system to allow, for example, a processor to locate a given line or copy of the line, and to insure coherency of the information as various processors utilize a line or a copy of a line.

In general, the tracking and management of lines in a shared multiprocessor system and the maintenance of information coherency requires the generation and maintenance of sharing information, that is, of information pertaining to the locations of a line and encached copies of the line, of the status of the line and the encached copies of the line, and of the rights possessed by various processors to use the line. Shared multiprocessor systems of the prior art have attempted a number of solutions to the problem of cache coherency and sharing information, all of which have been unsatisfactory for one reason or another.

One approach has been to store all of the sharing information, that is, the information pertaining to the location and status of each line and each encached copy of each line in one deterministic location, which is typically the line's "home node". This method is advantageous in terms of performance as all of the sharing information is co-located and can therefore be processed concurrently. This method is disadvantageous, however, in requiring an excessive amount of storage overhead as each home node must maintain a "tag" for each of its global memory lines and each of these tags is of a relatively large size as it must contain all of the sharing information for the associated line. The end result is typically a significant increase in system cost and, in particular, the cost of system storage space and, although there are techniques to reduce the overhead requirements of such methods, they typically introduce second order behaviors which can negatively affect system performance.

A second approach to storing sharing information is to distribute the sharing information for each line as evenly as possible across all of the nodes sharing the line, typically by requiring each node to store and maintain the sharing information associated with the lines encached in the node. The amount of total cache space in the nodes is typically orders of magnitude smaller than the amount of global memory, so that the number of lines encached in the nodes will be orders of magnitude less than the number of lines in the system global memory. Because of this, these methods thereby minimize the amount of information stored in each home node tag, for which there is one per line of global memory and distribute the remainder of the sharing information across the cache tags maintained by the other nodes sharing the line. In this respect, it will be recognized that the sharing information storage requirements that are thereby imposed on the nodes encaching lines belonging to other nodes is limited because the number of lines that can be encached in a given node is limited. The advantage of these methods is thereby a significant reduction in the overhead storage requirements for sharing information in each home node. The primary disadvantage of these methods is that since the sharing information is no longer co-located, the average latency per transaction is usually greatly increased, thereby significantly reducing system performance.

The present invention provides a solution to these and other problems of the prior art.

SUMMARY OF THE INVENTION

The present invention is directed to a method and mechanism for tracking and managing cached data in a multiprocessor system and, in particular, to a cache based vector coherency method and mechanism for tracking and managing data use in a multiprocessor system. In particular, the present invention is directed to a shared line coherency method and mechanism for maintaining coherency of shared lines among the nodes of a system including a plurality of nodes sharing lines of information wherein each line is an element of information.

The shared line coherency mechanism includes a single associated home node for each shared line wherein the home node of a line always contains a copy of the line, may include a plurality of leaf nodes for a given shared line wherein each leaf node shares the line and contains an encached copy of the line, and may include a single associated owner node for a given shared line wherein the owner node shares the line, contains an encached copy of the line, and contains a vector directory identifying the leaf nodes of the line. According to the present invention, all requests directed to a shared line are directed to the home node of the line and a home node receiving a request directed to a shared line will provide a copy of the line to the requesting node and will forward the request to the owner node of the line for completion of the request. The owner node is the first node to access the line, and subsequently the last node to modify the line, and operates to track all leaf nodes of the line and, for this purpose, the vector directory contains an entry for each possible leaf node of the line wherein each entry indicates whether the corresponding node is a leaf node having a valid copy of the line.

Each node maintains a line tag for each line resident in the node, whether the line resides in the node because the node is the home node or whether the node is a leaf node of an owner node of the line. The home node of a line includes the associated line, a line tag representing a current home node state and an identifier of a current node to which the home node is to direct communications and a leaf node of a line includes an encached copy of the line, a line tag representing a current leaf node state, and an identification of a current node to which the leaf node is to direct communications. An owner node of a line includes an encached copy of the line, a line tag representing a current owner node state and a vector directory including an entry corresponding to each possible sharing node of the system and indicating each current leaf node of the line.

The shared line coherency mechanism of the present invention further includes a distributed prepention queue mechanism for ordering concurrently pending requests for access to a line wherein the prepention queue mechanism includes the home node of the line and the prepention queue is distributed across all nodes having a pending request directed to the line. The home node is responsive to a request by a requesting node for access to a line while a preceding request is uncompleted by adding the requesting node to a prepention queue containing at least one preceding node having an uncompleted request for access to the line by directing the requesting node to communicate one or more retry requests to the immediately preceding node in the prepention queue. Each requesting node in the prepention queue responds to placement in the prepention queue by spin looping retry requests against the immediately preceding node until the immediately preceding node exists the prepention queue upon completion of a request by the immediately preceding node. Upon reaching the end of the prepention queue, the requesting node, communicating the next retry request to the owner node and exits the prepention queue upon completion of the request.

The shared line coherency mechanism of the present invention further includes a packet communication mechanism for communicating information pertaining to requests among the nodes wherein a request from a requesting node to another node is communicated in a request packet, a response to a request packet from a node receiving a request packet is communicated to another node in a response packet, and a request from a node receiving a request packet is communicated to a node to which the request packet is directed in a forwarded request packet concurrently with a corresponding response packet to the node originating the request packet.

A request packet includes an identifier of a node to which the request is directed, an identifier of a node sending the packet, an identifier of a node originating the request, a transaction identifier assigned by the node originating the request and identifying the request transaction, an identifier of a target of the request, a command pertaining to the request, and a command qualifier representing a specific requested action. A request packet may also include an identification of possible current leaf nodes of a line that is a target of the request or an identifier of a node to which communications are to be directed.

A response packet includes an identifier of a node to which the response is directed, an identifier of a node which originated a request to which the response packet contains a response, a transaction identifier assigned by the node originating the request and identifying the request transaction, a command, and a command qualifier representing a specific requested action. A response packet may also include an identification of possible current leaf nodes of a line that is a target of the request or an identifier of a node to which communications are to be directed.

A forwarded request packet includes an identifier of a node to which the request is directed, an identifier of a node sending the packet, an identifier of a node originating the request, a transaction identifier assigned by the node originating the request and identifying the request transaction, an identifier of a target of the request, a command pertaining to the request, and a command qualifier representing a specific requested action. A forwarded request packet may also include an identification of possible current leaf nodes of a line that is a target of the request or an identifier of a node to which communications are to be directed.

The present invention includes methods for providing nodes with access to lines, for providing a requesting node with access to a currently unshared line, for providing a requesting node with read access to a currently read shared line, for providing a requesting node with modification access to a currently read shared line, for providing a requesting node with read access to a modified line, for providing a requesting leaf node having an invalidated copy of a modified line with read access to the modified line, for promoting a read access of a requesting node of a read-only encached line to a write access to the line, for promoting a read access of a requesting node to a read-only encached line to a write access in request race conditions, and for evicting a line from a leaf node.

The present invention further includes a shared line coherency mechanism residing in each node participating in line sharing wherein each node includes a processor for performing operations on lines, a memory for storing lines for which the node is the home node, a cache for storing shared lines, and a memory/cache manager for performing memory and cache functions. The shared line coherency mechanism includes a line tag memory for storing a line tag for each line resident in the node, a packet generator and parser for communicating requests and responses to requests pertaining to lines among the nodes of the system, and a coherency controller responsive to line operations of the node and communications pertaining to lines among the nodes of the system and for controlling operation of the memory/cache manager. The line tag associated with a line resident in the node includes a state value representing a state of the line with respect to the node and an identifier of a node relevant to the current state of the line. The state value may represent that the node is the single associated home node of the line and the current state of the line in the line home node, that the node is a leaf node of the line containing an encached copy of the line and the current state of the line in the leaf node, or that the node is a single associated owner node of the line and the state of the line in the line owner node. When the node is the home node or a leaf node of the line, the identifier indicates a current node to which the node is to direct communications pertaining to the line. When the node is the home node of the line, the current node to which the home node is to direct communications is the current owner node of the associated line, when the node is the home node of the line, the current node to which the home node is to direct communications is a node requesting access to the associated line, and when the node is a leaf node of the line, the current node to which the leaf node is to direct communications is a suspected current owner node of the associated line. When the node is the owner node of the line, the identifier is vector directory containing an entry for each possible leaf node of the line and each entry indicates whether the corresponding node is a leaf node contains a valid copy of the line 49. The line tag associated with a line resident in the node may also contain a state value representing that the node is in a prepention queue of pending requests with respect to the line and is to direct retry requests to an immediately preceding node in the prepention queue and an identifier of the immediately preceding node in the prepention queue.

The shared line coherency mechanism of the present invention operates such that all communications that are requests directed to a shared line are directed to the home node of the line and a home node receiving a request directed to a shared line will provide a copy of the line to the requesting node, and will forward the request to the owner node of the line for completion of the request.

The shared line coherency mechanism of the present invention further includes a prepention queue mechanism for ordering pending requests for access to a line wherein the prepention queue mechanism includes the shared line coherency mechanism of the home node of the line and shared line coherency mechanism of each requesting node in the prepention queue. The shared line coherency mechanism of the home node of a line is responsive to a request by a requesting node for access to the line while a preceding request directed to the line is uncompleted by adding the requesting node to a prepention queue containing at least one preceding node having an uncompleted request for access to the line by directing the requesting node to communicate one or more retry requests to the immediately preceding node in the prepention queue. The shared line coherency mechanism of each requesting node in the prepention queue responds to placement of the node in the prepention queue by spin looping retry requests against the immediately preceding node until the immediately preceding node exists the prepention queue upon completion of a request by the immediately preceding node. When the requesting node progresses through the prepention queue to the end of the prepention queue, the shared line coherency mechanism communicates the next retry request to the owner node and exits the prepention queue upon completion of the request.

The shared line coherency mechanism of a home node adds a requesting node to a prepention queue by communicating to the requesting node a response including an identifier of the immediately preceding node in the prepention queue and an indication that the requesting queue is to enter the prepention queue and the shared line coherency mechanism of the requesting node responds to the home node of the line by writing the identification of the immediately preceding node in the prepention queue into the identifier of the line tag corresponding to the line and writing a state value indicating that the requesting node is to communicate a retry request to the node identified by the identifier. The shared line coherency mechanism of the requesting node responds to completion of the request by writing the identification of the home node of the line into the identifier of the line tag corresponding to the line and writing a state value representing the current state of the line in the requesting node into the state value of the line tag corresponding to the line.

DESCRIPTION OF THE DRAWINGS

The foregoing and other objects, features and advantages of the present invention will be apparent from the following description of the invention and embodiments thereof, as illustrated in the accompanying figures, wherein:

FIG. 2B is a representation of exemplary states of a home node;

FIG. 2C is a representation of exemplary states of an owner node;

FIG. 3A is an illustration of exemplary contents of a request packet;

FIG. 3B is an illustration of exemplary contents of a response packet;

FIGS. 4A and 4B illustrate a simple read access request;

FIGS. 8A–8J illustrate the structure and operation of prepention queues;

DETAILED DESCRIPTION OF THE INVENTION

The following will first describe the Cache Based Vector (CBV) coherency mechanisms and methods of the present invention and an exemplary shared multiprocessor system in which the present invention may be implemented at a general level, and will then discuss and described detailed operations of the present invention.

A. General Description of CBV Coherency
Mechanisms and Methods (FIGS. 1, 2A, 2B, 2C, 3A and 3B)

1. General Description of an SMP System (FIG. 1)

Figure 1:
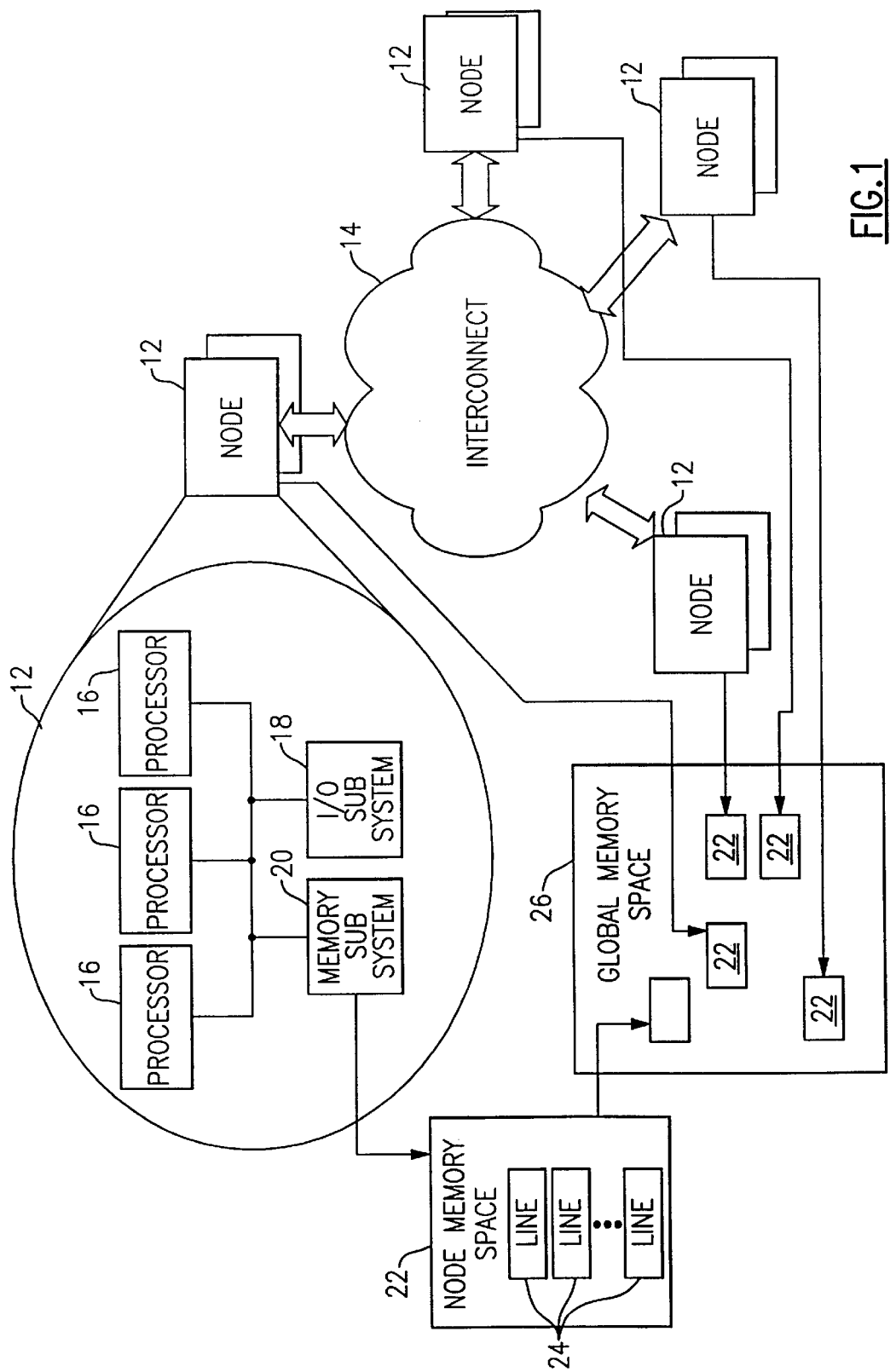
FIG. 1 is a diagrammatic representation of a system incorporating the present invention.

Referring to FIG. 1, therein is shown a diagrammatic representation of a non-uniform memory architecture System 10 in which the CBV coherency mechanisms and methods of the present invention may be implemented. As illustrated therein, a typical System 10 includes plurality of SMP Nodes (Node(s)) 12 communicating through an Interconnection Structure (Interconnect) 14, such as a wide or local area network or bus. Each Node 12 may typically be comprised of one or more Processors 16, an Input/Output Sub-System (I/O Sub-System) 18 communicating with Interconnect 14, and a Memory Sub-System 20 which may include both dynamic memory and storage devices such as disk drives.

As indicated, the Memory Sub-System 20 of each Node 12, together with the dynamic memory space associated with each Processor 16, comprises a Node Memory Space 22 for storing or encaching Lines 24 wherein each Line 24 represents a unit or element of sharing information. A Line 24 is typically of a fixed size corresponding to a unit of data convenient to operations of the Processors 16 and Nodes 12, but in principle may be of variable size, ranging from a single bit to an entire file or group of files. The Memory Spaces 22 of Nodes 12, in turn, comprise a Global Memory Space 26 containing all shared Lines 24 resident in the System 10.

2. Introduction to CBV Coherency Mechanisms

In the CBV coherency methods of the present invention, and in an System 10 implementing the methods of the present invention, each Node 12's view of Global Memory Space 26 is comprised of a set of Lines 24 which are resident on that Node 12, called "near" Lines 24, and a set of Lines 24 which are resident on other Node(s) 12 in the System 10, referred to as "far" Lines 24 and "far" Nodes 12, respectively. Each Node 12 is assumed to be capable of caching far Lines 24 obtained from other Nodes 12 in the system.

As will be described in the following discussions, the CBV coherency methods and mechanisms of the present invention include a number of inter operative mechanisms and sharing information structures to maintain the coherency of all cached Lines 24 in the Global Memory Space 26 of an System 10. In this regard, and for purposes of the present discussions, sharing information may be defined as information pertaining to the tracking and management of the status and locations of Lines 24 that are shared by Nodes 12. These mechanisms include, for example, sharing information structures resident in the Nodes 12 for minimizing the amount of sharing information maintained by the "home" nodes of Lines 24 by delegating the sharing information for encached Lines 24 to sharing "far" nodes referred to herein as "owner" nodes. This distribution of sharing information from the "home" nodes to a relative few "owner" nodes thereby reduces the sharing information storage requirements in the "home" nodes, and by storing the sharing information in a relatively small number of "owner" nodes, allows the system to concurrently process complex transactions involving many nodes, thereby achieving higher performance levels.

The mechanisms of the present invention further include distributed mechanisms, referred to herein as "prepention queues", to guarantee the correctness and forward progress of requests by nodes for Lines 24 while distributing the resulting request contention traffic across all of the pended nodes, thereby avoiding the creation or occurrence of "hot node" bottlenecks. "Prepention queues" ensure that racing requests complete in a globally consistent manner and that conflicting requests do not result in the starvation of nodes. Node order within a prepention queue is determined by the sequence in which their respective requests arrive at a line's home node, and once in the queue nodes are not allowed to change their position. Also, while in the queue nodes are not allowed to make forward progress on their transaction until preceding node transactions are completed globally, thereby ensuring that all requests complete in a globally consistent manner and that each request will eventually be allowed to finish.

Finally, and as will be described herein below, the CBV coherency methods and mechanisms of the present invention include a packet communications mechanism facilitating the communication of requests for lines and coherency maintenance information among nodes. As will be described, the packet communications mechanism of the CBV coherency mechanism of the present invention provides request and response packets for communicating requests and coherency maintenance information and responses to requests, and forwarded request packets wherein a node may forward a request on behalf of another node in parallel with a response, thereby reducing transaction latencies.

3. Sharing Information Structures (FIGS. 2A, 2B and 2C)

Figure 2A:
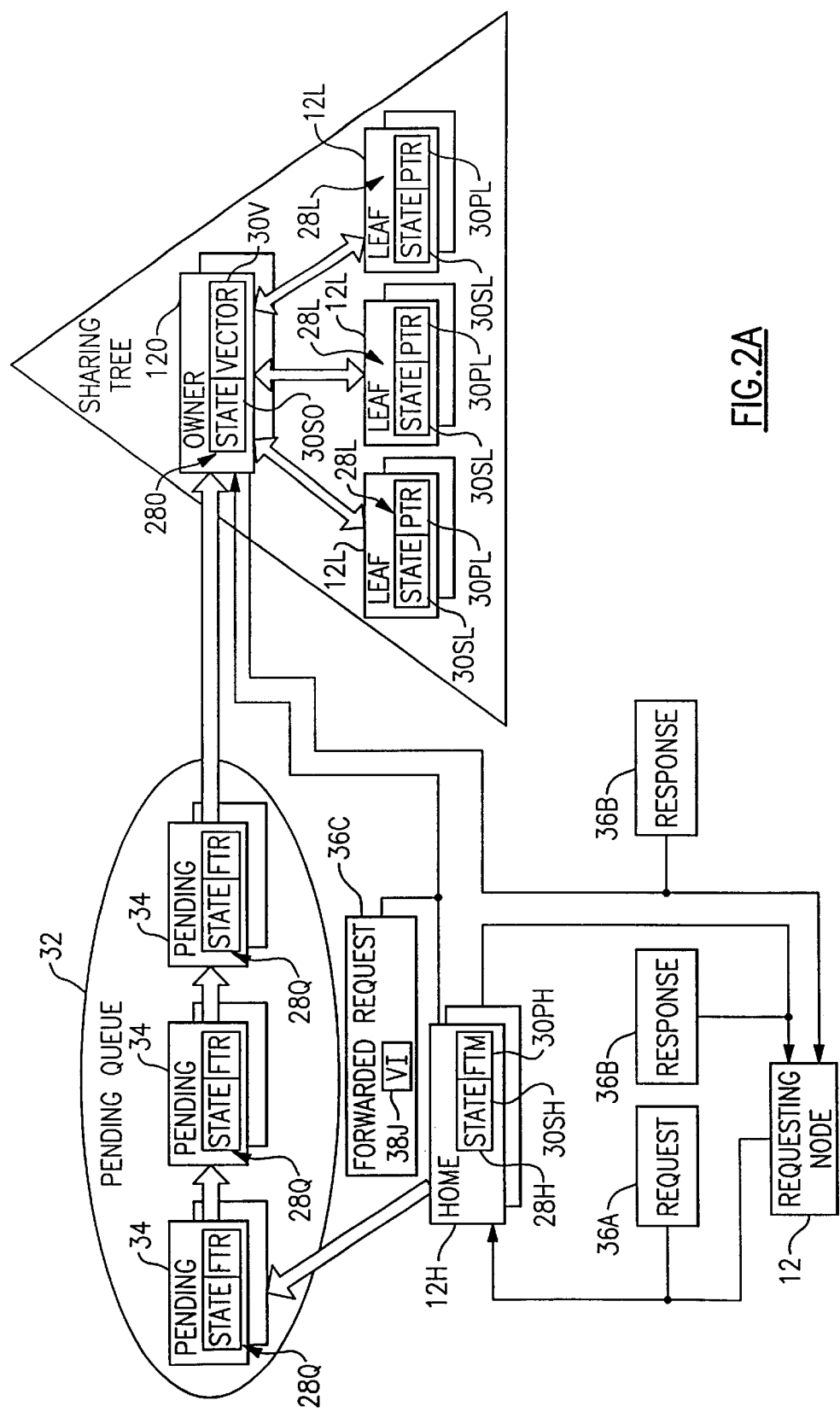
FIG. 2A is a diagrammatic illustration of the possible relationships between lines and nodes in a system of the present invention for the example of a single line.
Figure 5A:
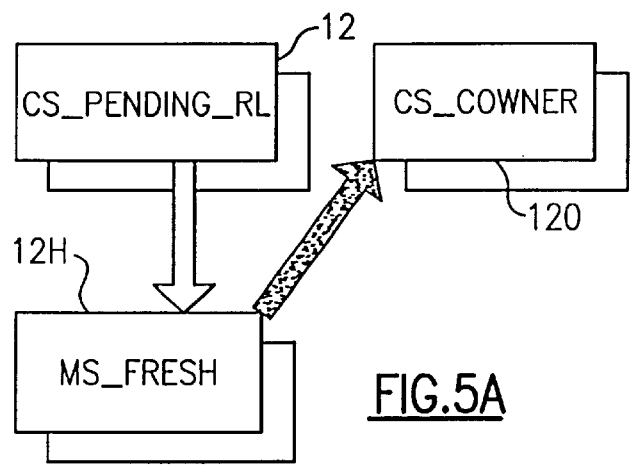
FIGS. 5A–5F illustrate a read access request to a read-shared line.
Figure 5B:
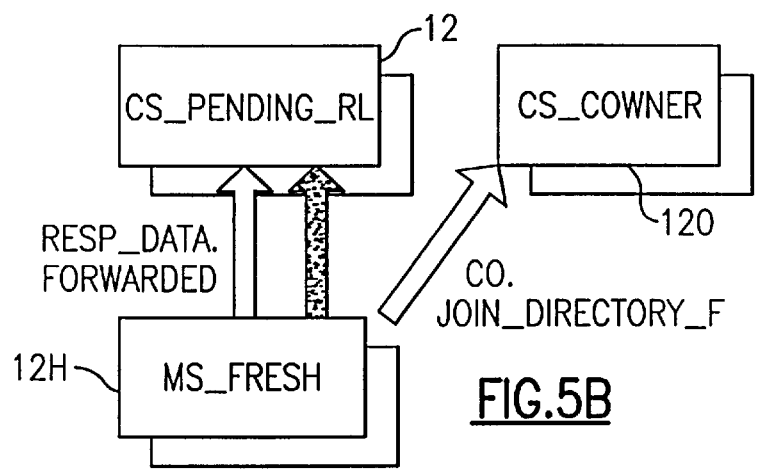
Figure 5C:
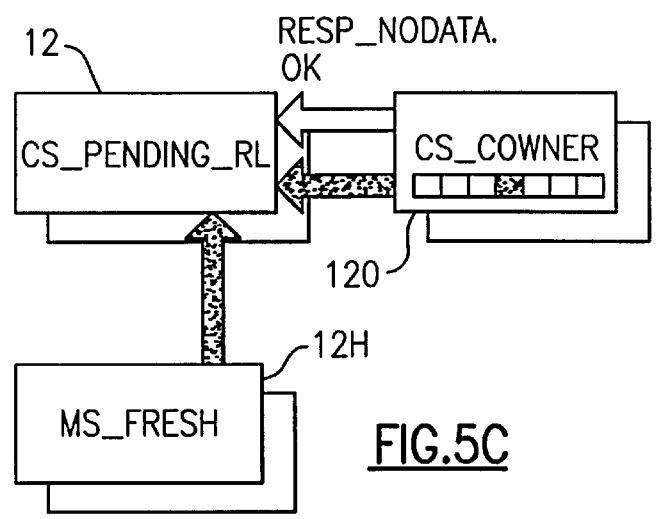
Figure 5D:
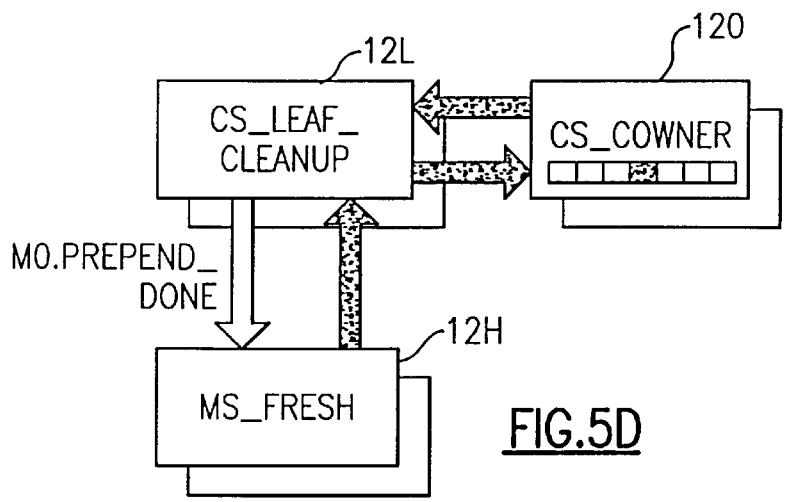
Figure 5E:
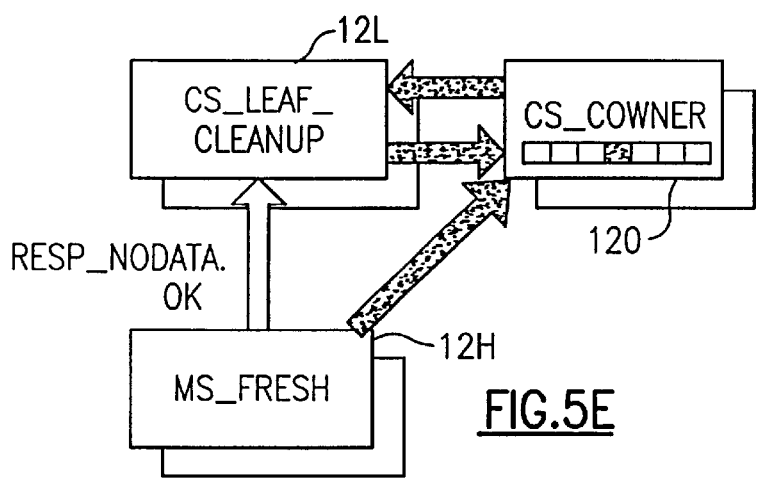
Figure 5F:
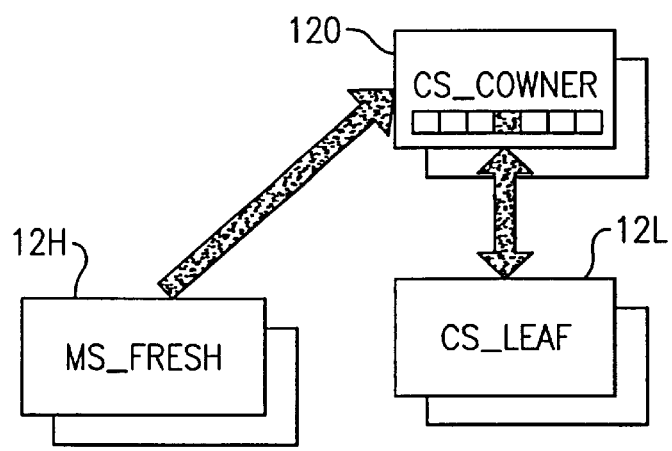
Figure 6A:
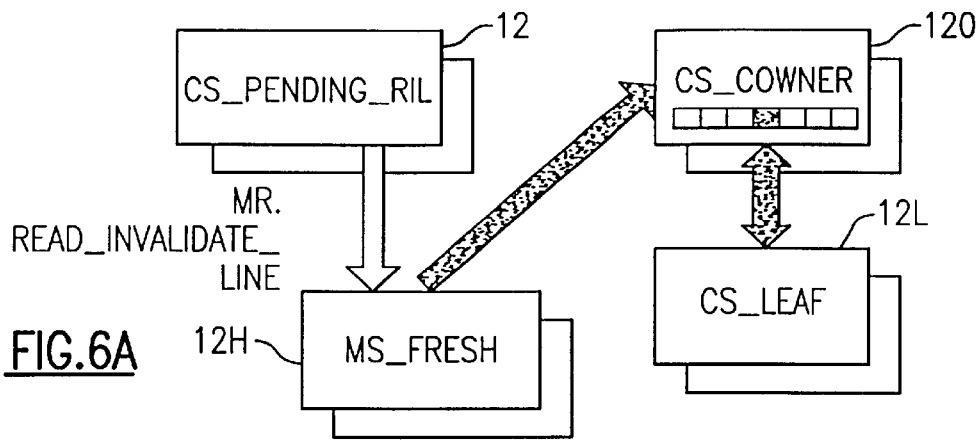
FIGS. 6A–6F illustrated a modification request to a read-shared line.
Figure 6B:
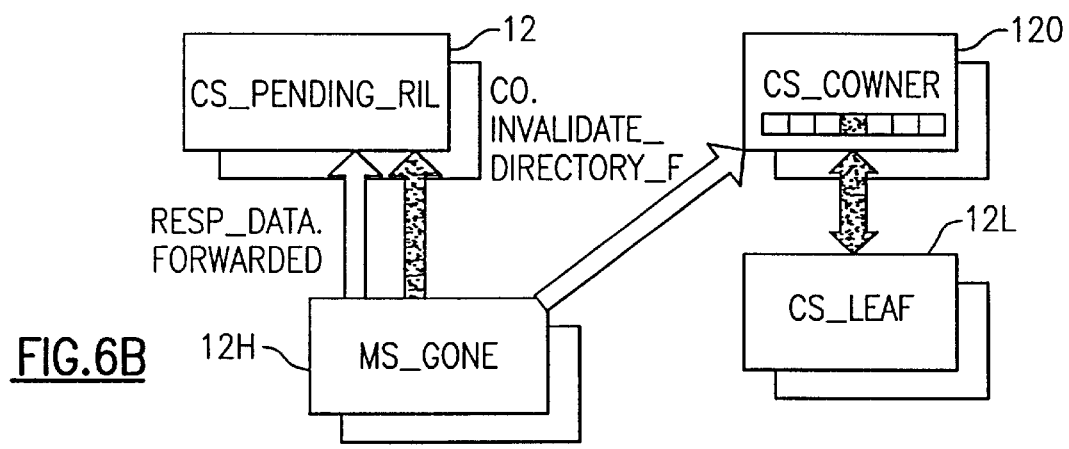
Figure 6C:
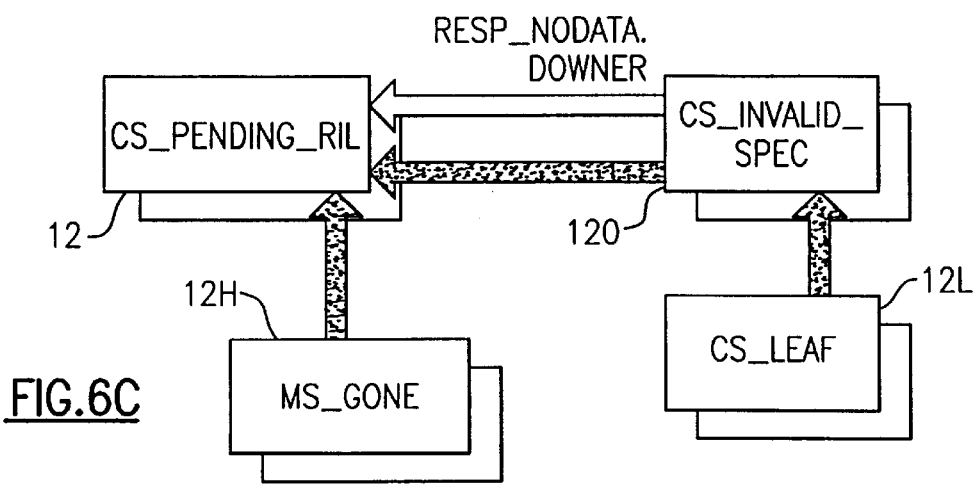
Figure 6D:
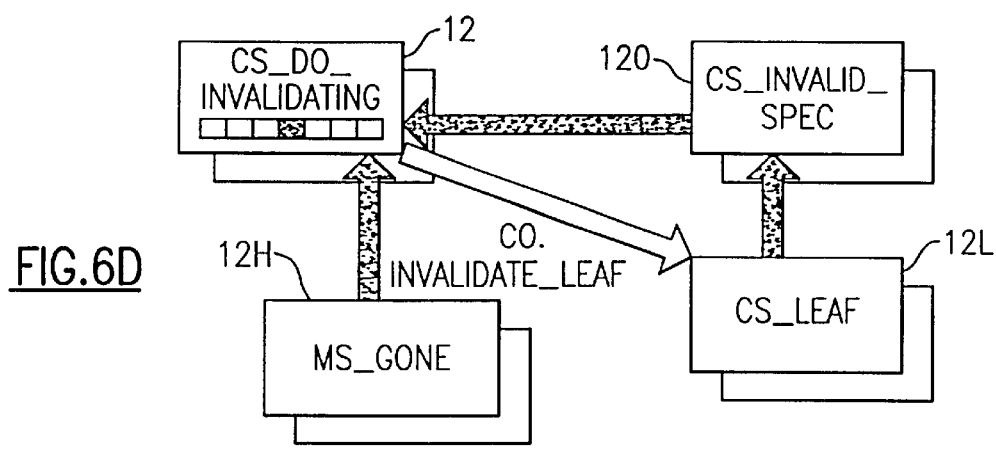
Figure 6E:
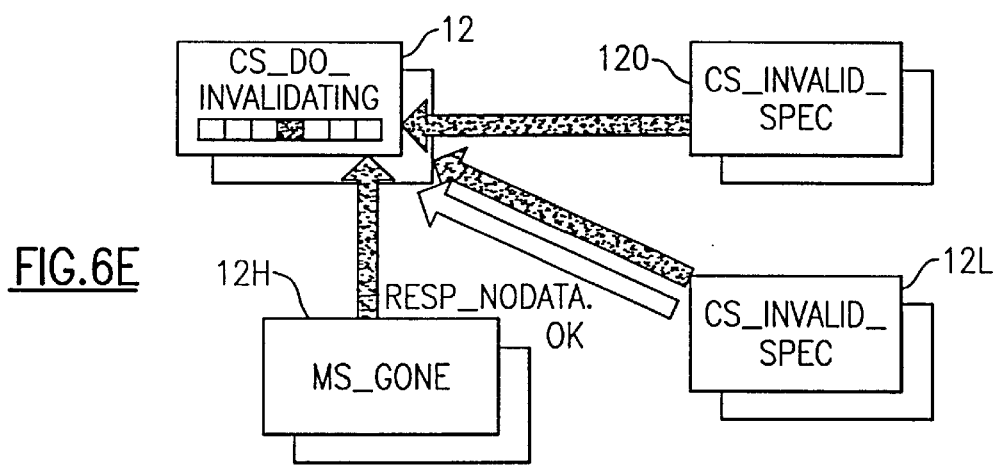
Figure 6F:
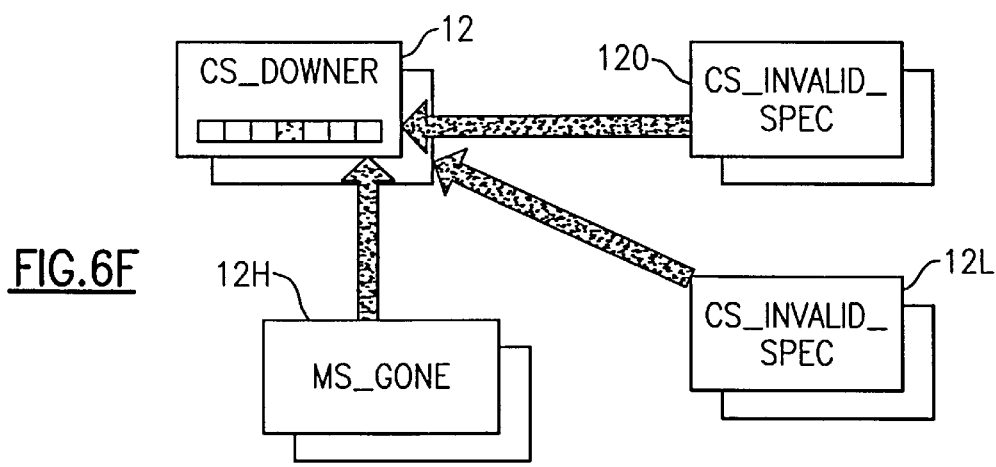
Figure 7A:
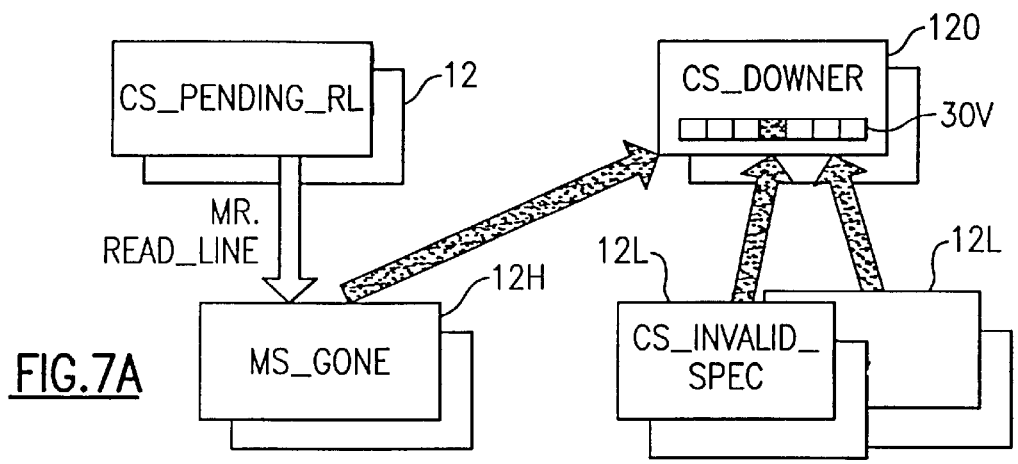
FIGS. 7A–7F illustrate a read request to a modified line.
Figure 7B:
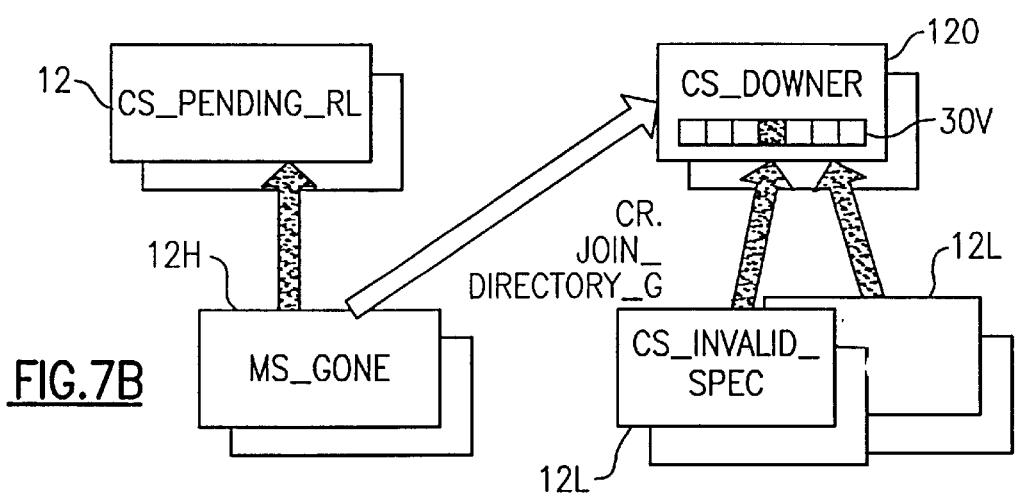
Figure 7C:
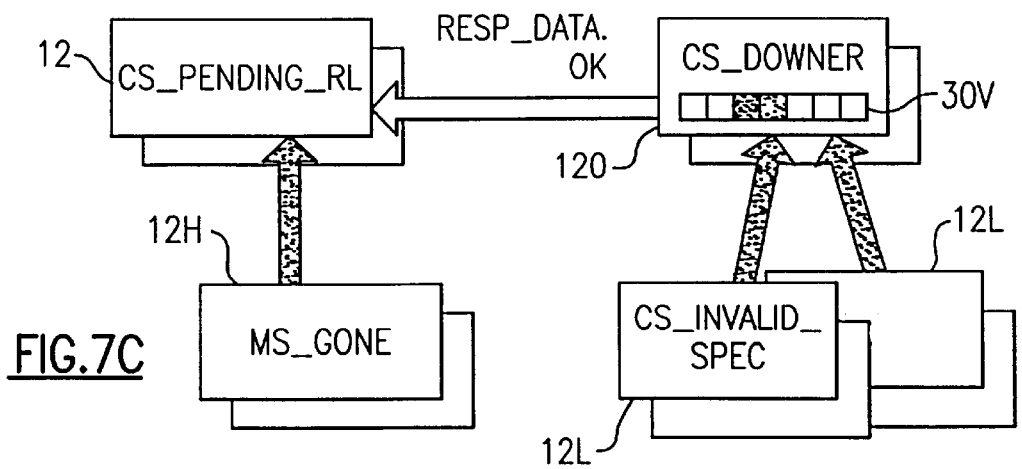
Figure 7D:
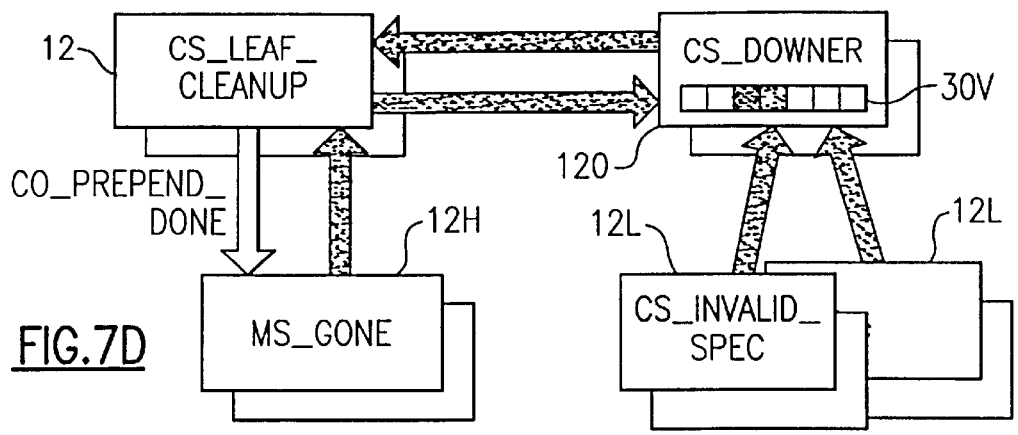
Figure 7E:
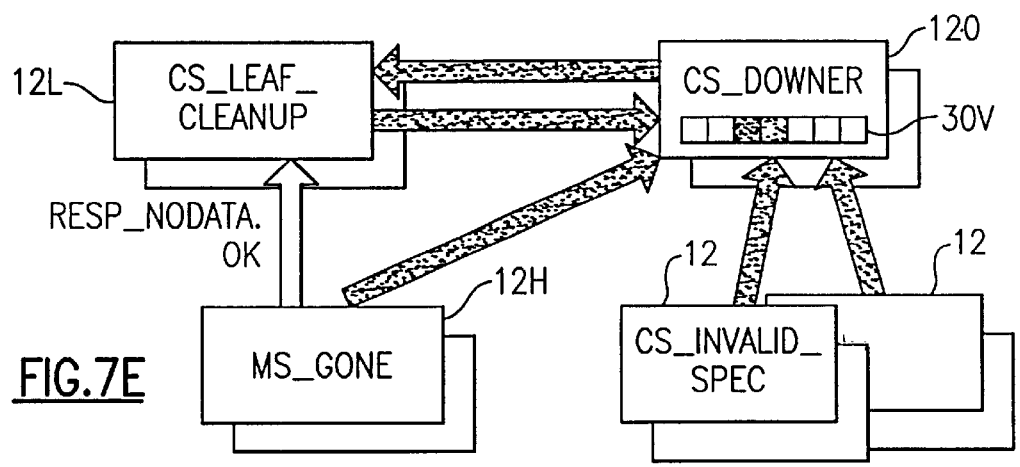
Figure 7F:
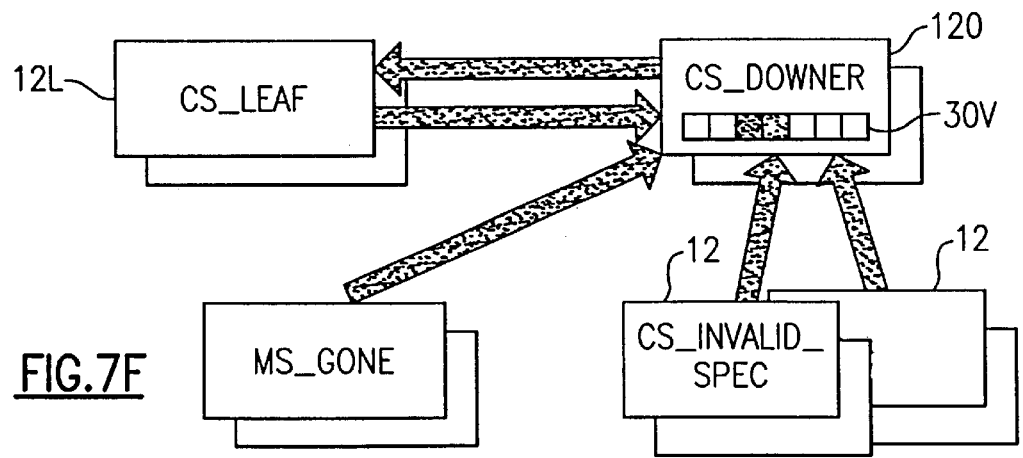
Figure 8A:
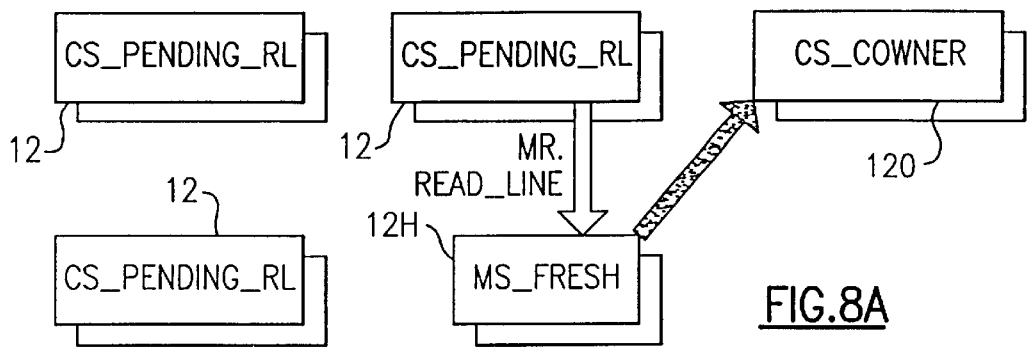
Figure 8B:
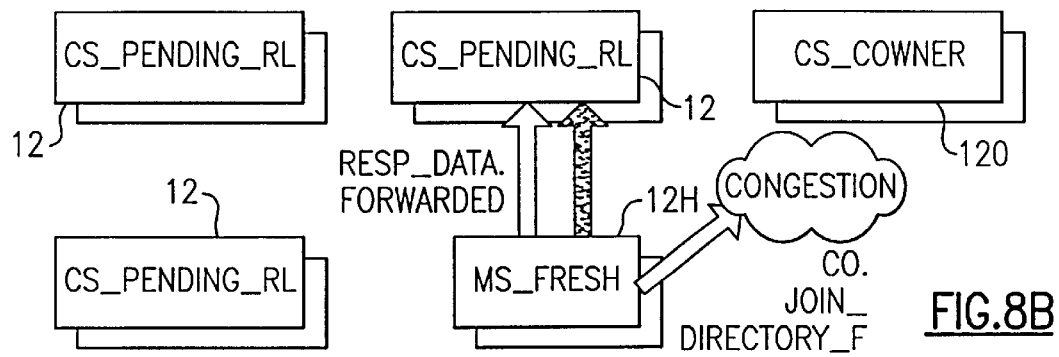
Figure 8C:
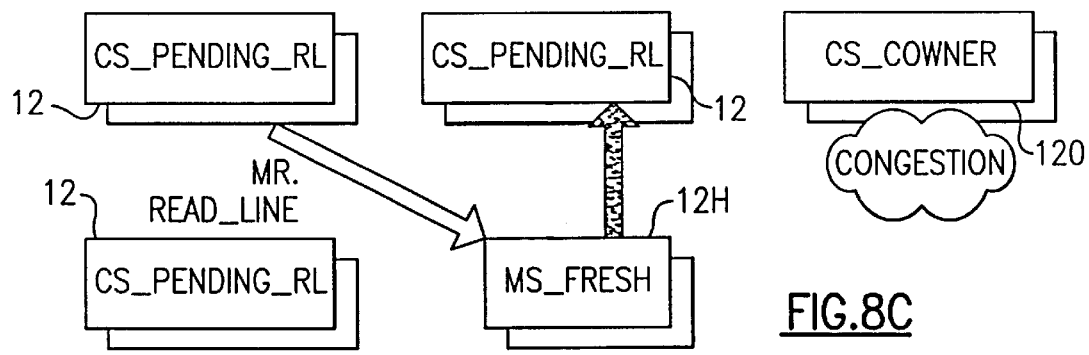
Figure 8D:
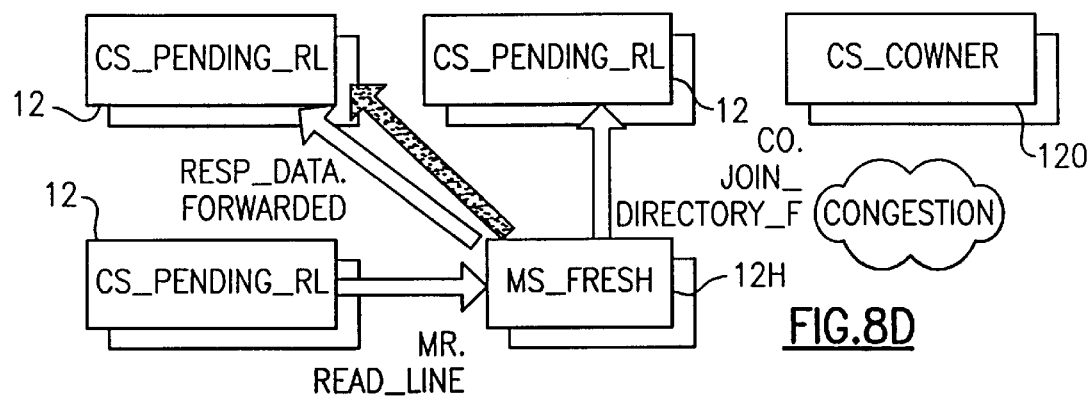
Figure 8G:
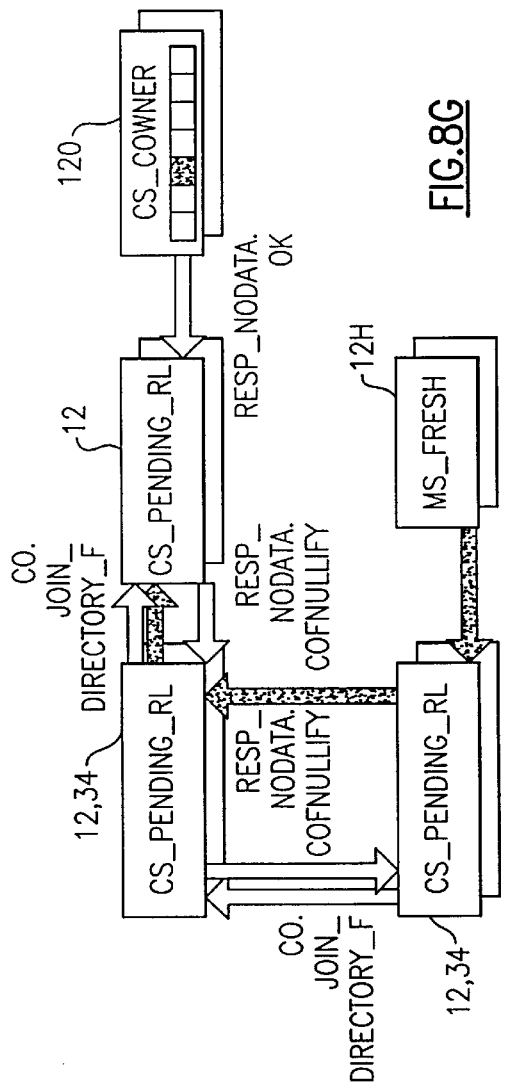
Figure 8H:
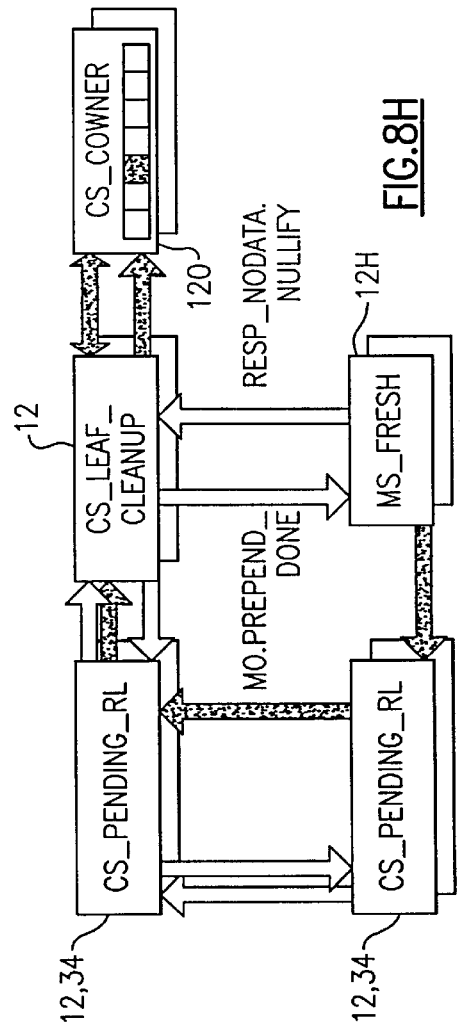
Figure 8I:
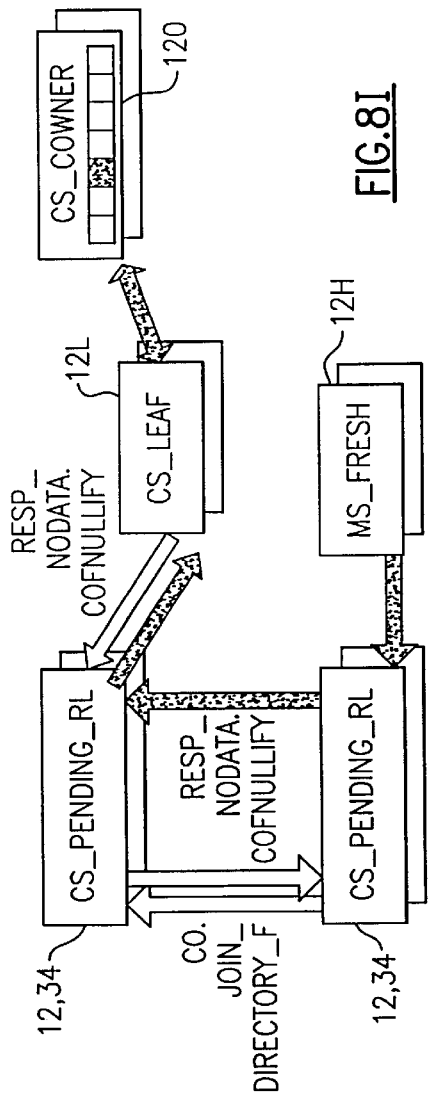
Figure 8J:
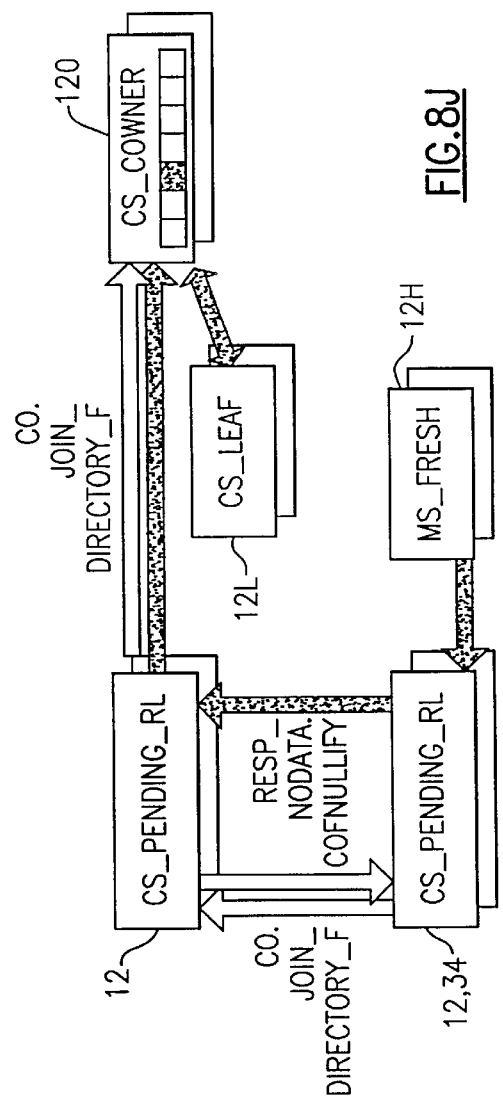

Referring to FIG. 2A, therein are illustrated possible relationships between Nodes 12 for a single shared Line 24 and the sharing information structures and mechanisms of the present invention that are associated with the Line 24 in each of the Nodes 12 sharing the Line 24. In this regard, it must be recognized and understood that there will be instances of the mechanisms and structures illustrated in FIGS. 2A, 2B, 2C, 3A and 3B in the System 10 for each shared Line 24 in the System 10, that is, for each Line 24 which is encached in a "far" Node 12.

FIG. 2A thereby illustrates the possible relationships between the Nodes 12 of an System 10 and a single Line 24 and it is shown therein that a given Node 12 may be may have a relationship with a Line 24 as a Home Node 12H of the Line 24, as an Owner Node 12O of the Line 24 or as a Leaf Node 12L of the Line 24. In this regard, and as stated above, it must be understood that the relationships between Nodes 12 and a Line 24 as illustrated in FIG. 2A are illustrative of these relationships for a single Line 24, and that the roles of each of Nodes 12 in an System 10 are determined on a Line 24 basis. That is, at any given time a Node 12 may be a Home Node 12H for a one Line 24, a Leaf Node 12L for another Line 24, and an Owner Node 12O for yet another Line 24, but will fulfill only one of these roles for a given Line 24 at any given time. A Line 24, in turn, and at any given time, will have a single Home Node 12H, may have a single Owner Node 12O, and may have no Leaf Nodes 12L, a single Leaf Node 12L or a plurality of Leaf Nodes 12L. Also, a given Node 12 may concurrently be a Home Node 12 to none, one or a plurality of Lines 24, an Owner Node 12O of none, one or a plurality of Lines 24, and a Leaf Node 12L of none, one or a plurality of Lines 24, subject to the restriction with respect to a single, given Line 24 just described. In addition, and with the exception that the Home Node 12H of a given Line 24 will remain the Home Node 12H of the Line 24, the relationship between a given Node 12 and a given Line 24 may change at any time during the operation of the methods and mechanisms of the present invention.

Considering each of the possible roles of Nodes 12, therefore, a Home Node 12H is the Node 12 on which the physical storage for the associated Line 24 exists, as distinguished from a Node 12 having a resident encached copy of the Line 24.

An Owner Node 12O, in turn, is a Node 12 that has the responsibility of tracking all possible sharers of the Line 24, that is, of tracking all Nodes 12 that have access rights to or an encached copy of the Line 24. As discussed above, the CBV coherency methods and mechanisms of the present invention achieve a low sharing information overhead storage requirement by deferring or delegating the responsibility of tracking cached copies of a Line 24 to one of the Nodes 12 having a cached copy of the Line 24, which will become an Owner Node 12O. As a result, an Owner Node 12O will only exist for a given Line 24 only if at least one Node 12 that is not the Home Node 12H for the Line 24 contains an encached copy of the Line 24. Once a Node 12 becomes the Owner Node 12O of a Line 24, the Owner Node 12O retains that status until its copy of the Line 24 is either evicted from its cache or is invalidated by a modification request from another Node 12, as discussed in following descriptions.

Lastly, the Leaf Nodes 12L of a given Line 24 are comprised of all Nodes 12 that are not the Home Node 12H or the Owner Node 12O of the Line 24 and that contain an encached copy of the associated Line 24. The term "leaf" stems from the fact that all such nodes are end points in the tree graph created by a directory, discussed below, residing in the Owner Node 12O and containing sharing information identifying the Nodes 12 containing an encached copy of the associated Line 24 and the status of each copy of the Line 24.

As described above, a Line 24 may be resident in a Node 12 because the Node 12 is the Home Node 12H of the Line 24 or because the Node 12 is a Leaf Node 12L or Owner Node 12O of the Line 24 and a copy of the Line 24 is encached therein. As illustrated in FIG. 2A for a single Line 24, and as also discussed above, the Home Node 12H of a Line 24, an Owner Node 12O of the Line 24 and any Leaf Nodes 12L of the Line 24 each store sharing information pertaining to the sharing state of the copy of Line 24 residing therein. The sharing state of a Line 24 residing in a given Node 12 is a subset of the global sharing state of the Line 24 in the System 10 and is represented in each Node 12 in which the Line 24 resides in a structure often referred to as a "memory tag".

In the instance of the Home Nodes 12H of a Line 24, the sharing state of a Line 24 for which the Node 12 is the Home Node 12H will be represented in the Home Node 12H in a corresponding Line Tag 28H and a Node 12 will maintain a Line Tag 28H for and corresponding to each Line 24 for which the Node 12 is the Home Node 12H. A Line Tag 28H includes a State Value (State) 30SH and a Pointer (PTR) 30PH. State 30SH represents the state of the Line 24 in the Home Node 12H and, conversely, the state of the Home Node 12H with respect to the Line 24, including the Home Node 12H's access rights to the Line 24, and is used in servicing requests to the Home Node 12H pertaining to the Line 24. In this regard, FIG. 2B lists exemplary possible states or values for the State 30SH of a Home Node 12H when there are no outstanding requests from other Nodes 12 respecting the associated Line 24. As illustrated in FIG. 2B, possible values of State 30SH in a present implementation of the present invention include MS_HOME 30SHA, MS_FRESH 30SHB and MS_GONE 30SHC, each of which are defined and described in FIG. 2B and others of which will be introduced and described in following descriptions. It will be understood, however, that other possible state values may be implemented. It should also be noted that, in addition to representing the access rights of the Home Node 12H to the associated Line 24, the State 30SH value of a Line Tag 28H will implicitly indicate whether another Node 12 has an encached copy of the associated Line 24, and is used in this role in servicing requests pertaining to the Line 24 from other Nodes 12 of the System 10. Finally, the PTR 30PH of a Line Tag 28H of a Home Node 12H is used in servicing requests pertaining to the Line 24 from other Nodes 12 of the SMP System and contains a pointer value identifying and pointing, for example, to the current Owner Node 12O of the associated Line 24 and is used, for example, to track the current Owner Node 12O.

Next considering Leaf Nodes 12L, a Leaf Node 12L of a Line 24 maintains a Line Tag 28L for and corresponding to the Line 24 encached therein and a Node 12 will maintain a Line Tag 28L for and corresponding to each Line 24 for which the Node 12 is a Leaf Node 12L. Each Line Tag 28L includes a State Value (State) 30SL and a Pointer (PTR) 30PL. Again, State 30SL represents the state of the Line 24 in the Leaf Node 12L and, conversely, the state of the Leaf Node 12L with respect to the Line 24, including the current access rights of the Leaf Node 12L to the associated Line 24, and is used, for example, while the Leaf Node 12L is gaining access to the Line 24 and during certain maintenance functions, as described subsequently. PTR 30PL, in turn, is a pointer value identifying and pointing to, for example, the suspected current Owner Node 12O of the associated Line 24. In this regard, it must be noted that Leaf Nodes 12L and Owner Nodes 12O are loosely coupled to each other in the CBV coherency methods of the present invention. As such, when ownership for a Line 24 is passed from a present Owner Node 12O to a next Owner Node 12O, the CBV coherency methods of the present invention does not require that the PTR 30PL values maintained by the Leaf Nodes 12L having encached copies of the Line 24 be updated, thereby reducing the inter-node communications bandwidth requirements. Instead, the PTR 30PL values maintained by the Leaf Nodes 12L are allowed to become "stale" and remain pointing to the previous Owner Node 12O. As will be seen from following descriptions of detailed operations of the present invention, a Leaf Node 12L having an encached copy of a Line 24 may not be able to inform the current Owner Node 12O of the Line 24 that the Leaf Node 12L is evicting the Leaf Node 12L's copy of the Line 24. As will also be seen from following discussions, this may result in stale sharing information in the directory residing in the Owner Node 12O, which is described next below. This, in turn, may require increased coherency communications traffic for some invalidation cases, but studies based on typical commercial workloads have indicated that the additional traffic does not surpass the amount of traffic that would result if the Leaf Node 12L pointers were updated.

Lastly, and as described above, an Owner Node 12O of a Line 24 is a Node 12 that has the current responsibility of tracking all possible sharers of the Line 24, that is, of all Nodes 12 that have access rights to or a copy of the Line 24. For this reason, an Owner Node 12O maintains a Line Tag 28O for and corresponding to a Line 24 "owned" by the Owner Node 12O and each Node 12 will maintain a Line Tag 28O for and corresponding to each Line 24 of which it is the Owner Node 28O. Each Line Tag 28O includes a State Value (State) 30SO and a Vector 30V wherein Vector 30V comprises a directory for storing a bit for and corresponding to each Node 12 present in the System 10 and wherein the value of each bit indicates whether the corresponding Node 12 contains a copy of the corresponding Line 24. State 30SO, in combination with the directory stored in Vector 30, describes the state of the Line 24 in the Owner Node 12O and, conversely, the state of the Owner Node 12O with respect to the Line 24, including the access rights of the Owner Node 12O to the Line 24 and the access rights of the Line 24's Home Node 12H. In this regard, FIG. 2C illustrates and describes certain of the possible non-transient states of an Owner N 12O Node in a present implementation of the present invention. As illustrated therein, the presently implemented states include CS_COWNER 30SOA and CS_DOWNER 30SOB, each of which are defined and described in FIG. 2C, and it will be understood that other possible state values may be implemented, certain of which will be introduced and described in following descriptions.

Each bit in the directory comprised of Vector 30V represents a single Node 12 in the System 10 and, with the exception of the bit corresponding to the Owner Node 12O, a bit of Vector 30V is set if the associated Node 12 may have an encached copy of the associated Line 24, thereby allowing the Owner Node 12H of a Line 24 to track all possible Nodes 12 that may share the associated Line 24. The width of Vector 30V must therefore be equal to the maximum number of Nodes in an System 10, and is therefore specific to a given System 10 and implementation of the present invention.

As described, a given Node 12 may concurrently be a Home Node 12 to none, one or a plurality of Lines 24, an Owner Node 12O of none, one or a plurality of Lines 24, and a Leaf Node 12L of none, one or a plurality of Lines 24. It will therefore be apparent that a given Node 12 will contain a Line Tag 28H for and corresponding to each Line 24 for which it is the Home Node 12H, a Line Tag 28O for and corresponding to each Line 24 for which it is an Owner Node 12O, and a Line Tag 29L for and corresponding to each Line 24 for which it is a Leaf Node 12L. It will be understood, therefore, that FIG. 2A illustrates the relationships between Lines 24 and Nodes 12 for only a single Line 24 only for purposes of clarity and discussion, and that the full scope of the relationships between Lines 24 and Nodes 12 is a described herein and is understood not to be limited by the illustration presented in FIG. 2A.

It will also be noted and understood by those of ordinary skill in the relevant arts from the above descriptions of Line Tags 28 and the following descriptions of the present invention, that the role of a Node 12 with respect to a Line 24 residing therein may be changed by an appropriate change in the corresponding Line Tag 28 residing in the Node 12. That is, for example, a Line Tag 28L of a Line 24 in a Node 12 may be changed to a Line Tag 28O, or the reverse, thereby changing the state and status of the Node 12 with respect to the corresponding Line 24 from a Leaf Node 12L to an Owner Node 12O, or the reverse, by appropriate changes in the State 30 and PTR 30 values of the Line Tag 28 corresponding to the Line 24.

4. Prepention Queues 32 (FIG. 2A)

As described herein above, the mechanisms of the present invention further include distributed mechanisms, illustrated in FIG. 2A as a Prepention Queue 32, to ensure the correctness and forward progress of requests by Nodes 12, for Lines 24 while distributing the resulting request contention traffic directed against each Line 24 across the Nodes 12 that have contending requests against the Line 24, and ordering the completion of the requests. The use of Prepention Queues 32 thereby avoids the creation or occurrence of "hot node" bottlenecks, ensures that racing requests complete in a globally consistent manner, and that conflicting requests to not result in the starvation of Nodes 12.

Each Prepention Queue 32 is associated with a corresponding Line 24 and is created by operation of the Home Node 12H of the Line 24 if requests against the corresponding Line 24 are generated faster than they can complete, that is, if there are requests waiting completion. A Prepention Queue 32 is essentially a linked list of the Nodes 12 which are concurrently attempting to access the associated Line 24, wherein each Node 12 in a Prepention Queue 32 is represented by a Pending Request (Pending) 34, which includes a Line Tag 34Q comprised of a State Value (State) 34S and a Pointer (PTR) 34P. State 34S contains information representing the current state of the Line 24 with respect to corresponding Node 12, and specifically the state of the corresponding request. State 34S includes, for example, the identification of the requesting Node 12, an identification of a Node 12 that is forwarding the request, and the type of request. PTR 34P, in turn, is a pointer value identifying and pointing to a Node 12 to which the Node 12 represented by the Pending 34 is to direct communications regarding the request, such as Node 12 preceding the requesting node 12 in the Prepention Queue 32 or the suspected current Owner Node 12O. As indicated in FIG. 2A, the request of each Node 12 represented by a Pending 34 in a Prepention Queue 32 is communicated to the preceding Node 12 in the Prepention Queue 32 while the request is pending in the Prepention Queue 32 and is communicated to the Owner Node 12O identified by the PTR 34P of the Pending 34 when the Pending 34 has progressed through the Prepention Queue 32 to the end of the Prepention Queue 32.

The order of Nodes 12 within a Prepention Queue 32 is determined by the sequence in which the requests are received by a Line 24's Home Node 12H. Once entered into a Prepention Queue 32, the Nodes 12 therein may not be reordered and may not progress through the Prepention Queue 32 until preceding requests are completed globally. Prepention Queues 32 thereby ensures that all requests complete in a globally consistent manner, that each request will eventually be allowed to finish, and that request contention traffic directed against each Line 24 is distributed across all of the pended Nodes 12 of the Line 24, that is, across all of the Nodes 12 that have a request directed against the Line 24.

As will be described in detail in the following, Prepention Queues 32 are not comprised of elements separate from or additional to the Nodes 12 in, the Prepention Queues 32 but are effectively comprised of the Nodes 12 in the Prepention Queues 32. That is, each Node 12 in a Prepention Queue 32 is represented by a Pending 34, but each Pending 34 is, in fact, comprised of the Node 12 represented by the Pending 34 and the Line Tag 34Q of a Pending 34 is comprised of the Line Tag 28 of the corresponding Line 24 in the Node 12 represented by the Pending 34. As described above, the role of a Node 12 with respect to a Line 24 residing therein may be changed by an appropriate change in the corresponding Line Tag 28 residing in the Node 12. It has been described above that a Line Tag 28L of a Line 24 in a Node 12 may be changed to a Line Tag 28O, or the reverse, thereby changing the state and status of the Node 12 with respect to the corresponding Line 24 from a Leaf Node 12L to an Owner Node 12O, or the reverse, by appropriate changes in the State 30 and PTR 30 values of the Line Tag 28 corresponding to the Line 24. In the same manner, a Node 12 may be placed in a Prepention Queue 32 with respect to a Line 24 by writing or modifying the State 30S and PTR 30S values of the Line Tag 28 corresponding to the Line 24 to comprise an appropriate Line Tag 34Q, and a Node 12 may exit from a Prepention Queue 32 by modifying the Line Tag 34Q values to appropriate Line Tag 28 values.

In addition, and as will be described, the creation of a Prepention Queue 32 and the placing of a Node 12 into a Prepention Queue 32 are operations resulting automatically from the normal state and response functions of a Home Node 12H. In a like manner, the exit of a Node 12 from a Prepention Queue 32 may result automatically from the normal state and response functions of a Home Node 12H, or without interaction with the Home Node 12H as a result of the normal state and response functions of another Node 12 or Nodes 12 that are or were sharing access to the Line 24, such as that of a Node 12 that invalidates a Line 24 and, in the process, becomes the Owner Node 12O of the Line 24. As such, the implementation of Prepention Queues 32 requires no additional or separate elements in the System 10 or in the Nodes 12 than are implemented in the Nodes 12 in implementing the methods and mechanisms of the present invention.

5. Packet Communication Mechanisms (FIGS. 2A, 3A and 3B)

As described above, the CBV coherency methods and mechanisms of the present invention include a packet communications mechanism facilitating the communication of requests for lines and coherency maintenance information among nodes. In this regard, it will be recognized that as a consequence of Owner Nodes 12O being responsible for tracking cached copies of a Line 24, as opposed to the associated Home Nodes 12H, requests to access a Line 24 may require communication with the Line 24's Owner Node 12O as well as the Line 24's Home Node 12H. One solution to this requirement would require the Home Node 12H to respond to each requester with an identification of the current Owner Node 12O, and the requester to create a separate request to the Line 24's Owner Node 12O. In this method, however, the Home Node 12H's response and the request to the Line 24's Owner Node 12O are serially dependent, thereby increasing transaction latency and reducing the performance of the system. In the packet communications mechanism of the present invention, however, a request for access to a Line 24 is transmitted to the Line 24's Home Node 12H, which concurrently and in parallel both returns a response to the requester and forwards the request to the Line 24's Owner Node 12O by means of a forwarded request packet, thereby significantly reducing transaction latency.

An example of packet communications of the CBV coherency mechanism of the present invention is illustrated in FIG. 2A for an instance, as discussed above, wherein a Node 12, such as a Leaf Node 12L, generates a Request Packet 36A to requesting access to a Line 24 and communicates the Request Packet 36A to the Line 24's Home Node 12H. The Home Node 12H in turn responds to operation specified in the Request Packet 36A, generates and transmits a Response Packet 36B to the requesting Leaf Node 12L, and concurrently generates and transmits a Forwarded Request Packet 36C corresponding to the original Request Packet 36A to the Owner Node 12O of the Line 24. The Owner Node 12O of the Line 24 responds to the operation specified in the Forwarded Request Packet 36C, and generates and transmits a Response Packet 36B to the requesting Leaf Node 12L. Further examples and illustrations of the packet communications operations of the CBV coherency mechanism of the present invention will be described and illustrated in following detailed descriptions of operations of the CBV coherency methods of the present invention.

It must be noted with respect to the following descriptions of the packets of the packet communications mechanisms of the present invention that while the following descriptions discuss the contents of Request Packets 36A, Response Packets 36B and Forwarded Request Packets 36C in a present implementation, the following descriptions do not specify the formats of the packets as packet formats are implementation specific and are dependent upon the technologies and methods with Interconnect 14 is implemented. The adaptation and formatting of the packets of the present invention to various implementations of Interconnect 14 will be well understood by those of ordinary skill in the relevant arts, however, as will the adaptation of the packet communications mechanisms of the present invention to accommodate additional or different packet contents, or even different types of packets, to support additional of modified operations by Nodes 12.

Request Packets 36A are used to perform a variety of functions in the CBV coherency mechanism and methods of the present invention, including requesting certain access rights to a Line 24 as well as performing maintenance operations against the Line 24's global sharing state. Each Request Packet 36A include s encoded fields, described in FIG. 3A, which describe the operation that is being requested, and it will be understood that Request Packets 36A can also optionally include additional information that may be necessary to complete a request.

Certain of the contents of Request Packets 36A will be familiar to those of ordinary skill in the relevant arts, such as the identifiers of the targeting source Nodes 12, Target Node ID 38A and Source Node ID 38B, various commands fields, indicated as Command 38F, and a transaction identifier, Trans_ID 38D, which is encoding used by the original requester to match eventual responses with an original request.

Contents of a Request Packet 36A that are specific to the present invention include, for example, Requester Identifier (RQID) 38C, DIRECTORY 38H, NEWID 38I and Target Address 38E, definitions of which are provided in FIG. 3A. With regard to these contents, one of the features of the CBV coherency mechanisms and methods of the present invention is, as described above, a request forwarding mechanism that allows Nodes 12 to generate requests on behalf of another Node 12, that is, Forwarded Request Packets 36C. For this reason, the Source Node ID 38B of a Forwarded Request Packet 36C will contain an identifier of the Node 12 that generated the Forwarded Request Packet 36C, and not that of the Node 12 on whose behalf the request was made. Since an identifier of the original requester is eventually necessary to send a Response Packet 36A to the original requester, the identifier of the original requester must be provided in the Request Packet 36A, and is provided in RQID 36C so that the identifier of the original requester may be provided in the corresponding Forwarded Request Packet 36C. Although the RQID 36C is not needed for a direct request, the presently preferred implementation of the packet communications mechanism of the present invention uses the same packet format for both Request Packets 36A and Forwarded Request Packets 36C for simplicity. Therefore, RQID 36C is expected to be valid in all Request Packets 36A and Forwarded Request Packets 36C.

DIRECTORY 38H contains an encoded bit vector indicating the set of Nodes 12 that may have an encached copy of the Line 24 that is the subject of the request defined in the Request Packet 36A as is used, for example, when a current Owner Node 12O is evicting the Line 24 that is the subject of the request from the current. Owner Node 12O's cache. As will be described in further detail, the eviction of a Line 24 from the cache of the Owner Node 12O of the Line 24 requires that the ownership of the Line 24 be transferred to another Node 12, that is, to a next Owner Node 12O. The eviction of a Line 24 from its current Owner Node 12O, in turn, which requires providing the new Owner Node 12O with the sharing information for the Line 24 to update or modify the Vector 30V of the Line Tag 28O of the new Owner Node 12O.

NEWID 38I, again as will be described in detail in a subsequent description, is used by Nodes 12 to manipulate the PTR 30PH of the Line Tag 28H of a Home Node 12H which, as described, contains a pointer value identifying and pointing to the current Owner Node 12O of the associated Line 24. Such manipulations are performed, for example, when tearing down a Prepention Queue 32 associated with the Line 24, or when passing ownership of the associated Line 24 to a new Owner Node 12O.

Lastly considering TRANS_ID 38D and RQID 38C, the CBV coherency methods and mechanisms of the present invention prohibit Nodes 12 from issuing requests involving different global memory Lines 24 having the same TRANS_ID 38D. The requirement ensures that a combination of a RQID 38C and a TRANS_ID 38D in a given Request Packet 36A will be globally unique in an System 10 and can be used to identify all Request Packets 36A, Response Packets 36B and Forwarded Request Packets 36C associated with a particular transaction. In this regard, it should be noted that the CBV coherency methods and mechanisms of the present invention allows a Node 12 to have multiple outstanding requests with the same TRANS_ID 38D so long as all of the requests target the same global memory Line 24.

Next considering Response Packets 36B, as Request Packets 36A are processed they are ultimately answered with one or more Response Packets 36B wherein each Response Packet 36B includes status and possibly state information which is used by a Node 12 to determine when all the affects of a request issued by the Node 12 have taken effect. Referring to FIG. 3B, the Target Node ID 40A, Source Node ID 40B, Command 40F, Qualifier 40G, and TRANS_ID 40D of a Response Packet 36B all perform similar functions to the Target Node ID 38A, Source Node ID 38B, Command 38F, Qualifier 38G, and TRANS_ID 38D of Request Packets 36A. The sole exception is that the TRANS_ID 40D of a Response Packet 36B is unique with respect to the target Node 12 of the Response Packet 36B, as opposed to the RQID 38B in the instance of a Request Packet 36A. As in the instance of the DIRECTORY 38H of a Request Packet 36A, a Response Packet 36B may also include support information in a DIRECTORY/POINTER 40F wherein the use of a DIRECTORY/POINTER 40F depends on the response being provided. For example, in some cases the DIRECTORY/POINTER 40F is used to provide a copy of a bit mask indicating which Nodes 12 are suspected of having a copy of the Line 24 that is the subject of the Response Packet 36B, while in other cases the DIRECTORY/POINTER 40F is used to provide a Node 12 ID pointer value which the Node 12 receiving the Response Packet 36B may use to re-direct its requests. Further details of the uses of the DIRECTORY/POINTER 40F of Response Packets 36B are discussed in subsequent discussions, and it should be noted that while the CBV mechanisms and methods of the present implementation treats the DIRECTORY/POINTER 40F as a single field, other implementations of the present invention may map response fields to any packet format, with appropriate adaptations. A Response Packet 36B may also include RTYID 40G which, as described in following discussions, may be used by the recipient of a Request Packet 36A to instruct the sender of the Request Packet 36A to retry the request at a Node 12 identified in the RTYID 40G.

Lastly, a Forwarded Request Packet 36C is a hybrid of a Request Packet 36A and a Response Packet 36B and, for purposes of simplicity in the presently preferred embodiment of the CBV coherency methods and mechanisms of the present invention, is comprised of and includes the same contents as a Request Packet 36A, which have been described herein above.

As described herein above, the responsibility of tracking a Line 24's global sharing state is delegated to an Owner Node 12O possessing an encached copy of the Line 24 rather than being the responsibility of the Line 24's Home Node 12H and, as such, most Nodes 12 requesting access to a Line 24 will be required to interact with the Line 24's Owner Node 12O. Without optimizations, these transactions would suffer the sequential latency of requiring a Request Packet 36A pertaining to a Line 24 to be submitted to the Line 24's Home Node 12H, having the Home Node 12H return a Response Packet 36B identifying the Line 24's Owner Node 12O, and requiring the requester to submit the Request Packet 36A to the Line 24's Owner Node 12O. The CBV coherency methods and mechanisms of the present invention reduce transaction latencies by having the Home Node 12H of a Line 24 transmit a Forward Request Packet 36C to the Line 24's Owner Node 12O for each Request Packet 36A that the Home Node 12H receives that is directed to the Line 24. The use of Forwarded Request Packets 36C thereby unserializes the operations of generating Home Node 12H responses to requests and of communicating the requests to the appropriate Owner Nodes 12O.

Lastly with respect to Request Packets 36A, Response Packets 36B and Forwarded Request Packets 36C, it must be noted that the CBV coherency methods and mechanisms of the present invention include mechanisms and procedures for preventing deadlocks in completing transactions. For example, and as described above, Prepention Queues 32 maintain the order of transactions and only Home Nodes 12H are allowed to generate Forwarded Request Packets 36C. In addition, the CBV coherency methods and mechanisms of the present invention impose and enforce priorities between Request Packets 36A, Response Packets 36B and Forwarded Request Packets 36C to prevent deadlocks wherein Response Packets 36B are accorded the highest priority and Request Packets 36A are accorded the lowest priority. The assignment of these priorities thereby means that the processing of higher priority packets cannot be blocked by an inability to process lower priority packets.

Finally, and as will be apparent from the preceding and following descriptions, the CBV coherency methods and mechanisms of the present invention are implemented in a System 10 on a per node basis. That is, the mechanisms for performing the methods of the present invention may be implemented in all or only some of the nodes of a system, and is required only in those Nodes 12 which are to participate in line sharing. In addition, and as described, the functions and roles of each Node 12 in a System 10 are determined on a per Line 24 basis, so that any Node 12 which is to participate in line sharing in a System 10, that is, any Node 12 in which the mechanisms of the present invention are implemented, may assume the roles of a Home Node 12H, a Leaf Node 12L or an Owner Node 12O. As such, the mechanisms of the present invention that are implemented in any Node 12 of a System 10 are identical for all Nodes 12 in which they are implemented. It will therefore be apparent that the Nodes 12 of a System 10 that participate in line sharing may be readily expanded by adding Nodes 12 in which the mechanisms of the present invention are implemented, or by adding the mechanisms of the present invention to the existing nodes of a System 10. It will also be apparent that the mechanisms of the present invention are effectively independent of the specific form of the nodes of a System 10 and of the configuration and operation of other mechanisms of a System 10, including the Interconnection 14, so that the present invention may be readily implemented into any System 10.

B. Examples of Basic CBV Coherency Transactions

Having described the CBV coherency mechanisms and methods of the present invention above, the following will illustrate the operation of the CBV coherency mechanisms and methods of the present invention by means of descriptions of various Line 24 read transactions that may be implemented in the exemplary System 10 described herein above. Each exemplary transaction will be described by a brief discussion of each step of the transaction, together with a diagram of the transaction illustrating the operating states, operations and inter-node communications executed in each transaction.

In this regard, it must be noted that as described herein above, the roles of each of Nodes 12 in an System 10 are determined on a Line 24 basis. That is, at any given time a Node 12 may be a Home Node 12H for one Line 24, a Leaf Node 12L for another Line 24, and an Owner Node 12O for yet another Line 24, but will fulfill only one of these roles for a given Line 24 at any given time. A given Line 24, in turn, and at any given time, will have a single Home Node 12H, may have a single Owner Node 12O, and may have no Leaf Nodes 12L, a single Leaf Node 12L or a plurality of Leaf Nodes 12L. In addition, and with the exception that the Home Node 12H of a given Line 24 will remain the Home Node 12H of the Line 24, the relationship between a given Node 12 and a given Line 24 may change at any time during the operation of the methods and mechanisms of the present invention.

As such, a role being fulfilled by a Node 12, its current function or operation, and its relationship or relationships with one or more Lines 24 and other Nodes 12 is explicitly described by the state of the Node 12 at a given point in the transaction. That is and for example, the role, function and relationships of a Node 12 is clearly defined by whether the Node 12 is in the MS_HOME 30SHA, MS_FRESH 30SHB, MS_GONE 30SHC, CS_COWNER 30SOA, or CS_DOWNER 30SOB state, or other state as defined herein, as well as by a designation that a Node 12 is, for example, a Home Node 12H. For this reason, the function, role and operation of each Node 12 appearing in the following described operations, and its relationship with one or more Lines 24 and other Nodes 12, may be represented in the figures accompanying and illustrating the following discussions by a designation of the state of each Node 12 at each step of a transaction as an alternative to a designation of a Node 12 as, for example, a Home Nodes 12H, Owner Nodes 12O, Leaf Nodes 12L or Nodes 12.

It must also be noted that, as will be described in detail in following discussions, many of the operations performed by the mechanisms of the present invention and according to the methods of the present invention begin with a requesting node communicating a request to the Home Node 12H of the Line 24 that is the target of the request. It will also be noted that upon the first attempt by a given Node 12 to access a given Line 24, the Node 12 will typically not have information identifying the Home Node 12 of the Line 24, and that while the Node 12 will typically have information identifying at least the suspected Owner Node 12O of that Line 24 at the start of subsequent requests to that Line 24, the Node 12 will typically not have an identification of the Home Node 12H, except in transitory conditions. It will be understood by those of ordinary skill in the relevant arts that there are a number of methods for communicating a request from a node of a system to another, unknown node of the system.

In the presently preferred embodiment of a System 10 and of the present invention, for example, the method for determining the identification, or location, of a Home Node 12H is a method well known in the prior art. In this method, each Node 12's memory space is partitioned into one or more contiguous memory regions wherein the Line 24 address range of each region is established at the System 10 boot time and remains static for the System 10 uptime. Thereafter, the Nodes 12 determine the identification of a Line 24's Home Node 12H by either performing a series of range tests or indexing into a mapping table using the target Line 24's address rounded to a pre-defined granularity.

In further example, a given node or each node may be provided with a directory of the Home Node 12H of each of the Lines 24. Given the potentially very large number of Lines 24, however, this method may require an unacceptable or undesired amount of storage space for such directories and an excessive amount of Interconnect 14 resources to construct and maintain the directories. It will be recognized, however, that the number of Nodes 12 in a System 10 will be relatively small, particularly in comparison to the number of Lines 24, and as such another method is to simply broadcast each request that is directed to a Home Node 12H to all of the Nodes 12 of the System 10, with only the Home Node 12H of the Line 24 that is the target of the request accepting and acting upon the request. It will be appreciated that this method effectively requires no additional storage space in the Nodes 12, and that the additional communications through Interconnect 14 may be significantly less than that required to construct and maintain directories of the Home Node 12H of each of the Lines 24.

It will be understood by those of ordinary skill in the art that any of these methods of the prior art may be adapted for use in the present invention, and that adaptation of such methods to the present invention will be apparent and well understood by those of ordinary skill in the relevant arts. It will also be recognized that the method used to determine the identify or location of a Home Node 12H is not central or essential to the present invention. As such, this aspect of the operation of the present invention will not be discussed in further detail herein, and it is assumed that a method for communicating requests to Home Nodes 12H that is preferable for a given implementation of a System 10 will adopted and implemented in the System 10 of the following discussions.

1. Simple Read Access Request (FIGS. 4A and 4B)

In this example, illustrated in FIGS. 4A and 4B, it is assumed that a Line 24 that is the target of a read request is currently not encached by any "far" Nodes 12 in the exemplary System 10, that is, only the Line 24's Home Node 12H possesses a copy of the Line 24. While in this global state, one of the "far" Nodes 12 in the System 10 requests a read only copy of the Line 24. The requesting Node 12 starts this process by transitioning to the transient CS_PENING_RL 42A state and sending a read Request Packet 36A to the Home Node 12H.

Upon receiving the request the Line 24's Home Node 12H changes to the MS_FRESH 30SHB state, updates its PRT 30PH to the identification of the requesting Node 12, and transmits a Response Packet 36B with a copy of the Line 24 and an indication that the requesting Node 12 is now the Line 24's Owner Node 12O. Once the requesting Node 12 receives the Response Packet 36B, the requesting Node 12 becomes the Owner Node 12O of the Line 24, whereupon the Line 24 may be read locally and the requesting Node 12, now the Owner Node 12O, terminates in the CS_COWNER 30SOA state.

2. Read Access Request to a Read-Shared Line 24 (FIGS. 5A–5F)

The next example begins from the ending state of the previous example, when yet another far Node 12 also requests a read only copy of the Line 24, which is already encached in the first requesting Node 12, which is at this point the Owner Node 12O of the Line 24. As in the previous example and as indicated in FIG. 4B1, the new requesting Node 12 transitions to the CS_PENDING_RL 42A state and transmits a Request Packet 36A requesting a read only copy of the Line 24 to the Line 24's Home Node 12H. In this instance, the Home Node 12H does not need to change its state since the current state of MS_FRESH 30SHB already represents the fact that the Home Node 12H's copy of the Line 24 is valid and read-only shared with at least one other Node 12, that is, the previously requesting Node 12 that is currently the Owner Node 12O of the Line 24.

In this case, the Home Node 12H again updates its PRT 30PH to identify the requesting Node 12 and, as indicated in FIG. 4B2, responds with a Response Packet 36B with a copy of the Line 24. Since an Owner Node 12O already exists for the Line 24, however, that is, the previously requesting Node 12, the Home Node 12H first it sends a Forwarded Request Packet 36C to the Owner Node 12O indicating that the Node 12 corresponding to the identifier in the Request Packet 36A's RQID 38C, that is, the presently requesting Node 12, now has an encached copy of the Line 24 and should be added to the directory of Nodes 12 possessing a copy of the Line 24 maintained in the Owner Node 12O's Vector 30V. In addition, and because the Home Node 12H's copy of the Line 24 is valid, the Home Node 12H sends a Response Packet 36B to the current requesting Node 12 informing the requesting Node 12 that the Home Node 12H is providing data, that is, a copy of the Line 24, but that a Forwarded Request Packet 36C was also sent to an Owner Node 12 of the Line 24.

As indicated in FIG. 4B3, when the requesting Node 12 receives the Home Node 12H's Response Packet 36B the requesting Node 12 encaches the copy of the Line 24, which may now be read, and transitions through a clean-up state, indicated as CS_LEAF_CLEANUP 42B, to complete the original transaction locally. The requesting Node 12 also records the receipt of the Response Packet 36B from the Home Node 12H, and waits for a Response Packet 36B from the Line 24's Owner Node 12O. In this regard, it should be noted that allowing the Home Node 12H to provide a copy of the Line 24 to the requesting Node 12 minimized the latency of accessing the Line 24, in this instance, to only two Interconnect 14 communications, that is, the Request Packet 36A from the requesting Node 12 to the Home Node 12H and the Response Packet 36B from the Home Node 12H to the requesting Node 12. When the Owner Node 12O receives the Forwarded Request Packet 36C, the Owner Node 12O it simply marks the associated bit in the directory in the Vector 30V, and sends a Response Packet 36B to the requesting Node 12 indicating that the requesting Node 12's copy of the Line 24 is now being tracked.

As illustrated in FIG. 4B5, after receiving the Owner Node 12O's Response Packet 36B the requesting Node 12 changes state and saves the identifier of the Owner Node 12O in its PTR 30PL. The requesting Node 12 must then send a Request Packet 36A to the Line 24's Home Node 12H in order to return that PTR 30PL value back to that of the Line 24 Owner Node 12O, which is accomplished by supplying the identifier of the Owner Node 12O in the Request Packet 36A NEWID 38I. When the Home Node 12H receives the Request Packet 36A, the Home Node 12H checks the current value of its PTR 30PH to see if it is equal to the identifier of the requesting Node 12. If this check is successful, the Home Node 12H updates its PTR 30PH value with the identifier of the Owner Node 12O supplied in the Request Packet 36A's NEWID 38I, transitions through the CS_LEAF_CLEANUP 42B state to complete the transaction locally, and then responds with a Response Packet 36B indicating that the PTR 30PH update completed successfully.

As illustrated in FIG. 4B6, after receiving the Response Packet 36A indicating the successful completion of the update from the Home Node 12H the requesting Node 12 transitions to the stable CS_LEAF 42C state and terminates all processing. This final state transition of the requesting Node 12 is illustrated as an operation wherein the requesting Node 12, which is now a Leaf Node 12L, moves beneath the CS_COWNER 30SOA state in conformance with the notation used herein for representing the sharing free.

It will be noted with regard to this example that multiple request and response packets were required to add the requesting Node 12 to the directory maintained in Vector 30V of the Owner Node 12O and to return the Home Node 12H's PTR 30PH value to its original value. While the number of packets may seem excessive in the context of this example, later descriptions of operations of the present invention will justify the above illustrated uses of request and response packets and it should be noted that, despite the need to communicate multiple request and response packets, the Line 24 was available to the requesting Node 12 after only two Interconnect 14 communications.

3. Modification Request to a Read-Shared Line 24 (FIGS. 6A–6F)

Again beginning from the final state of the previous example, the present example describes the case wherein yet another far Node 12 requests access to the same Line 24, but in this example the requesting Node 12 requests write access to modify the Line 24 and the Line 24 is, as described above, shared by other Nodes 12.

As illustrated in FIGS. 6A–6F, the transaction begins with the requesting Node 12 transitioning to a read invalidate pending state, CS_PENDING_RIL 42D, and sending a read-invalidate Request Packet 36A to the Home Node 12H. Upon receiving the Request Packet 36A, the Home Node 12H invalidates its copy of the Line 24 and changes its state from MS_FRESH 30SHB, indicating that a non-home Node 12 has a read-shared copy of the Line 24 so that the Home Node 12H copy is read-only, to MS_GONE 30SHC, indicating that the Home Node 12H's copy of the Line 24 is or will be invalid. The Home Node 12H saves the identifier of the requester in its PTR 30PH and concurrently sends a Forwarded Request Packet 36C to the Owner Node 12O indicating that the new requester is invalidating the Line 24. The Home Node 12H also transmits a Response Packet 36C to the requesting Node 12 with a copy of the Line 24 and an indication that a Forwarded Request Packet 36C was sent to the Owner Node 12O. When the invalidate Request Packet 36A reaches the Line 24's Owner Node 12O, the Owner Node 12O also invalidates its copy of the Line 24 and transmits a Response Packet 36C containing a copy of the current Vector 30V directory value to the requesting Node 12. After responding, the Owner Node 12O saves the identifier of the requesting Node 12 from the Forwarded Request Packet 36C RQID 38C in its PTR 30PO and changes to a CS_INVALID_SPEC 42E state. The CS_INVALID_SPEC 42E indicates that the Owner Node 12O copy of the Line 24 is invalid and allows the Owner Node 12O to send a speculative Request Packet 36A to the invalidator, that is, the requesting Node 12, if the Owner Node 12O desires to regain access to the Line 24. When the requesting Node 12 receives the Response Packet 36B from the previous Owner Node 12O, the requesting Node 12 changes state to the CS_DO_INVALIDING_SPEC 42F state and sends invalidate leaf Request Packets 36A to each of the Node 12s marked in the copy of the Vector 30V directory received from the previous Owner Node 12O.

As the Leaf Nodes 12L receive the invalidate leaf Request Packets 36A sent by the requesting Node 12, each Leaf Node 12L invalidate its copy of the Line 24 and returns a Response Packet 12B to the requesting Node 12. In this regard, it should be noted that it is possible that some or all of the Vector 30V directory information is stale due to the loose coupling between the Owner Node 12O and the Leaf Nodes 12L, as discussed previously. The Nodes 12 which receive an invalidate leaf Request Packet 36A and that do not have a copy of the Line 24, however, respond to the invalidate leaf Request Packet 36A by transmitting a Response Packet 36B indicating that they do not have a copy of the Line 24. As in the previous Owner Node 12O, each Leaf Node 12L having a copy of the Line 24 saves the identifier of the requesting Node 12 in its PTR 30PL and changes to the CS_INVALID_SPEC 42E state. The receipt by the requesting Node 12 of a Response Packet 36B from each of the Leaf Nodes 12L having a set bit in the copy of the Vector 30V directory received by the requesting Node 12 from the previous Owner Node 12O indicates to the requesting Node 12 that all copies of the Line 24 except that residing in the requesting Node 12 have been invalidated, and that he requesting Node 12 can modify the Line 24.

It will be noted that in this transaction, and unlike the previously described transaction, there is no need to restore the Home Node 12H's PTR 30PH to its original value as the requesting Node 12 in this case ultimately becomes the Line 24's Owner Node 12O. It should also be noted that if the Vector 30V directory originally provided to the requesting Node 12 by the previous Owner Node 12O did not contain any set bits, the requesting Node 12 has the immediate right to update the Line 24 as no other Nodes 12 possess valid copies of the Line 24.

4. Read Request to a Modified Line 24 (FIGS. 7A–7F)

This example, which is illustrated in FIGS. 7A–7F, considers the case of a yet another Node 12 requesting access to the same Line 24 as the previous examples, that is, a Line 24 which has been read accessed by a Node 12 which did not share access to the Line 24, read shared, and write modified by yet another Node 12.

This example again begins at the final state of the previous example and again begins with the requesting Node 12 transitioning to a new state, CL_PENDING_RL 42A, and sending a read access Request Packet 36A to the Line 24's Home Node 12H. In this instance, however, the Home Node 12H cannot provide the Line 24 as the copy of the Line 24 held by the Home Node 12H was invalidated by the previous write modify transaction, so there is no reason for the Home Node 12H to respond to the read access Request Packet 36A. Instead, the Home Node 12H it saves the identifier of the requesting Node 12 in its PTR 30PH and sends a Forwarded Request Packet 36C to the Owner Node 12O.

Upon receiving the Forwarded Request Packet 36C, the Owner Node 12O sets the Vector 30V directory bit associated with the requesting Node 12, and responds with a Response Packet 12B containing a copy of the Line 24 and an indication that the requesting Node 12 is now a Leaf Node 12L. Once the requesting Node 12 receives the response Packet 36B, the requesting Node 12 installs the Line 24 into its cache to be locally available, and issues a Request Packet 36A to the Line 24's Home Node 12H to return the Home Node 12H PTR 30PH to the identifier of the Line 24's Owner Node 12O.

The final completion sequence of this transaction is basically the same the example of a read Request Packet 36A to a read-shared Line 24 as described above. The Home Node 12H changes its PTR 30PH to the value supplied in the NEWID 381 of the requesting Node 12's Request Packet 36A and returns a Response Packet 36B to the requesting Node 12 to confirm that the PTR 30PH update succeeded. The requesting Node 12 then completes the transaction by changing to the CS_LEAF 42C state and storing the identifier of the Owner Node 12O in its PTR 30PL.

It will be noted that in this transaction the latency for the requesting Node 12 to receive a copy of Line 24 was three Interconnect 14 transactions and that while this is 50% more than the latency for read-shared Line 24s, the use of Forwarded Request Packets 36C avoid doubling the latency in such transactions. It should also be noted that in the presently preferred implementation of the invention the Home Node 12H's copy of the Line 24 is not updated, that is, although the Line 24 is read shared by two caching Nodes 12 the Home Node 12H does not have access to the Line 24. Other implementations of the present invention, however, may update the Home Node 12H's copy of the Line 24.

Having described certain basic CBV coherency transactions of the methods and mechanisms of the present invention, the following will next describe the CBV coherency transactions of the methods and mechanisms of the present invention through descriptions of further, more complex transactions.

C. Detailed Descriptions of CBV Coherency Transactions and Mechanisms

With regard to the following discussions, and as described herein above, a role being fulfilled by a Node 12, its current function or operation, and its relationship or relationships with one or more Lines 24 is explicitly described by the state of the Node 12 at a given point in the transaction. That is and for example, the role, function and relationships of a Node 12 with Lines 24 and other Nodes 12 is clearly defined by whether the Node 12 is in the MS_HOME 30SHA, MS_FRESH 30SHB, MS_GONE 30SHC, CS_COWNER 30SOA, or CS_DOWNER 30SOB state, or other state as defined herein. Stated another way, the role, function and relationships of a Node 12 is as explicitly described by the state of the Node 12 as by a statement or designation that the Node 12 is a Home Node 12H, Owner Node 12O, Leaf Node 12L or requesting Node 12. For this reason, the function, role and operation of each Node 12 appearing in the following described operations and its relationship with one or more Lines 24 and other Nodes 12 is generally represented in the figures accompanying and illustrating the following discussions by a designation of the state of each Node 12 at each point in the transactions rather than by their changing designations as Home Nodes 12H, Owner Nodes 12O, Leaf Nodes 12L or Nodes 12.

1. Detailed Discussion of Prepention Queues 32 (FIGS. 8A–8J)

As discussed previously, the CBV coherency mechanisms of the present invention include mechanisms, referred to as Prepention Queues 32, for guaranteeing correctness and forward progress of transactions and as a distributed mechanism for avoiding the creation of "hot nodes", that is, Nodes 12 having an excessive number of pending transactions. A Prepention Queue 32 is a singly linked list of Nodes 12, all of which are concurrently trying to gain access to the same Line 24, and is created by the normal behavior of the Line 24's Home Node 12H while processing requests. A Prepention Queue 32 for a Line 24 exists only when the arrival rate of access requests to a Line 24 exceeds the rate at which the requests complete.

With regard to the creation of a Prepention Queue 32, it has been described herein above that when a Home Node 12H receives an access request for a Line 24 that already has an Owner Node 12O, the Home Node 12H will update its State 30SH and PTR 30PH values accordingly and will then create a request Forwarded Request Packet 36C on behalf of the requesting Node 12 wherein the Forwarded Request Packet 36C will contain the identify of the requesting Node 12. It has also been described that if the requesting Node 12 does not ultimately become the Line 24's Owner Node 12O, it must later, that is, at the completion of the request, issue a request to the Home Node 12H to return the Home Node 12H's PTR 30PH value back to the identifier of the Line 24's Owner Node 12O. As such, during the period between the receiving of a request by a Home Node 12H and the completion of the request, the Home Node 12H's PTR 30PH identifies the requesting Node 12 rather than the Owner Node 12O of the Line 24.

As described, a Prepention Queue 32 is created if a Home Node 12H receives one or more additional access requests during the interval while one or more preceding requests are uncompleted and while, as a consequence, the Home Node 12H's PTR 30PH does not point to the Owner Node 12O but instead points to the Node 12 submitting the immediately preceding request. When this condition occurs, that is, a Home Node 12H receives one or more requests while one or more preceding requests are uncompleted, the Home Node 12H continues to create corresponding Forwarded Request Packets 36C but sends each Forwarded Request Packet 36C to the Node 12 identified by the Home Node 12H's current PTR 30PH. As such, only the Forwarded Request Packet 36C for the "first" racing request of the sequence of requests will be sent to the Line 24's Owner Node 12O because the Home Node 12H's PTR 30PH is updated for each request and, when a request is newly received, contains the identification of the Node 12 which submitted the preceding request, which will at that time be uncompleted. As a result, each Forwarded Request Packet 36C will be sent to the Node 12 whose request was previously processed by the Home Node 12H, rather than to the Line 24's Owner Node 12O, and the RQID 38C of the Forwarded Request Packet 36C will contain the identification of the Node 12 currently submitting a new request for the Line 24. That is, and stated another way, each Forwarded Request Packet 36C resulting from a request in a sequence of access requests for a Line 24 will be forwarded to the Node 12 submitting the immediately preceding request in the sequence and will identify the Node 12 submitting the current request, that is, the next request in the sequence. This forwarding of Forwarded Request Packets 36C to the preceding requesting Node 12 thereby creates a linked list of Nodes 12 requesting access to the Line 12, that is, a Prepention Queue 32, wherein the Prepention Queue 32 is distributed across the Nodes 12 with each Node 12 being linked to the next following Node 12 by the identification of that Node 12 in the corresponding Forwarded Request Packet 36C.

As also described previously herein, another requirement of the methods and mechanisms of the present invention is that all previous requests to a Line 24 complete before a subsequent request can complete. In accordance with this requirement, when a Forwarded Request Packet 36C generated as a result of a sequence of requests for a Line 24 is received by the Node 12 to which it is directed, the Node 12 receiving the Forwarded Request Packet 36C responds by returning a retry Response Packet 36B to the Node 12 identified in the Forwarded Request Packet 36C if the Node 12 receiving the Forwarded Request Packet 36C has not yet completed its own request. As just described, each Response Packet 36B generated as a part of the creation of a Prepention Queue 32 is directed to the Node 12 submitting the new request and contains the identification of the Node 12 submitting the immediately preceding request. As a result, all retry Response Packets 36B are directed towards the requesting Node 12 that was the source of the new request, rather than to the Line 24's Home Node 12H, and the requesting Node 12 will typically generate a retry Request Packet 36A to the Node 12 immediately preceding the requesting Node 12 in the Prepention Queue 32, that is, to the Node 12 submitting the immediately preceding request directed to that Line 24. Each requesting Node 12 that is in a position in the Prepention Queue 32 lower the requesting Node 12 whose request is being acted upon will thereby enter a "spin loop"of sending retry Request Packets 36A to the Node 12 immediately ahead of the Node 12 in the Prepention Queue 32, each one of which will be answered with a retry Response Packet 36B until the immediately preceding Node 12 in the Prepention Queue 32 has completed its request. When the Node 12 immediately ahead of a given Node 12 in the Prepention Queue 32 has completed its request, the next retry Request Packet 36A of the given Node 12 will be directed to the Owner Node 12O for execution. The Nodes 12 in the Prepention Queue 32 will thereby make forward progress through the Prepention Queue 32 as the preceding requests are completed. Lastly, a Prepention Queue 32 is destroyed when the last Node 12 in the Prepention Queue 32 finally completes its request and either becomes the Line 24's Owner Node 12O or returns the Home Node 12H's PRT 30PH value back to the identifier of the Owner Node 12O.

It will be noted from the above discussions that the order of the Nodes 12 in the Prepention Queue 32 is determined by the order in which their respective requests were processed by the Home Node 12H and that the order of the Nodes 12 in a Prepention Queue 32 are automatically maintained by the Prepention Queue mechanism. That is, each Node 12 in a Prepention Queue 32 is linked to the preceding Node 12 as the Prepention Queue 32 is constructed and all Request Packets 36A of a Node 12 may be communicated only to the immediately preceding Node 12 in the Prepention Queue 32, thereby preventing reordering of the Prevention Queue 32.

Referring again to FIG. 2A and in summary, it will also be apparent from the above descriptions of Prepention Queues 32 that Prepention Queues 32 are not comprised of elements separate from or additional to the Nodes 12 in the Prepention Queues 32 but are effectively comprised of the Nodes 12 in the Prepention Queues 32. That is, and as described, each Node 12 in a Prepention Queue 32 is represented by a Pending Request (Pending) 34 and each Pending 34 is comprised of a Line Tag 34Q that includes a State Value (State) 34S, which is the current State 30SH or State 30SL of the corresponding Node 12, and a Pointer (PTR) 34P, which is the current PTR 30PH or PTR 30PL. Each Line Tag 34Q is thereby comprised of the Line Tag 28H or 28L of the corresponding Node 12, which is resident in the corresponding. Node 12, so that each Pending 34 is, in fact, comprised of the Node 12 represented by the Pending 34.

It will therefore be recognized that, in accordance with the above descriptions of Prepention Queues 32, that the membership of a Node 12 in a Prepention Queue 32 is a matter of, and determined by, the values of the State 30S and PTR 30P values of the Node 12. That is, whether a Node 12 is a member of a Prepention Queue 32 is determined by whether the State 30S value represents a request retry state and whether the PTR 30P value, which represents the Node 12 to which Request Packets 36A are to be sent, is an identifier of the preceding Node 12 in the Prepention Queue 32 rather than, for example, the identifier of a Line 24's Home Node 12H or Owner Node 12O. As described, the State 30S and PTR 30P values of a requesting Node 12 are determined by the response to a request provided from the target Line 24's Home Node 12H, so that the creation of a Prepention Queue 32 and the placing of a Node 12 into a Prepention Queue 32 are operations resulting automatically from the normal state and response functions of a Home Node 12H. In a like manner, the exit of a Node 12 from a Prepention Queue 32 may result automatically from the normal state and response functions of a Home Node 12H, or without interaction with the Home Node 12H as a result of the normal state and response functions of another Node 12 or Nodes 12 that are or were sharing access to the Line 24, such as that of a Node 12 that invalidates a Line 24 and, in the process, becomes the Owner Node 12O of the Line 24. It will therefore be apparent that the implementation of Prepention Queues 32 requires no additional or separate elements in the System 10 or in the Nodes 12 than are implemented in the Nodes 12 in implementing the methods and mechanisms of the present invention.

It will also be understood from the above descriptions that the Prepention Queue 32 mechanisms of the present invention guarantees correctness and coherency among versions of each Line 24 by ensuring that all affects for previous requests for a Line 24 are globally visible before subsequent requests for the Line 24 are allowed to continue by requiring that each preceding request completes before a next request may begin. In addition, and because Nodes 12 are not allowed to change their order in a Prepention Queue 32, each Node 12 is guaranteed to eventually complete its request. Finally, and because each Node 12 in a Prepention Queue 32 "spins" against the Node 12 immediately preceding the Node 12 in the Prepention Queue 32, the resulting retry traffic is distributed throughout the system instead of being focused in a single Node 12, such as a Home Node 12H. The methods and mechanisms of the present invention, and in particular Prepention Queues 32, also support a processor consistency memory model in which all writes to a Line 24 must be globally seen in the same order in which they are generated. In order to maintain this memory model, the methods and mechanisms of the present invention require all requests to gain write access to a Line 24 to be sent to the Line 24's Home Node 12H, thereby ensuring that all racing requests to modify a Line 24 will be placed into a Prepention Queue 32 for the Line 24 and will therefore complete correctly. The blocking nature of Prepention Queues 32 also ensures that the affect of a Line 24 modification request are globally visible before subsequent modification requests can complete, thereby completing the requirements for a processor consistency memory model.

Referring now to FIGS. 8A–8J, therein is illustrated an example of the creation and eventual teardown of a Prepention Queue 32 in conformance with the above descriptions of Prepention Queues 32. The example begins with a read shared Line 24 having an Owner Node 12O but no Leaf Nodes 12L, whereupon three Nodes 12 will request read access to the Line 24.

As shown in FIGS. 8A–8J, the first Node 12 sends a Request Packet 36A requesting access to the Line 24 to the Line 24's Home Node 12H, whereupon the Home Node 12H will send a Forwarded Request Packet 36C to the Line 24's Owner Node 12O. The second and third Nodes 12 then also transmit read Request Packets 36A to the Home Node 12H. For purposes of the present illustrative example, it is assumed that the Forwarded Request Packet 36C resulting from the request of the first Node 12 is delayed in its communication to the Owner Node 12O because of Interconnect 14 congestion. It is further assumed, again for purposes of the present example, that the subsequent requests of the second and third Nodes 12 are not delayed, so that there will be multiple pending requests directed to the Line 24 and, as a result, the Home Node 12H will be required to create a Prepention Queue 32.

It will be understood from the above discussions of Prepention Queues 32 that at this point in the transactions each Node 12's request has been received by the Home Node 12H, that the Home Node 12H has responded to each Request Packet 36A by providing a copy of the Line 24 to the requesting Node 12, and that each of the three requests has been forwarded to a different target Node 12 through a corresponding Forwarded Request Packet 36C. More specifically, the first Node 12's Forwarded Request Packet 36C has been sent to the Home Node 12H but, due to the Interconnect 14 congestion, the first Node 12's request does not make forward progress and cannot go to completion. The second Node 12's Forwarded Request Packet 36C has been sent to the first Node 12, which has responded with a retry Response Packet 36B to the second Node 12 and the second Node 12's request is stalled, or held, in a "spin loop" against the firs Node 12. The third Node 12's Forwarded Request Packet 36C has been sent to the second Node 12, which has responded with a retry Response Packet 36B to the third Node 12 and the third Node 12's request is stalled, or held, in a "spin loop"against the second Node 12.

Eventually, the Interconnection 14 congestion will cleared, the first Node 12's request will be received by the Owner Node 12O and will complete, and the first Node 12 will be added to the Vector 30V directory in the Owner Node 12O. The first Node 12 will then attempt to update the Home Node 12H's PTR 30PH, as described previously, but will not be able to update the PTR 30PH because the Home Node 12H's PTR 30PH no longer references the first Node 12.

While trying to update the Home Node 12H's PTR 30PH, the first Node 12 will receive a retry Request Packet 36B from the second Node 12 in the Prepention Queue 32. The first Node 12 will again retry the second Node 12's request, but for this retry attempt will respond to the retry Request Packet 36A with a Response Packet 36B instructing the second Node 12 to send its next Request Packet 36A to the Line 24's Owner Node 12O by inserting the identifier of the Owner Node 12O in the RTYID 40G of the Response Packet 36B. As described, the purpose of RTYID 40G, which is used in all retry Response Packets 36B, is to instruct Nodes 12 receiving a nullify response in a Response Packet 36B the identifier of a Node 12 where they should send their next Request Packet 36A. As a result of receiving a retry Response Packet 36B identifying the Owner Node 12O rather than the first Node 12 as the destination of the next retry Request Packet 36A transmitted by the second Node 12, the second Node 12 will send the next retry Request Packet 36A to the Line 24's Home Node 12H, whereupon the second Node 12's request will be completed.

After the second Node 12's request is completed, the third Node 12's request will be forwarded to the Owner Node 12O in the same manner as the second Node 12's request. That is, the second Node 12 will, upon completion of the second Node 12's request, redirect the next third Node 12's retry Request Packet 36A from the second Node 12 to the Owner Node 12O by inserting the Owner Node 12O identifier into the TRYID 40G of the next Response Packet 36B from the second Node 12 to the third Node 12. The third Node 12's request will then be completed and, as the last Node 12 in the Prepention Queue 32, the third Node 12 will return the Home Node 12H's PTR 20PH value to the identifier of the Owner Node 12O, just as if the Prepention Queue 32 had never existed.

It must be noted that although the request contention resolved and managed by the Prepention Queue 32 resulted in all three Nodes 12's requests taking a longer amount of time to complete than would have been required without the contention resolution, it did not impact the three Node 12's latencies in obtaining a copy of the Line 24. That is, the Home Node 12H provided a copy of the Line 24 to the requesting Node 12 upon receiving each request, and before forwarding a corresponding Forwarded Request Packet 36C. Therefore the latency to obtain access to the Line 24 remained at two Interconnect 14 communications for all three Nodes 12, assuming that the Interconnect 14 latency, that is, congestion, that blocked the first Node 12's request did not delay the Home Node 12H's responses to each requester.

Figure 9A:
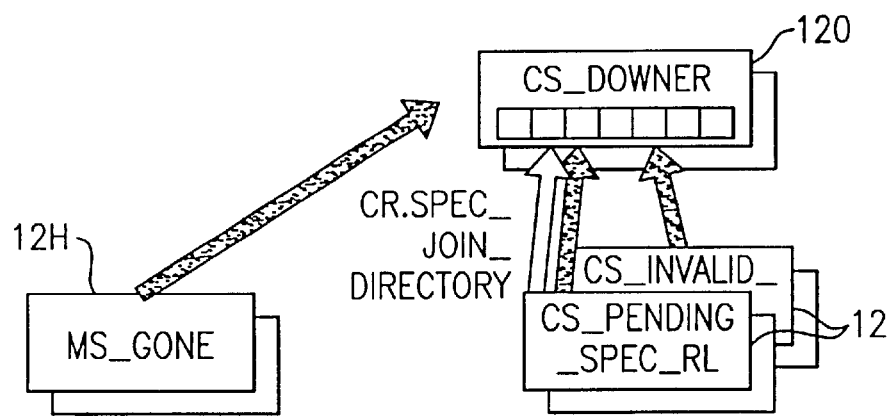
FIGS. 9A–9C illustrate speculative read requests.
Figure 9B:
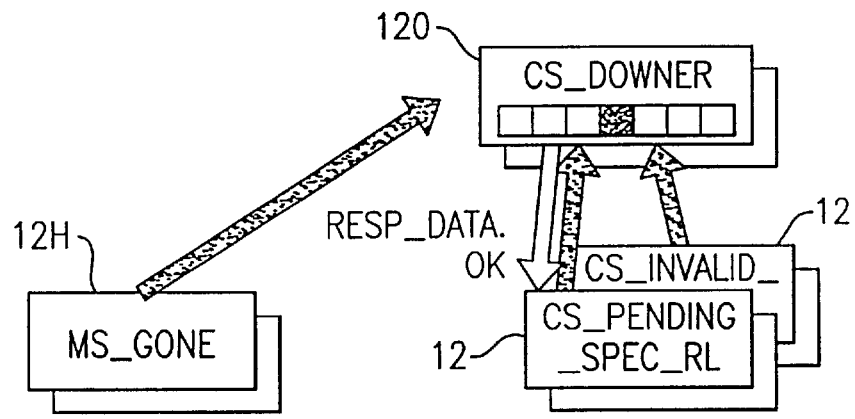
Figure 9C:
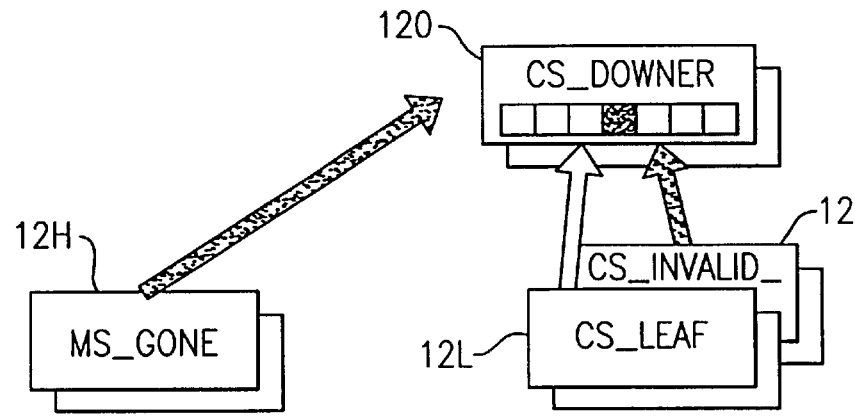
Figure 10A:
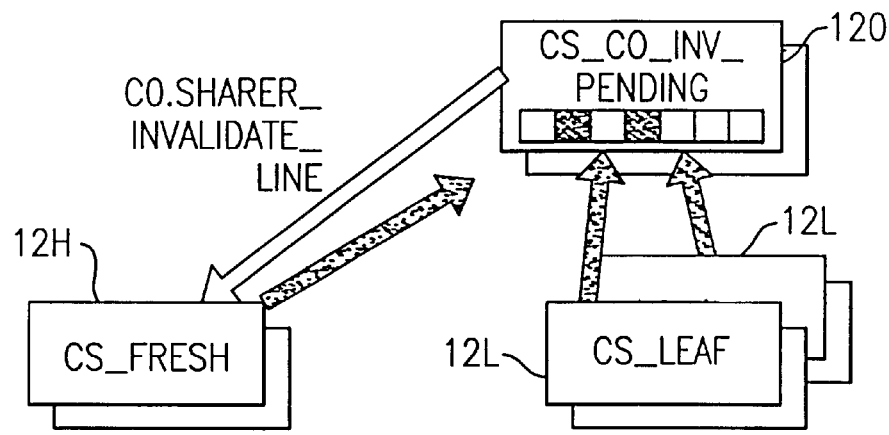
FIGS. 10A–10E illustrate gaining write-access from an owner node.
Figure 10B:
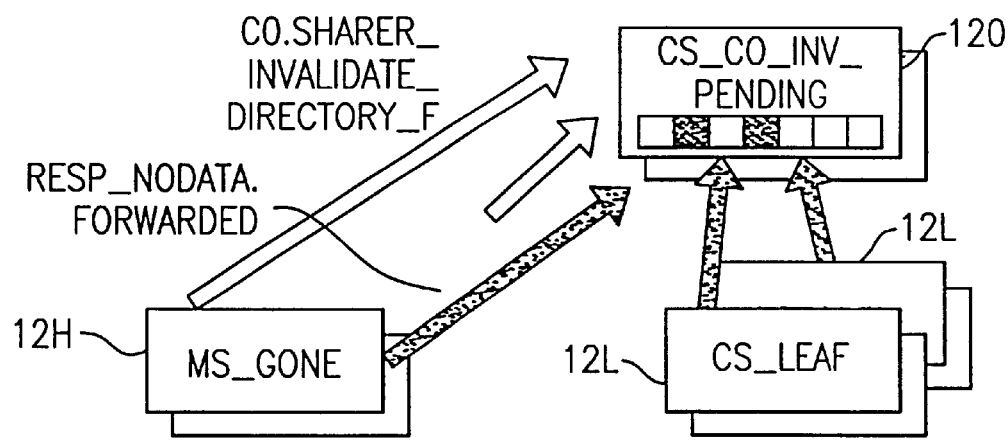
Figure 10C:
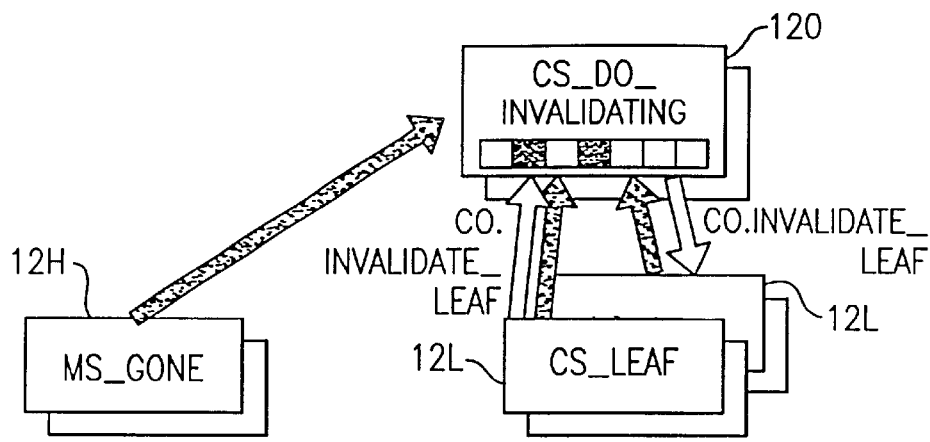
Figure 10D:
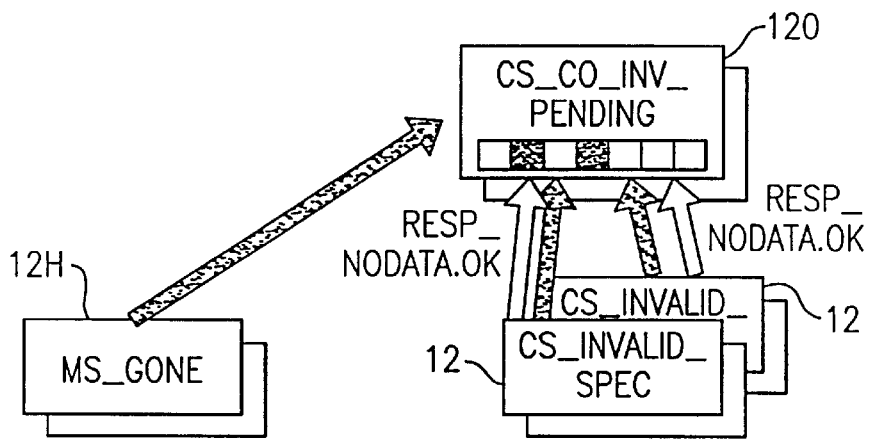
Figure 10E:
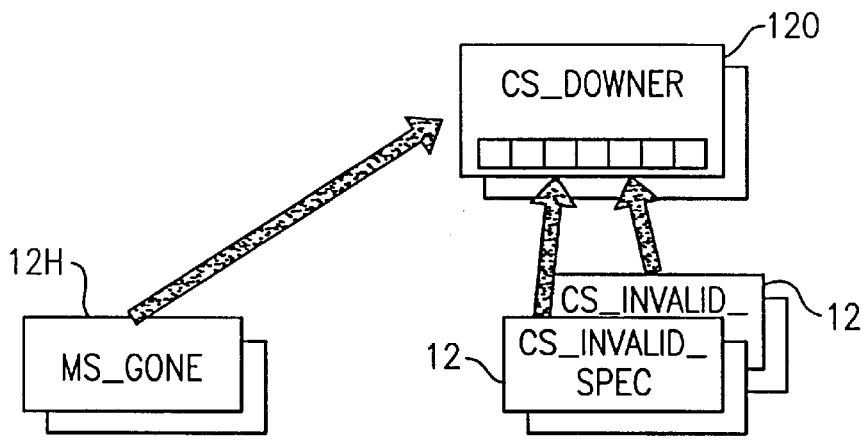
Figure 11A:
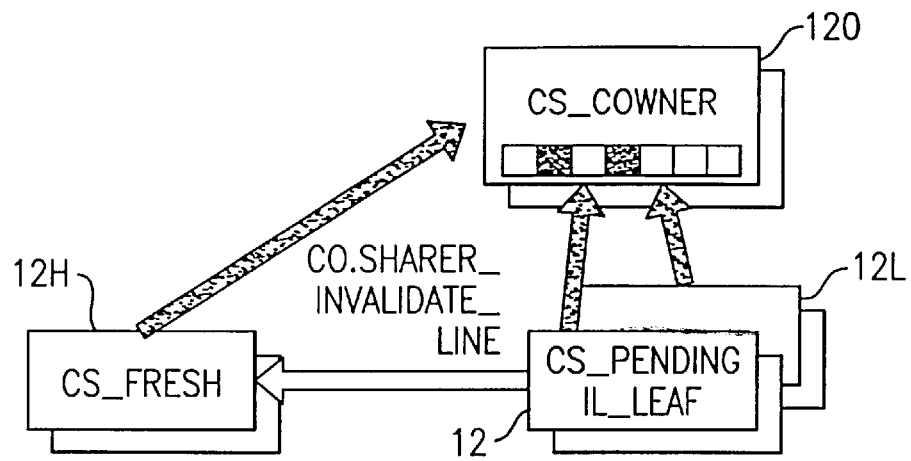
FIGS. 11A–11F illustrate gaining write-access for a leaf node.
Figure 11B:
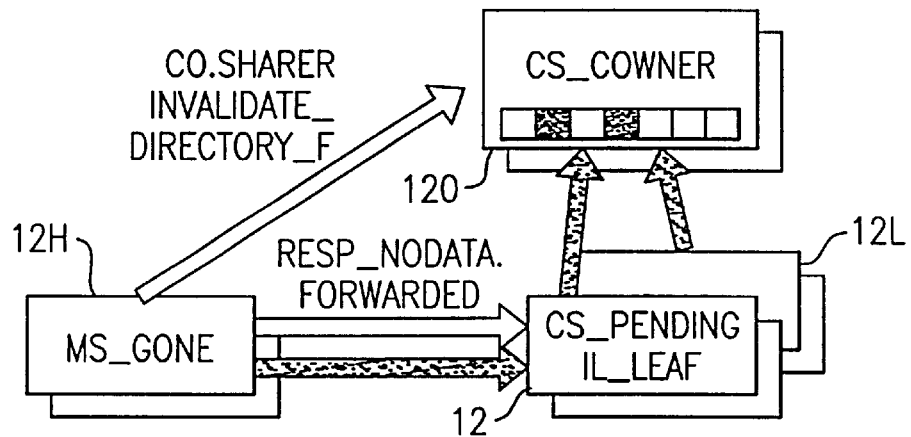
Figure 11C:
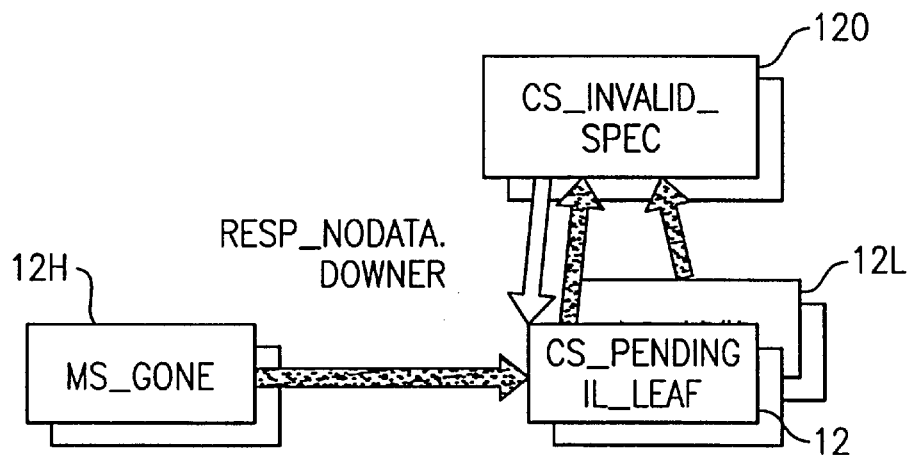
Figure 11D:
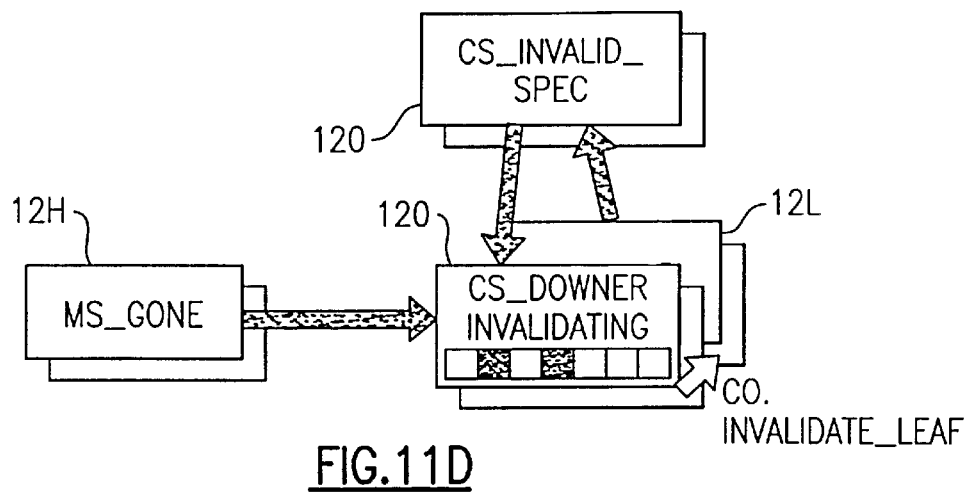
Figure 11E:
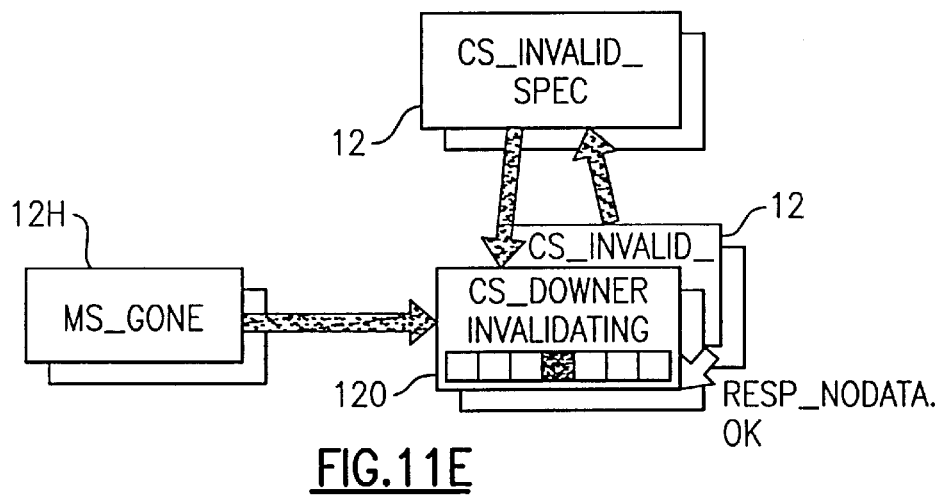
Figure 11F:
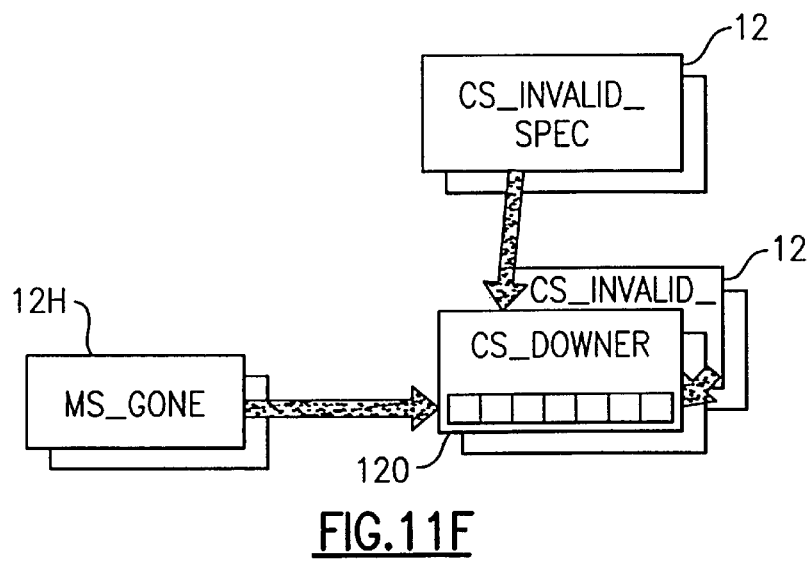
Figure 12A:
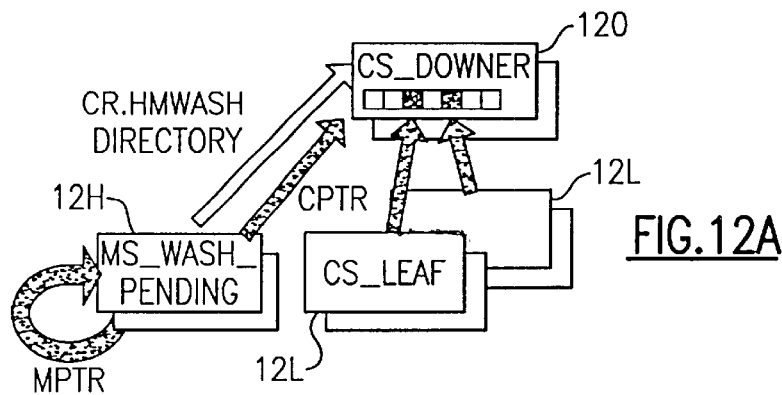
FIGS. 12A–12G illustrate "washing" a "dirty" line.
Figure 12B:
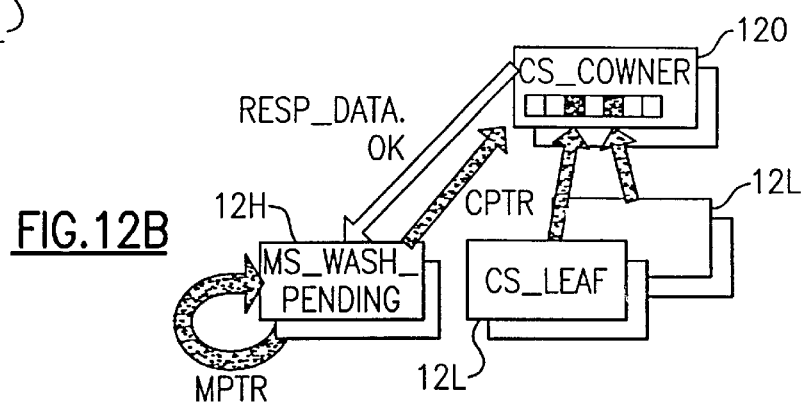
Figure 12C:
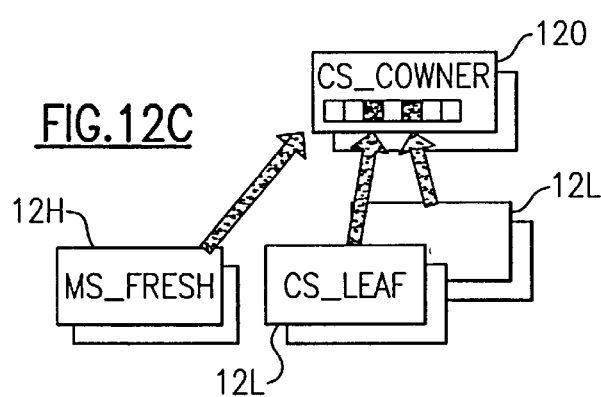
Figure 12D:
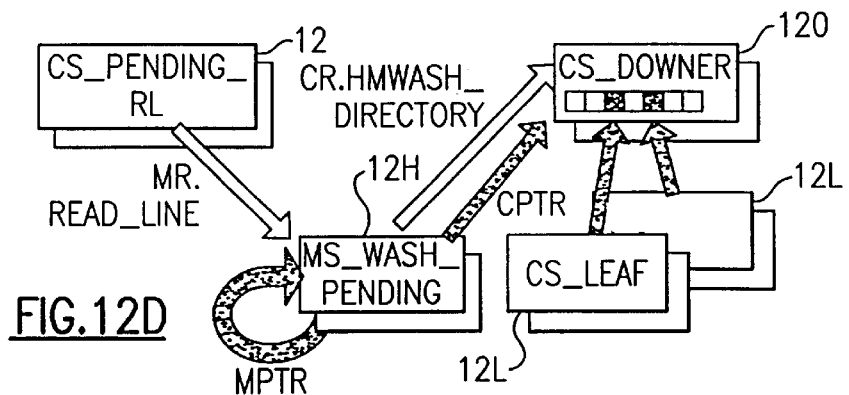
Figure 12E:
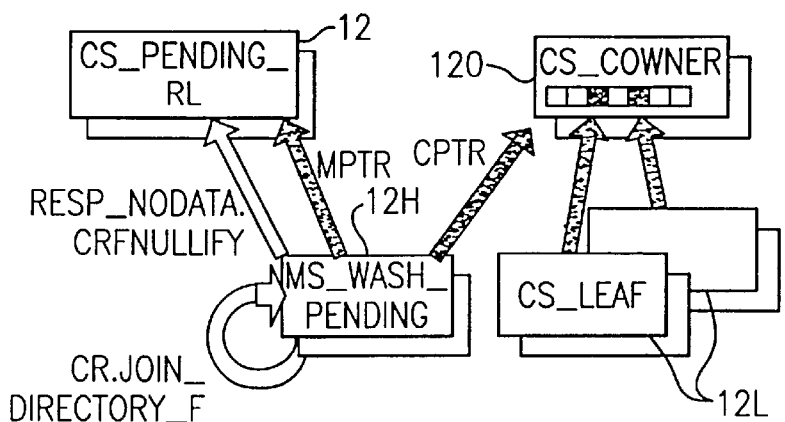
Figure 12F:
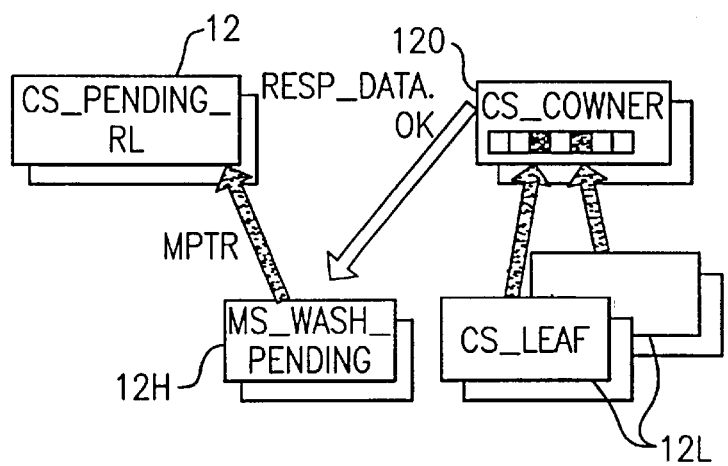
Figure 12G:
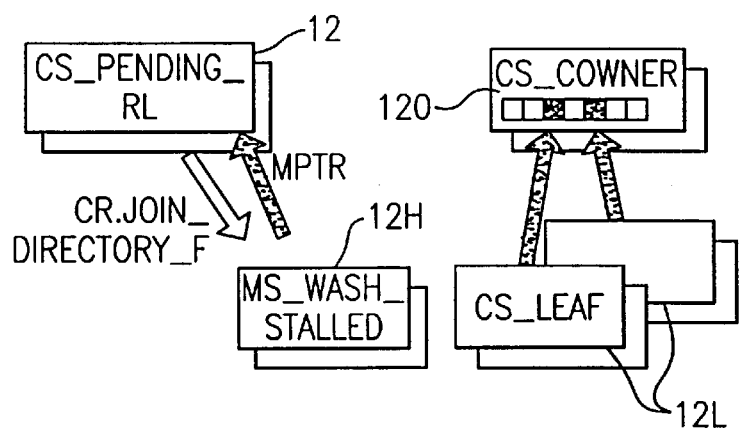
Figure 13A:
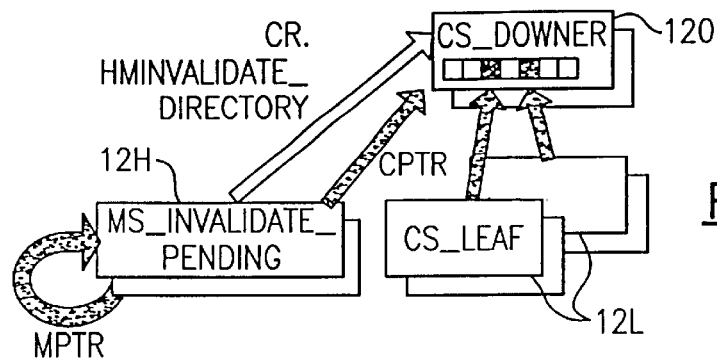
FIGS. 13A–13D illustrate gaining write access to a shared line.
Figure 13B:
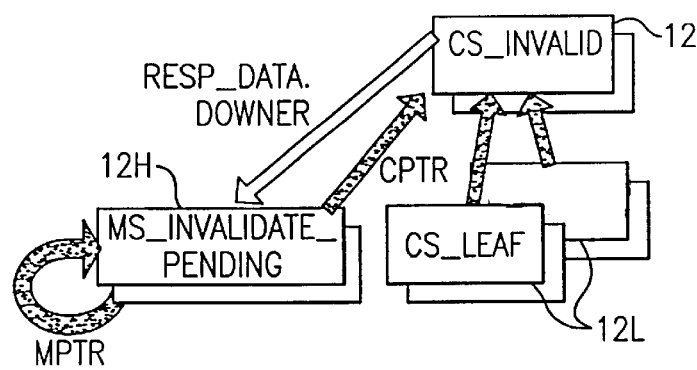
Figure 13C:
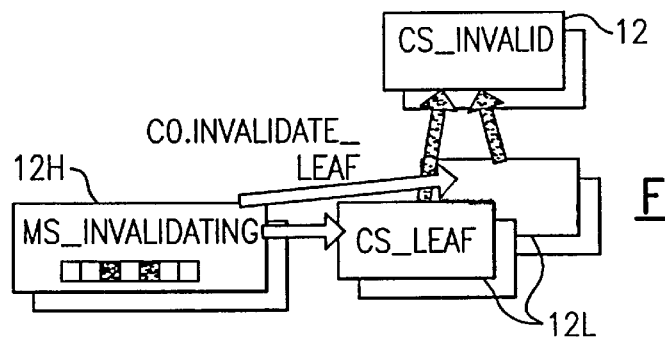
Figure 13D:
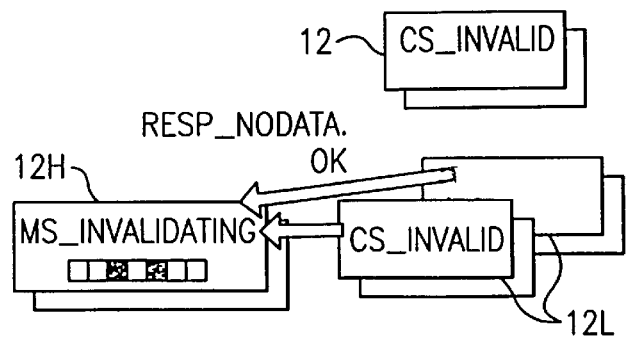
Figure 14A:
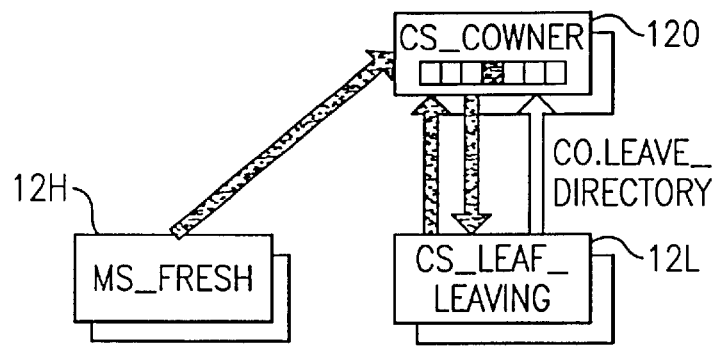
FIGS. 14A–14F illustrate leaf node evictions.
Figure 14B:
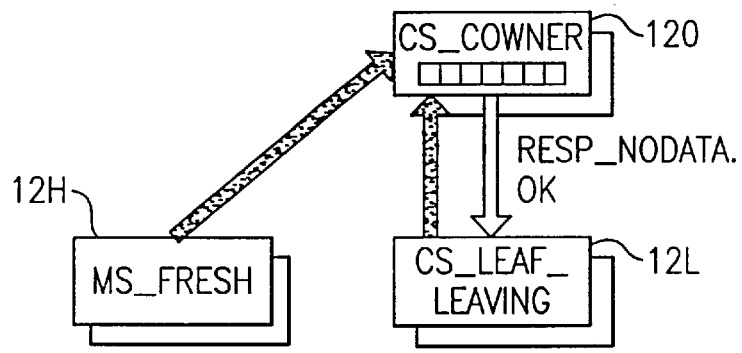
Figure 14C:
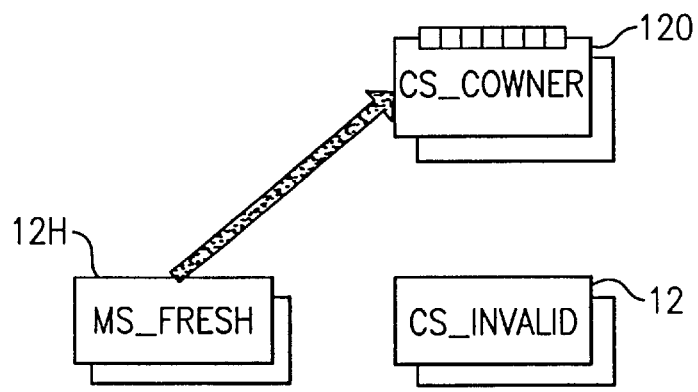
Figure 14D:
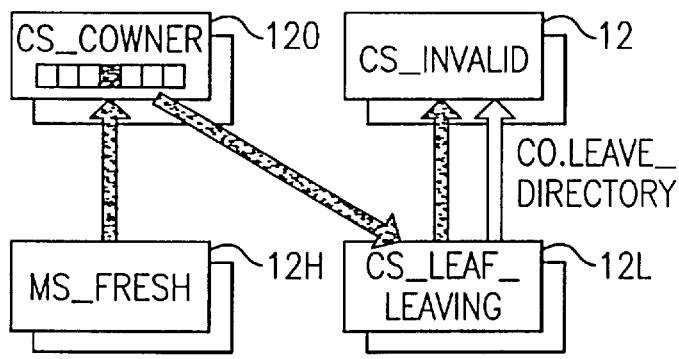
Figure 14E:
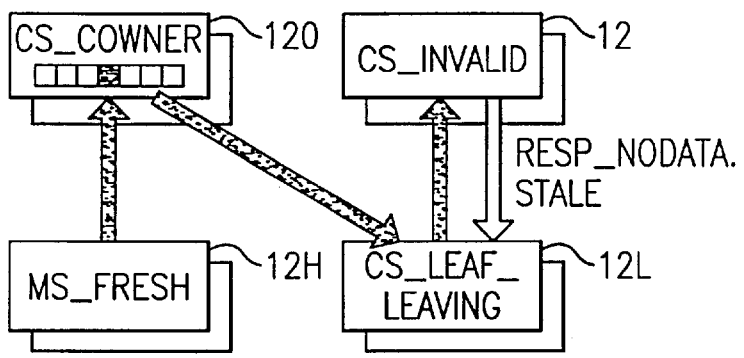
Figure 14F:
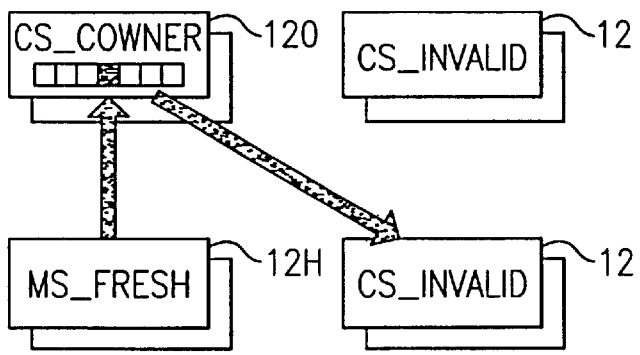

2. Speculative Read Requests (FIGS. 9A–9C)

As described previously, the CBV coherency methods and mechanisms of the present invention include an optimization designed to increase system performance in the presence of producer-consumer sharing patterns. Typical producer-consumer sharing consists of a single Node 12 that repeatedly modifies a Line 24 (produces) and one or more Nodes 12 that read the Line 24 after it is modified (consume). It will be apparent to those of ordinary skill in the relevant arts that if implemented with conventional methods each consumer would be subject to the serial latency of a Request Packet 36A to the Home Node 12H, followed by a corresponding Forwarded Request Packet 36C to the producer, which would be the Line 24's Owner Node 12O after it modified the Line 24. It will also be apparent that because the producer-consume pattern may be repeated many times, the system performance may suffer due to the inherent latencies of the repeated operations.

According to the present invention, however, each Node 12 that has had its copy of a Line 24 invalidated may send a speculative read Request Packet 34A to the Node 12 that invalidated the requesting Node 12's copy of the Line 24. The Node 12 that invalidated the Line 24 will be the Owner Node 12O for the Line 24 after its request completes and, as the Line 24's current Owner Node 12O, can respond to speculative read Request Packets 34A from the consumer Nodes 12 directly by marking their respective bits in the Vector 30V directory maintained by the current Owner Node 12O and by providing each consumer Node 12 submitting a speculative read Request Packets 34A with a copy of the Line 24. It must be noted that this mechanism preserves system-wide coherency even though the speculative read Request Packets 34A do not travel through the Line 24's Home Node 12H so long as speculative read Request Packets 34A are serviced only by the current Owner Node 12O of the Line 24. All non-Owner Nodes 12O that receive a speculative read Request Packets 34A must therefore respond with a Response Packet 36B indicating that the speculative read request failed and, if a Node 12's speculative read request fails the Node 12 must send a send a read request to the Line 24's Home Node 12H according to the base methods described herein above.

In the presently preferred embodiment of the invention, this optimization is implemented through the combination of the stable state CS_INVALID_SPEC 42E and by holding the identification of an invalidating Node 12 in the PTR 30PL used by Leaf Nodes 12L to store the identify of the Line 24's Owner Node 12O, so that speculative read Request Packets 34A generated by the Leaf Nodes 12L will be directed to the invalidating Node 12, that is, to the new Owner Node 12O. It must be noted, however, that the implementation of this optimization is optional, and is not necessary to ensure the correcting handling of producer-consumer sharing patterns by the CBV coherency methods and mechanisms of the present invention. It should also be noted that the use of this optimization can be made configurable by providing a method for instead forcing all transitions to the CS_INVALID_SPEC 42E state to a CS_INVALID 52G state. It should be noted, however, that this optimization may reduce system performance if multiple Nodes 12 "produce" Lines 24 and the delay between a Line 24 modification and a consumer's read is long enough to allow multiple Nodes 12 to produce Lines 24. In the presence of this behavior the probability of a speculative read request being sent to the Line 24's Owner Node 12O decreases and may result in an increase in the average transaction latencies. As such, specific implementations of the present invention may choose to include a mechanism to age out Nodes 12 in the CS_INVALID_SPEC 42E state in order to avoid degrading performance for certain permutations of the producer-consumer behavior. Such implementations may, for example, utilize the memory space that would be used in an Owner Node 12O to store the PTR 30PO, for example, to store an "age" value that would be used to "age out" the CS_INVALID_SPEC 42E state when the Node 12 is not functioning as an Owner Node 12O.

3. Read to Write Access Promotion

One of the disadvantages of the cache coherency methods of the prior art is the inability for Nodes 12 to gain write access to a Line 24 without first having to invalidate its local copy of the Line 24. The majority of such transactions result in the Node 12 receiving an copy of the Line 24 that is identical to the copy that was invalidated in making the request, which results in the unnecessary transmission of Lines 24 and leads to a lower effective use of system bandwidth.

In order to maximize system bandwidth efficiency the present invention provides a mechanism for Nodes 12 with an encached read-only copy of a Line 24 to upgrade their access rights to write-access without invalidating the encached copy of the Line 24 or causing a Line 24 to be unnecessarily transmitted. This mechanism is implemented through the use of a command that indicates that an access rights promotion is being requested.

The following discussions describe how this command is used by Nodes 12 to gain write access to an encached read-only copy of a Line 24, and the handling of race conditions that may result from use of this command. In this regard, it must be noted that in the following discussions the use of phrases such as "the(a) CS_COWNER 30SOA Node 12" refers to a Node 12 currently in the CS_COWNER 30SOA, that is, currently fulfilling the role of the Owner Node 12O of a Line 24. This terminology is in accordance with the previous discussions regarding the figures wherein it was stated that the roles and operations of Nodes 12 and their relationships with Lines 24 and other Nodes 12 in any given operation are clearly and completely described by the current state of the Nodes 12. This terminology will thereby be used in the following discussions as an alternative to, for example, the terms Home Node 12H or Owner Node 12O.

It will also be understood in the following discussions that communications between Nodes 12 are through Request Packets 36A, Response Packets 36B and Forwarded Request Packets 36C, in accordance with previous descriptions of the present invention. As such, the following discussions will not explicitly recite that a communication between one Node 12 and another Node 12, such as a request or a response, is by means of a Packet 36, and will not explicitly state the type of Packet 36 used in a communication, as these communications will be clearly understood from the preceding descriptions of the present invention.

a. Gaining Write-Access from a CS_COWNER 30SOA Node 12 (FIGS. 10A–10E)

A CS_COWNER 30SOA Node 12, that is, an Owner Node 12O, wishing to gain write access to a Line 24 will first transition to a transient state and then issue a promotion request to the associated Line 24's Home Node 12H. Upon receiving the request, the Home Node 12H will invalidate its copy of the Line 24 (if still valid) and will send a forwarded request to the Node 12 indicated by its PTR 30PH. The Home Node 12 also sends a response to the CS_COWNER 30SOA Node 12 confirming that its copy of the Line 24 has been invalidated.

If no other Nodes 12 have tried to gain access to the Line 24 the forwarded request will be sent to the CS_COWNER 30SOA Node 12 where it will inspect the packet's RQID 38C and determine that the request was created on behalf of its request to the Home Node 12H. At this point the CS_COWNER 30SOA NODE 12 has earned the right to invalidate all other shares and then modify the Line 24. As a result the CS_COWNER 30SOA NODE 12 transitions its state and sends invalidate requests to all the Nodes 12 marked in the Vector 30V directory. As the Leaf Nodes 12L respond the CS_OWNER 30SOA Node 12 clears their associated bits in the Vector 30V directory and finally allows the local write request to complete when no bits remain marked in the Vector 30V directory. At this point the Node 12 transitions to the CS_DOWNER 30SOB state and terminates its activity.

In the cases where the promotion request is racing with other access requests for the Line 24, the forwarded request generated by the Home Node 12H will be forwarded to the Prepention Queue 32 rather than the CS_COWNER 30SOA Node 12. If all of the requests ahead of the promotion request are only for read-only copies of the Line 24, the CS_COWNER 30SOA NODE 12 will complete each in turn and eventually collapse the Prepention Queue 32 to the point where it will receive its own request for a promotion. At this point the completion sequence is the same as described just above. If however, the Prepention Queue 32 contains a request to modify the Line 24, the CS_COWNER 30SOA Node 12 must respect the request and update its request for promotion to a request for a Line 24 and write access to the Line 24. It must be noted that respecting the request includes allowing the request to complete, thereby ensuring that the Prepention Queue 32 continues to collapse and that the rules of Prepention Queues 32 are not violated.

b. Gaining Write-Access for a CS_LEAF Node 12L (FIGS. 11A–11F)

Leaf Nodes 12L also gain write access to a Line 24 by sending a request to the Line 24's Home Node 12H. The Home Node 12H processes the request in the same manner as requests from a CS_COWNER 30SOA Node 12, that is, by invalidating its copy of the Line 24, if necessary, responding, and sending a forwarded request.

In this case, the promotion request will eventually find its way to the Line 24's Owner Node 12O. In response, the Owner Node 12O will invalidate its copy of the Line 24 and send the Leaf Node 12L a response indicating that it has won the right to invalidate all other sharers and modify the Line 24. Included in the response is a copy of the Vector 30V directory indicating all other Nodes 12 that possible have a copy of the Line 24. When the Leaf Node 12L receives the response it first transitions its state and then sends requests to all the Nodes 12 marked in the Vector 30V directory. The Leaf Node 12L then waits for responses from each of the Nodes 12 before it allows the Line 24 to be modified locally.

c. Handling Promotion Request Races

It is possible for a number of race conditions to occur while a Node 12 is attempting to promote its access rights from read-only to write-access, one of which occurs when an invalidation request enters into the Prepention Queue 32 before a promotion request from the CS_COWNER 30SOA Node 12. In this case the CS_OWNER 30SOA Node 12 will receive the invalidation request from the racing Node 12 rather than receiving its own promotion request because the invalidation request will be ahead of its own promotion request in the Prepention Queue 32. As the invalidation request is ahead of its own promotion request in the Prepention Queue 32, the CS_OWNER 30SOA Node 12 must honor the invalidation request by invalidating its copy of the Line 24 and responding with a current copy of the Vector 30V directory and an indication that the requester is now the Owner Node 12O of the Line 24. In processing the invalidator's request, the CS_OWNER 30SOA Node 12 transitions to a new state that indicates it should update its request to a request for the Line 24 and for write access to the Line 24 and the remainder of the transaction is processed as if the original Owner Node 12O never had a copy of the Line 24.

In should be noted in the above example that the CS_OWNER 30SOA Node 12 occupies two roles in the System 10 since it is both the Line 24's Owner Node 12O, being in the CS_OWNER 30SOA state for the Line 24, and is a requesting Node 12 in the Prepention Queue 32. As a result of its dual status, the CS_OWNER 30SOA Node 12 must be able to distinguish between the requests that are being sent to it as the Owner Node 12O from the requests being sent to it as a Node 12 in the Prepention Queue 32. In order to make this distinction, the CS_OWNER 30SOA Node 12 utilizes information embedded in the Forwarded Request Packet 36C created by the Home Node 12H. In this regard, in the present embodiment of the present invention a Home Node 12H can generate two versions of every Forwarded Request Packet 36C wherein the version of the Forwarded Request Packet 36C is indicated, as represented in FIG. 2A, by a Version Indicator (VI) 38J embedded in the Forwarded Request Packet 36C and wherein the value of VI 38J depends on the state of the Line 24 at the time the associated request was received. For example, if a Home Node 12H receives a request to a Line 24 that resides only in the Home Node 12H or is read shared only, that is, is "fresh", the Home Node 12H will generate a forwarded request containing a VI 38J containing a value indicating that the Line 24 was "fresh" at the time the original request was received at the Home Node 12H. Likewise, the Home Node 12H will generated a Forwarded Request Packet 36C containing a VI 38J having a value indicating that the Line 24 was modified when the Line 24 was modified at the time the original request was received at the Home Node 12H. In the present embodiment, VI 38J is implemented as a suffix of Forwarded Request Packets 36C wherein the suffix has a value of "_F" when the Line 24 is "fresh" and a value of "_G" when the Line 24 has been modified. It will be understood by those of ordinary skill in the relevant arts, however, that VI 38J may be equally implemented in other forms, such as one or more status bits in the Forwarded Request Packets 36C.

The VI 38J indicators are used by the CS_OWNER 30SOA Node 12 to determine the intended target of the requests it receives while it is racing to promote its access to the Line 24. For example, if the CS_OWNER 30SOA Node 12 receives a request with having a VI 38J with a "fresh" value, the CS_OWNER 30SOA Node 12 knows that the request should be processed by it as the Line 24's Owner Node 12O because the VI 38J "fresh" value indicates that the Line 24 was read-only shared at the time the associated request was processed by the Home Node 12H and therefore must have been processed before the CS_OWNER 30SOA Node 12's promotion request. If, however, the CS_OWNER 30SOA Node 12 receives a forwarded request with a VI 38J value indicating that the Line 24 was modified, the CS_OWNER 30SOA Node 12 knows that the request must have been sent by the Home Node 12H after its promotion request was processed and that the request should therefore be processed according to the rules of the Prepention Queue 32. The VI 38J indicator mechanism of the present invention thereby ensures that all requests are processed in the correct order during race scenarios involving promotion requests.

It should be noted that one affect of the VI 38J indicator mechanism is that special responses are required to carry along this status information to the original requester when forwarded requests are retried in a Prepention Queue 32, as has been described herein above. The reason for this requirement is that the original requester does not know if the forwarded request sent by the Home Node 12H had VI 38J indicator having a "fresh" or "modified" value and this information is necessary in order to send the appropriate request after a retry response in order to ensure that all races are resolved correctly. As a result, mechanisms of the present invention use multiple retry commands, similar to the multiple request formats, as a way of encoding this as well as other status information.

Race conditions involving Leaf Node 12L promotion requests are handled in a similar manner to those from CS_OWNER 30SOA Nodes 12, except that a Leaf Node 12L can always detect the difference between requests targeted to it as a Leaf Node 12L as opposed to requests targeted to it as a Node 12 of a Prepention Queue 32. If while trying to promote its access rights a Leaf Node 12L receives a Leaf Node 12L invalidation request, the Leaf Node 12L honors the request and sends the appropriate response and, after the invalidation, upgrades its promotion request to a request for both the Line 24 and write access to the Line 24.

Finally, since the CBV coherency methods and mechanisms of the present invention are designed to tolerate the use of an Interconnect 14 with no ordering guarantees and varying delivery times, the methods and mechanisms of the present invention must include provisions to deal with conditions resulting from such Interconnects 14. For example, a request by a first Node 12 for promotion with respect to a Line 24 may lose a race with a request by second Node 12 to invalidate the Line 24 and the delay of the first Node 12's request may be long enough, due for example to Interconnect 14 delays, for the second Node 12's invalidation request to entirely complete. As a consequence, the first Node 12 is not given a chance to upgrade its request from a promotion request to a request for a Line 24 and write access to the Line 24, as has been described herein above. The CBV coherency methods and mechanisms of the present invention address this problem by having Owner Nodes 12O automatically upgrade each promotion request from a Node 12 that is not currently marked in the Vector 30V directory to a request for access to the line and a request for write access, that is, to a request asking for a copy of the line. In this regard, the fact that a Node 12's Vector 30V directory bit is not set implies that the Node 12's copy of the Line 24 was invalidated while its promotion request was outstanding. As a result, the Owner Node 12O treats the promotion request as a request for a Line 24 and write access, and responds accordingly. This thereby mechanism avoids the promoting Node 12 from having to send multiple requests to the Owner Node 12O, and protects against accidentally invalidating a modified Line 24 before it is transferred to another Node 12.

4. Active Home Node 12H Functionality

In the CBV coherency methods and mechanisms of the present invention, Home Nodes 12H are allowed to actively regain access to a Line 24 without the need to emulate the behavior of a caching Node 12, in accordance with the assumption that a system in which the present invention is implemented is comprised of a collection of SMP Nodes 12 of some form. The following discussions describe how a Home Node 12H can gain read or write access to a Line 24 under various sharing conditions.

a. "Washing" a "Dirty" Line 24 (FIGS. 12A–12G)

A Home Node 12H performs a "washing" operation when it obtains a read-only copy of a Line 24 that is "dirty", that is, exists in modified form in a far Node 12's cache. Because the CBV coherency methods and mechanisms of the present invention do not comprise an update protocol, a modified Line 24 can be either cached by only the CS_DOWNER 30SOB Node 12, that is, an Owner Node 12O in the CS_DOWNER 30SOB state, which would have write access, or read-shared by the CS_DOWNER 30SOB Node 12 and one or more Leaf Nodes 12L. In either case, the Home Node 12H begins the washing process by first changing its state, and placing its own Node 12 identifier value in its PTR 30PH and copying the previous value of its PTR 30PH into a temporary "cache" pointer field, identified in FIG. 2A as PTR 30TC. Once the Home Node 12H State 30SH and PTR 30PH values are manipulated, the Home Node 12H sends a wash request to the Node 12 referenced by the temporary "cache" pointer in PTR 30TC. If the Prepention Queue 32 associated with the Line 24 is empty, that is, there is no present Prepention Queue 32 for the associated Line 24, the wash request goes directly to the Line 24's Owner Node 12O. In this case.the CS_DOWNER 30SOB Node 12 simply responds to the Home Node 12H with a copy of the Line 24 and changes to the CS_COWNER 30SOA state, representing the fact that the Home Node 12H now has a copy of the Line 24. Upon receiving the response, the Home Node 12H saves the Line 24 back to its local memory, saves the identifier of the responding Node 12 in its PTR 30PH, and changes the Line. 24's state to the MS_FRESH 30SHB state.

If, however, the Prepention Queue 32 associated with the Line 24 is not empty when the washing is initiated, that is, if a Prepention Queue 32 exists for the Line 24 at the time the washing is initiated, the Home Node 12H request will be placed in the Prepention Queue 32, just as in the case of a request by any other Node 12. In this case, the Home Node 12H would spin-send its wash request to the Node 12 preceding it in the Prepention Queue 32 and the Node 12 preceding the Home Node 12H in the Prepention Queue 32 will either eventually become the Owner Node 12O or will redirect the Home Node 12H to the Owner Node 12O. Eventually, the Home Node 12H's wash request will reach the Owner Node 12O and will change Owner Node 12O from the CS_DOWNER 30SOB state to CS_COWNER 30SOA state in the same manner as if the Prepention Queue 32 were empty at the start of the wash request.

In this regard, it should be noted that even if the Prepention Queue 32 is empty when the wash transaction begins, it is possible for other Nodes 12 in the system to send access requests before the wash transaction has completed. In this case, the racing Nodes 12 will be placed in the Prepention Queue 32 following the Home Node 12H and will wait until the Home Node 12H washing operation has completed.

When the Home Node 12H receives the response for its wash request upon completion of the wash request, the Home Node 12H will queries the Node 12 identifier in its PTR 30PH and will determine that there is a Node 12 behind the Home Node 12H in the Prepention Queue 32 and, as a result, will "stall" while waiting for a request from that Node 12. The Home Node 12H will complete its Prepention Queue 32 responsibilities by redirecting the request from the following Node 12 in the Prepention Queue 32 to the Line 24's Owner Node 12O, thereby removing itself from the Prepention Queue 32, and the remainder of the transaction completes in a similar manner to a normal read request to a shared Line 24. In this case, however, the CS_COWNER 30SOA Node 12 supplies the Line 24 to the following Node 12 in the Prepention Queue 32 instead of the Home Node 12H as in the normal case. This requires, in turn, that the Node 12 caches be capable of supplying a copy of the Line 24 to another Node 12 even if the Line 24 is unmodified, which requires that the caching mechanisms of each Node 12 be capable of cache to cache sharing of an unmodified Line 24.

In a further example, the Home Node 12H of a Line 24 may receive a modification request directed to the Line 24 during the time the wash transaction is outstanding. Normally, when a Home Node 12H in the MS_FRESH 30SHB state receives a modification request, the Home Node 12H invalidates its copy of the Line 24 but, in this case cannot invalidate its copy of the Line 24 as it has not yet obtained its copy of the Line 24. Instead, the Home Node 12H will, upon receiving the modification request, change to a new state representing that the Line 24 has been effectively invalidated and, once in this state, will respond to all subsequent requests as if the Home Node 12H were in the MS_GONE 309SHC state. Because the wash transaction requested by the Home Node 12H is outstanding at this time, the Home Node 12H has a place in the Prepention Queue 32 associated with the Line 24. The Home Node 12H cannot leave the Prepention Queue 32 upon completion of the wash transaction, however, until the Home Node 12H passes along the request from the following Node 12 in the Prepention Queue 32 to the Line 24's Owner Node 12O. While processing the next Node 12's request, the Home Node 12H will invalidates its copy of the Line 24 when it leaves the Prepention Queue 32 and, because the modify request received by the Home Node 12H cannot complete until the Home Node 12H leaves the Prepention Queue 32, coherency will be maintained. Lastly, it should be noted that this mechanism assumes that the delay between the completion of the wash transaction and the later invalidation of the Line 24 when leaving the Prepention Queue 32 is sufficient to allow the original requesting agent inside the Node 12 to complete its request. If this is not the case, it is possible for system livelocks to occur and precautions against such livelocks must be incorporated into the system architecture.

b. Gaining Write Access to a Shared Line 24 (FIGS. 13A–13D)

The general method by which a Home Node 12H gains write access to a shared Line 24 is similar to above described "washing" of a Line 24 by a Home Node 12H. In this case, and rather than sending a wash request to the Owner Node 12O or to the last Node 12 in the Prepention Queue 32, the Home Node 12H will sends an invalidation request to the Owner Node 12O or to the last Node 12 in the Prepention Queue 32. If the Home Node 12H's copy of the Line 24 is valid, then the Home Node 12H will send a dataless invalidation request, that is, an invalidation request that does not request a copy of the Line 24. If the Home Node 12H's copy of the Line 24 is not valid, the Home Node 12H will request a copy of the Line 24 in addition to the invalidation.

Upon receiving the invalidation request, the Line 24's Owner Node 12O will invalidate its copy of the Line 24 and respond to the Home Node 12H with a copy of the Vector 30V directory and a copy of the Line 24 if the Home Node 12H has requested a copy of the Line 24. The Home Node 12H then sends an invalidation request to each Node 12 marked in the Home Node 12H copy of the Vector 30V directory and waits for a response from each Leaf Node 12L identified in the copy of the Vector 30V directory. Once the Home Node 12H has received responses from all the Leaf Nodes 12L identifier in the temporary copy of the Vector 30V directory, the Home Node 12H is allowed to modify the Line 24 and transition to the MS_HOME 30SHA state.

As just described, this procedure requires the Home Node 12H to temporarily maintain a Vector 30V directory for the Line 24. In this regard, it should be noted that after a Home Node 12H's invalidation request is processed there is no Owner Node 12O of the Line 24 and therefore no conflict between an Owner Node 12O copy of the Vector 30V directory and a Home Node 12H copy of the Vector 30V directory. In addition, there would be no additional overhead operations as the Home Node 12H will terminate in the MS_HOME 30SHA state. It should also be noted, however, that a goal of the present invention is to reduce the size of the "memory tags" stored in Home Nodes 12H and that, as such, in the presently preferred implementation there is no room in the Home Node 12H "memory tag" space to store a copy of the Vector 30V directory. It is therefore presently preferred that the temporary copy of the Vector 30V directory and state information for Line 24 for which a Home Node 12H is responsible be stored in the Home Node 12H in a temporary context resource with sufficient space for all the required information, and destroyed upon completion of the operation.

As in the case of a washing request by a Home Node 12H, it is possible for there to be one or more Node 12s in a Prepention Queue 32 associated with the Line 24 at the time the Home Node 12H starts the invalidation process. Once again, the Home Node 12H will adhere to the above described rules and methods of operation of Prepention Queues 32, and will spin-request against the Node 12 preceding the Home Node 12H in the Prepention Queue 32 of it until the preceding request completes. As described, the Prepention Queue 32 will eventually collapse and the Home Node 12H's invalidation request will be processed by the Line 24's Owner Node 12O in the same manner as if the Prepention Queue 32 were empty at the start of the transaction.

Once again, it is possible for the Home Node 12H to receive access requests while it is in the process of gaining write access to the Line 24. In this case the Home Node 12H responds to all access requests as if it is in the MS_HOME 30HSA state. However, the Home Node 12H cannot respond with the Line 24, even if the Line 24 was in the MS_FRESH 30SHB state at the start of the transaction, since the Home Node 12H will modify the Line 24 once the Home Node 12H gains access to the Line 24. As described previously, the Home Node 12H will resolve this type of race by leaving the Prepention Queue 32. In this case, the Home Node 12H will provide the Node 12 following the Home Node 12H in the Prepention Queue 32 with a copy of the modified line 24, and will include in the response an indication that the requesting Node 12 is now in the CS_OWNER 30SOA state, thereby allowing the Home Node 12H's copy of the Line 24 to remain valid, and subsequent Nodes 12 in the Prepention Queue 32 will receive a copy of the Line 24 from the new Owner Node 12O. In addition, if the Home Node 12H received a modification request while it was gaining write access to the Line 24, it will invalidate its copy of the Line 24 when leaving the Prepention Queue 32.

5. Cache Line Evictions

The following discussions will describe how encached Line 24 evictions are handled according to the CBV coherency methods and mechanisms of the present invention wherein, for purposes of the following descriptions, an eviction is considered to be any transaction in which a Node 12 decides to cease holding a copy of a Line 24. Evictions may result, for example, from cache capacity conflicts or may be initiated by some other implementation specific behavior.

a. Home Node Evictions

The CBV coherency methods and mechanisms of the present invention do not support Home Node 12H Line 24 evictions because, according to the methods and mechanisms of the present invention, each Home Node 12H has physical memory for each Line 24 of global memory for which it is responsible. Although the methods and mechanisms of the present invention do not themselves preclude the use of sparse memory techniques in individual implementations, this requirement does require that physical memory and "memory tag" storage space be reserved for any Line 24 that is globally shared in the system.

b. Leaf Node Evictions (FIGS. 14A–14F)

An eviction by a Leaf Node 12L consists of sending an "eviction hint" request to the Node 12 it believes to be the Line 24's Owner Node 12O. If the Leaf Node 12L's PRL 3PL value pointing to the suspected Owner Node 12O is valid and the request reaches the Owner Node 12O, the Owner Node 12O will clear the evicting Leaf Node 12L's associated bit in the Vector 30V directory and provide a corresponding response to the evicting Leaf Node 12L.

Figure 15A:
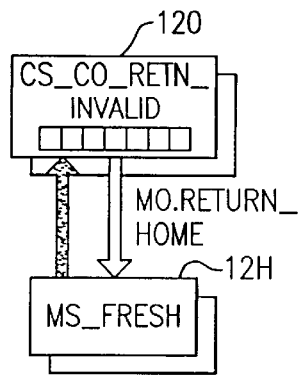
FIGS. 15A–15T illustrate owner node evictions.
Figure 15B:
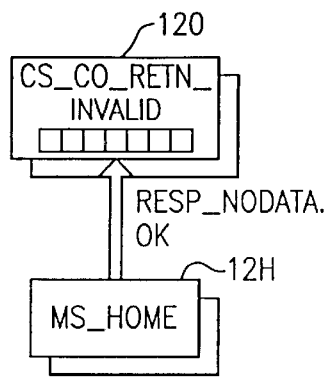
Figure 15C:
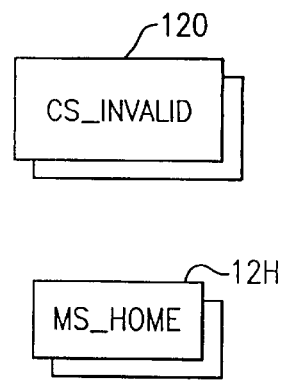
Figure 15D:
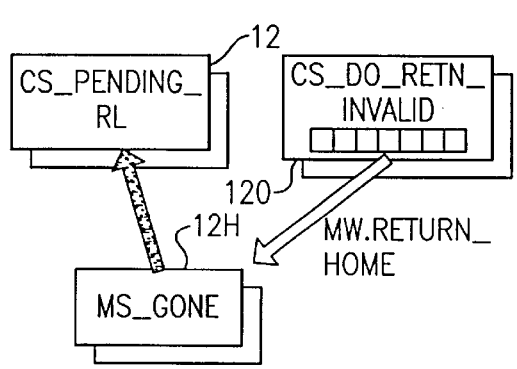
Figure 15E:
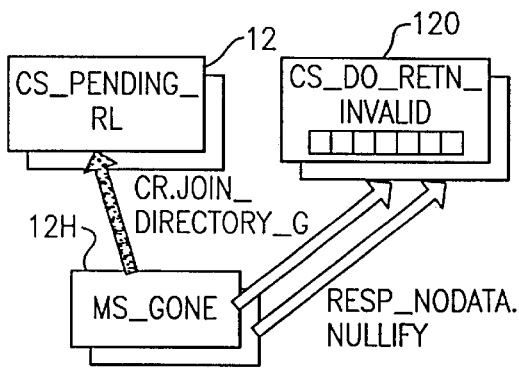
Figure 15F:
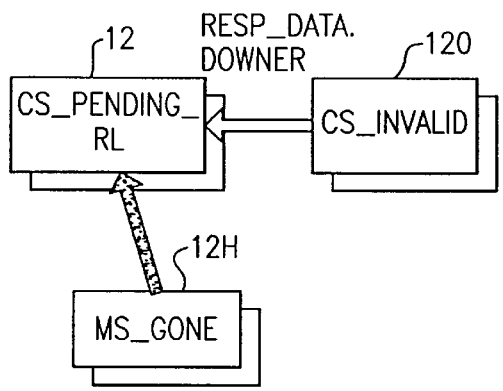
Figure 15G:
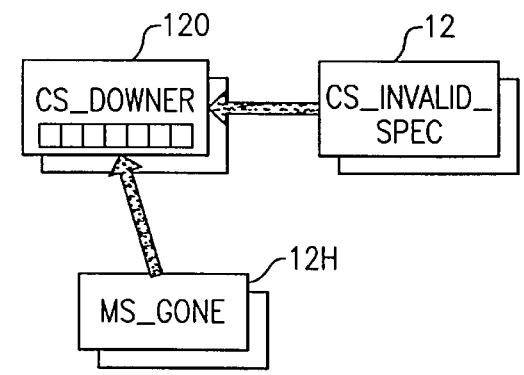
Figure 15H:
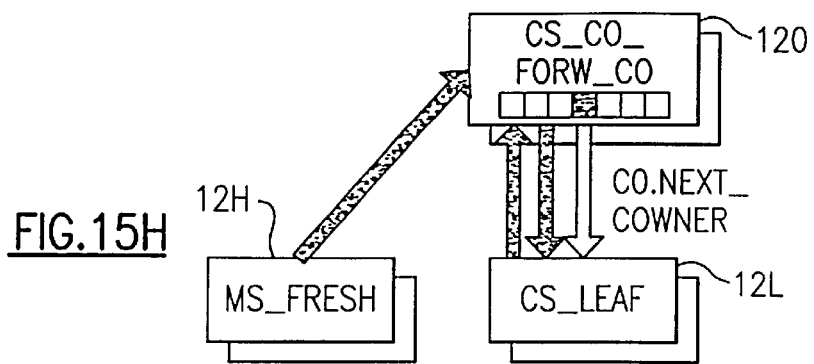
Figure 15I:
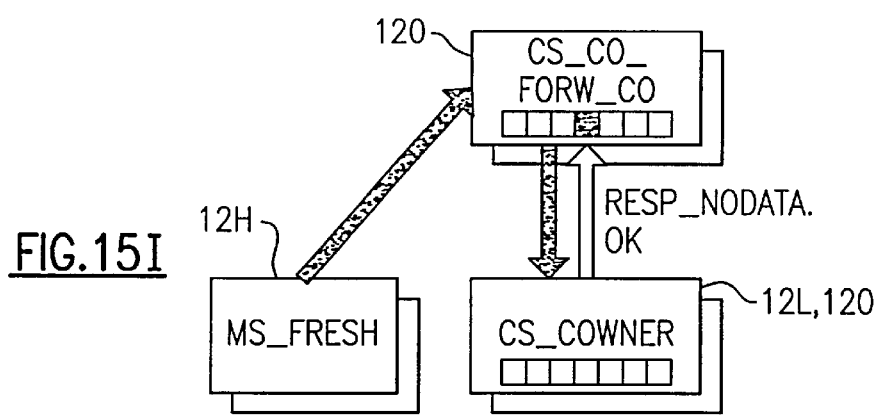
Figure 15J:
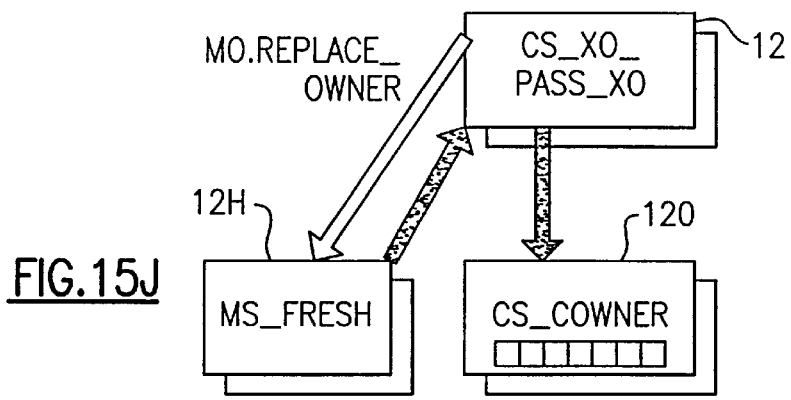
Figure 15K:
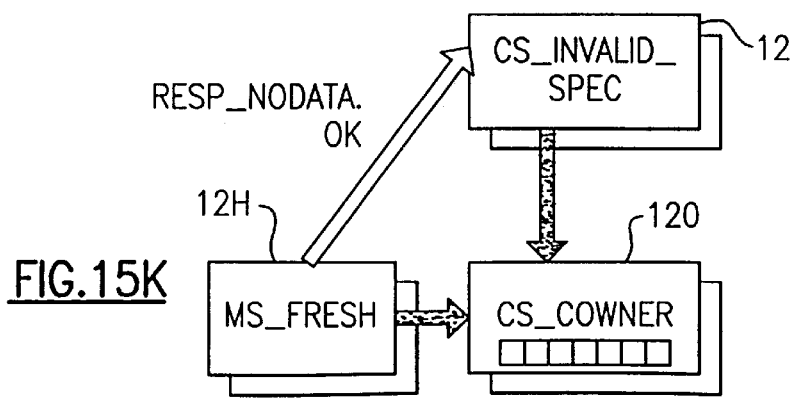
Figure 15L:
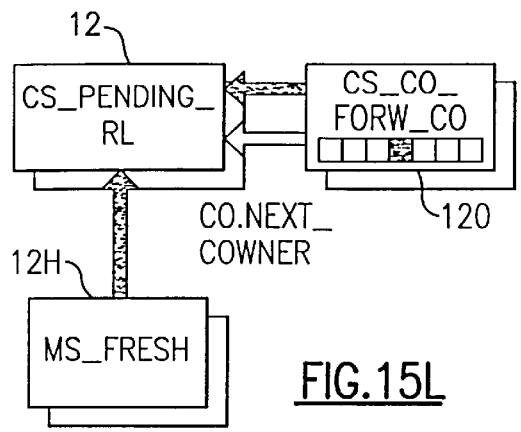
Figure 15M:
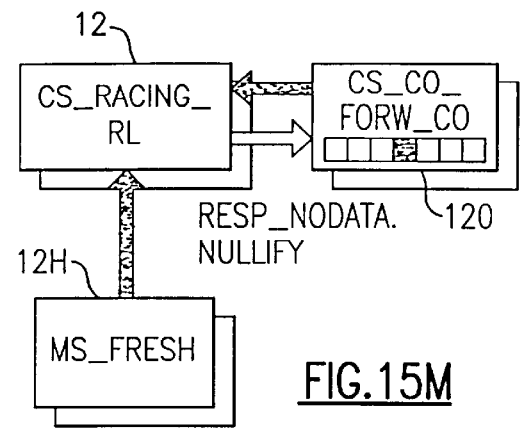
Figure 15N:
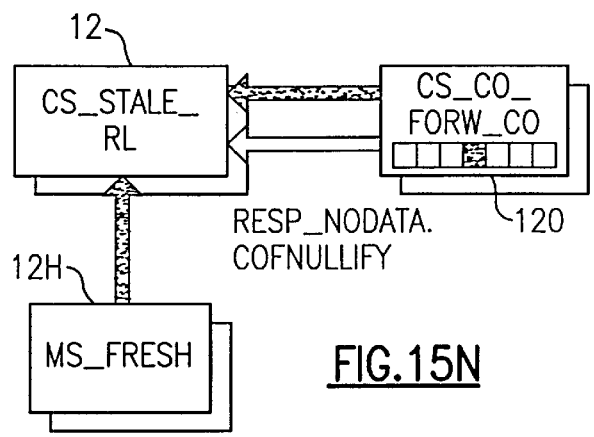
Figure 15O:
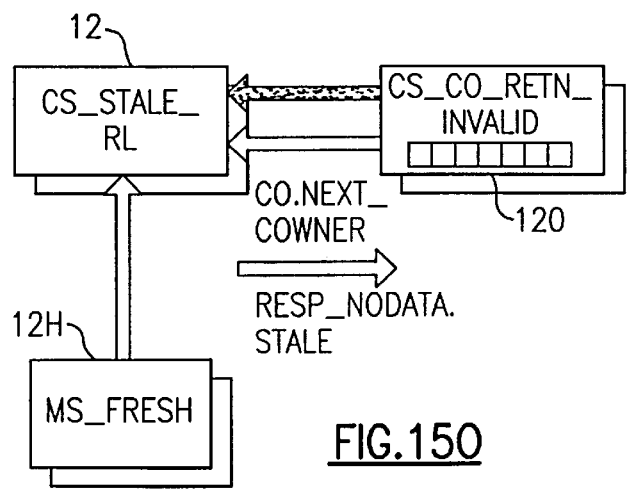
Figure 15P:
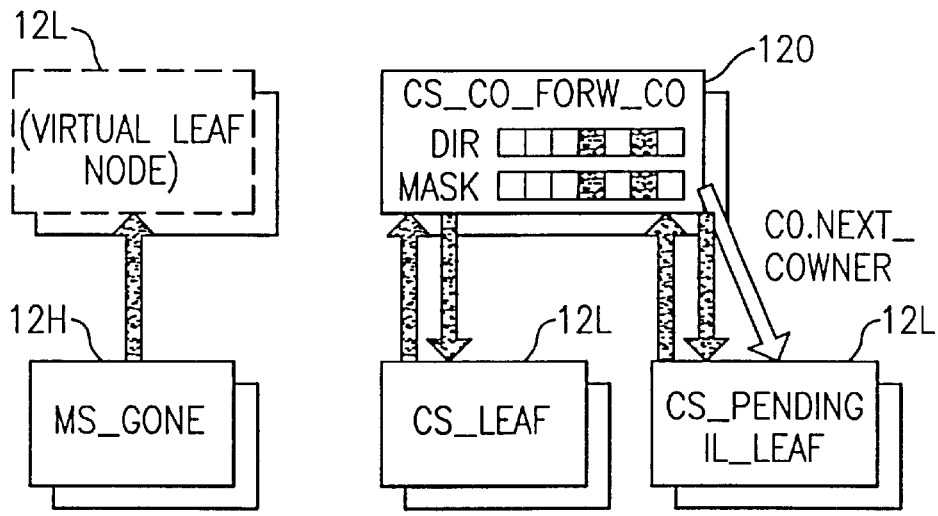
Figure 15Q:
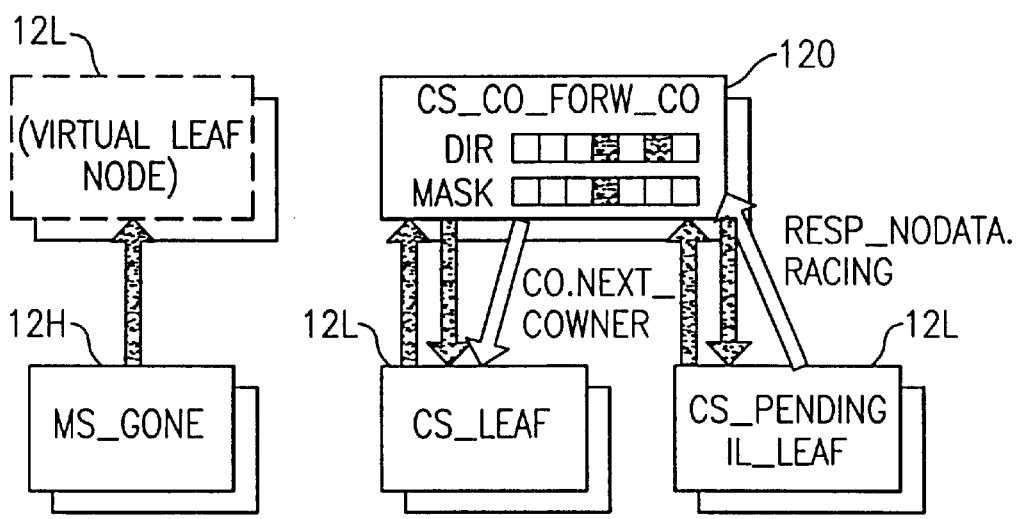
Figure 15R:
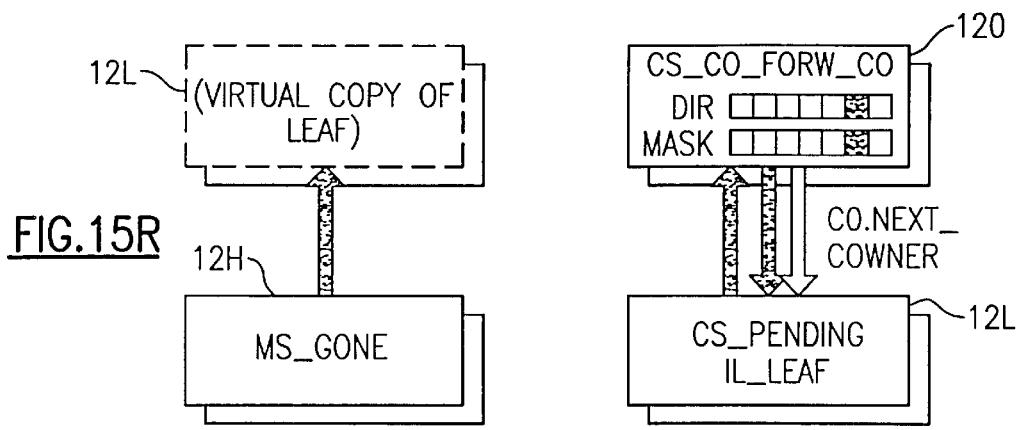
Figure 15S:
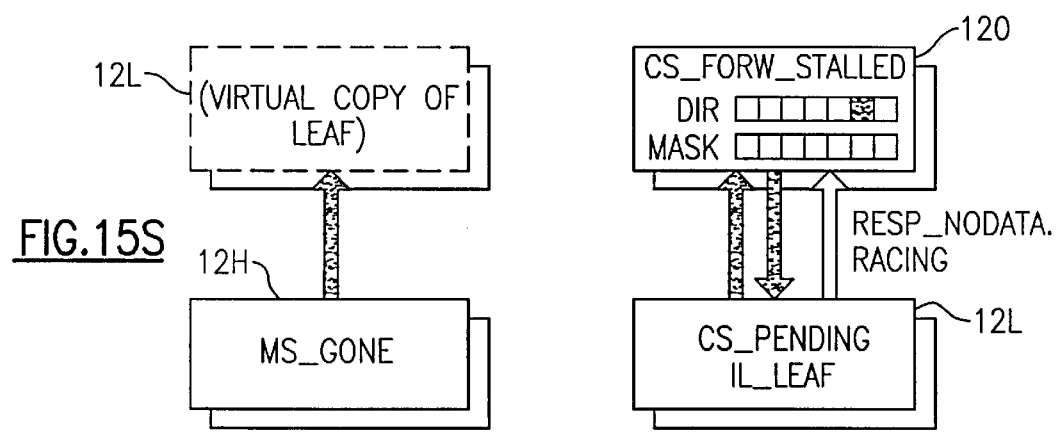
Figure 15T:
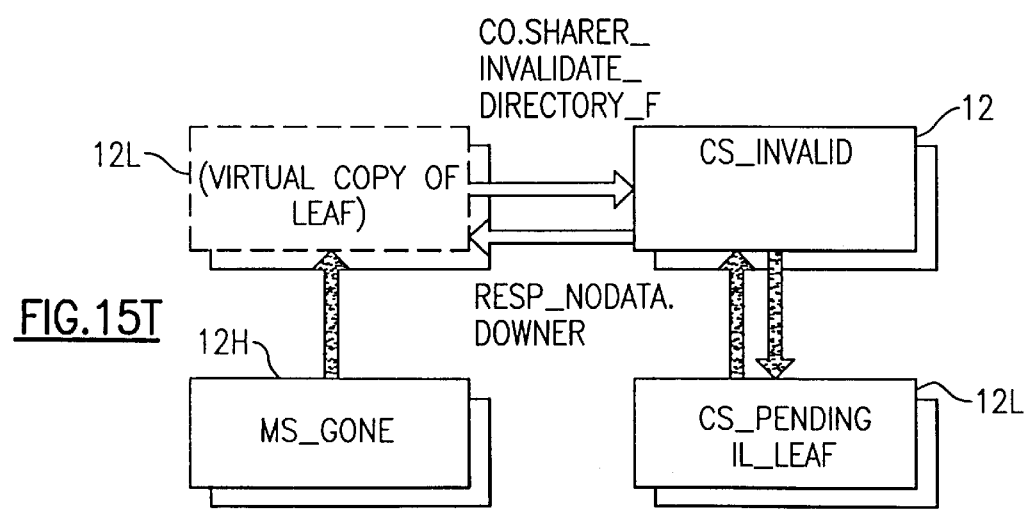

If, however, the Leaf Node 12L's PTR 30PL value is stale due to the loose coupling between Owner Nodes 12O and Leaf Nodes 12L, the Leaf Node 12L will receive a "stale" response from the Node 12 designated by the PTR 30PL, indicating that its request did not reach the Line 24's Owner Node 12O. In this case, the Leaf Node 12L will evict the Line 24 without further attempting to notify the current Owner Node 12O, leaving the Leaf Node 12L's bit erroneously set in the Vector 30V directory in the current Owner Node 12O. While this process may result in unnecessary invalidation traffic due to stale Vector 30V directory information, performance analysis investigations have shown that overall protocol bandwidth demands are lower by not implementing tighter coupling between Owner Nodes 12O and Leaf Nodes 12L.

c. Owner Node Evictions (FIGS. 15A–15T)

It will be recognized that Owner Node 12O evictions are more difficult to accomplish than Leaf Node 12L evictions as Owner Nodes 12O are the only agents in the system with information describing the Node 12s that may have a cached copy of the Line 24. As a result, Owner Nodes 12O must ensure that the sharing information is either passed onto one of the Leaf Nodes 12L or that the Line 24 is unshared at the end of the eviction transaction.

When starting an eviction transaction, Owner Nodes 12O first determines whether there are any bits set in the Vector 30V directory. If there are no bits set, then there are no Leaf Nodes 12L to which ownership may be transferred and the Line 24 should be returned to the Home Node 12H. The return to Home Node 12H is accomplished by sending a request to the Line 24's Home Node 12H indicating that the last cached copy of the Line 24 is being invalidated, and that the Home Node 12H should transition to the MS_HOME 30SOA state.

If the Owner Node 12O had a modified copy of the Line 24, that is, was in the CS_DOWNER 30SOB state, the Owner Node 12O it will include a copy of the Line 24 in the request to the Home Node 12H. When the Home Node 12H receives the request, the Home Node 12H determines whether its PRT 30PH value is equal to the identification of the Owner Node 12O. If PRT 30PH value is equal to the identification of the Owner Node 12O, then there are no Node 12s in the Prepention Queue 32 and the return to Home Node 12H can complete. In this case, the Home Node 12H responds to the Owner Node 12O with a response indicating that the return was successful and, if required, saves the modified Line 24 back to physical memory.

If, however, the Home Node 12H's PTR 30PH value does not equal the identifier of the Owner Node 12O, this indicates that the Prepention Queue 32 is not empty and that there is at least one request in route to the Owner Node 12O. In this case, the current Owner Node 12O cannot complete its eviction transaction until it services the request from the first Node 12 in the Prepention Queue 32. As a result, the Home Node 12H sends a retry response to the Owner Node 12O indicating that it is in a race with a Node 12 in the Prepention Queue 32 and that the return to Home Node 12H request therefore cannot complete. The evicting Owner Node 12O, will therefore spin in a loop, sending a return to Home Node 12H request to the Home Node 12H until the Owner Node 12O receives a request originating from the Node 12 at the head of the Prepention Queue 32 or until the Home Node 12H accepts the return to Home Node 12H request. When the Owner Node 12O receives the request from the Node 12 at the head of the Prepention Queue 32, the Owner Node 12O completes the eviction transaction by sending a response to the Node 12 at the head of the Prepention Queue 32 indicating that that requesting Node 12 is now the new Line 24's Owner Node 12O. Included in the response to the new Owner Node 12O will be a copy of the Vector 30V directory and a copy of the Line 24 if the request indicated that a copy of the Line 24 should be provided. Finally, if speculative read transactions as described herein above are implemented in the system, the evicting Owner Node 12O transitions to the CS_INVALID_SPEC 42E state and saves the identifier of the new Owner Node 12O. This operation thereby allows the evicting Node 12 to rapidly regain read access to the Line 24 if evicting Node 12 is undergoing cache thrashing.

If the Vector 30V directory is not empty when an Owner Node 12O starts an eviction transaction, the Owner Node 12O will attempt to pass ownership for the Line 24 to a current one of Leaf Nodes 12L by selecting a Leaf Node 12L from the Vector 30V directory and sending the selected Leaf Node 12L a request asking the selected Leaf Node 12L to become the Owner Node 12O. Included in the request will be a copy of the current Vector 30V directory contents and if the Vector 30V directory information for the Leaf Node 12L is valid, and the Leaf Node 12L still has a copy of the Line 24 cached, the Leaf Node 12L will accept ownership for the Line 24 by sending the appropriate response to the evicting Owner Node 12O.

If, however, the Vector 30V directory information in the evicting Owner Node 12O was stale, and the selected Leaf Node 12L no longer has a copy of the Line 24, the selected Leaf Node 12L will respond to the request from the evicting Owner Node 12O by an response indicating that the selected Leaf Node 12L cannot accept ownership for the Line 24. In this case, the Owner Node 12O will clear the selected Leaf Node 12L's bit in the Vector 30V directory and select another Leaf Node 12L to which to attempt to pass the ownership of the Line 24. If after one or more attempts all of the Vector 30V directory bits become cleared, the Owner Node 12O will revert to returning the Line 24 to the Home Node 12H as described above.

Once ownership is passed, the evicting Owner Node 12O has the responsibility of updating the Home Node 12H's PTR 30PH value to the identifier of the Owner Node 12O of the Line 24 and does so by sending a replace Owner Node 12O request to the Home Node 12H wherein the replace Owner Node 12O request will include the identifier of the new Owner Node 12O in the Request Packet 36A NEWID 381. The Home Node 12H first determines whether there are any Node 12S currently in a Prepention Queue 32 associated with the Line 24 and, if not, updates its PTR 30PH and sends and appropriate response. At this point the Line 24 ownership has been successfully passed and the evicting Owner Node 12O can transition to an invalid state once the Owner Node 12O receives the response from the Home Node 12H.

If the Prepention Queue 32 is not empty the Home Node 12H will retry the replace owner request in the same manner as a retry of a return Home Node 12H request. In this case, the evicting Owner Node 12O will again spin request against the Home Node 12H until the request completes or until the Home Node 12H successfully forwards a request for the Node 12 at the head of the Prepention Queue 32.

It will be noted that the CBV coherency methods and mechanisms of the present invention do not specify the algorithm used to select candidate Leaf Nodes 12L for ownership passing as a variety of such algorithms are available and well known to those of ordinary skill in the relevant arts. For example, a given implementation may select candidate Leaf Nodes 12L in a hard coded order or may try to ensure a random distribution of Line 24 ownerships through the use of a more complicated algorithm. The method implemented to select candidate Leaf Node 12Ls may be based, for example, on the expected behavior of the system and upon such design, risk or cost constraints or preferences that may exist.

It should also be noted that because of the manner in which Leaf Nodes 12L remove themselves from the Prepention Queue 32, it is possible for races to occur if the Line 24 Owner Node 12O attempts an eviction before a Node 12 that has requested to become a Leaf Node 12L has completed its cleanup tasks. For example, the Owner Node 12O's request to pass ownership may arrive before the potential Leaf Node 12L has received a response indicating the potential Leaf Node 12L has been added to the Vector 30V directory as a Leaf Node 12L. Due to the loose coupling between Owner Nodes 12O and Leaf Nodes 12L, the potential Leaf Node 12L receiving the request to transfer ownership does not know if the response to its request to become a Leaf Node 122L has been delayed or if the request to transfer ownership was sent by the Owner Node 12O based on stale Vector 30V directory information.

In order to resolve this ambiguity, the CBV coherency methods and mechanisms of the present invention implement a two phase process wherein, during the first phase, the potential Leaf Node 12L transitions to a new state that indicates it is in a potential race with the Owner Node 12O and then retries the request to pass ownership. The potential Leaf Node 12L will continue to retry the request to pass ownership until the potential Leaf Node 12L receives a response for the outstanding request to become a Leaf Node 12L and the reception of the response to the request to become a Leaf Node 12L initiates the second phase of the algorithm. If the potential Leaf Node 12L was added to the Vector 30V directory as a Leaf Node 12L, the response to the request to become a Leaf Node 12L will indicate that this occurred. In this case, the Node 12 requesting to become a Leaf Node 12L will proceed as a new Leaf Node 12L and will interact correctly with the Owner Node 12O's request to pass ownership. If, however, the Node 12's request to become a Leaf Node 12L arrived at the Owner Node 12O after the Owner Node 12O started its eviction transaction and attempt to transfer ownership the response will indicate that the request should be retried. In this case, the racing Node 12 that is requesting to become a Leaf Node 12L will transition to a new state indicating that it is not a potential Owner Node 12O for the Line 24. The next time the racing Node 12 that is requesting to become a Leaf Node 12L receives the request to pass ownership, it will respond with a response indicating that the Vector 30V directory information is stale and that the Owner Node 12O should select another candidate Leaf Node 12L.

A yet further example is a race condition arising from a conflict between an Owner Node 12O evicting a Line 24 and one or more Leaf Nodes 12L concurrently requesting write access to the Line 24. While attempting to obtain, write access to a Line 24, a Leaf Node 12L remains in the Leaf Node 12L "sharing tree" as a Leaf Nodes 12L while simultaneously entering a Prepention Queue 32 associated with the Line 24 with an invalidation request, thereby resulting in two conflicting conditions that could, if unresolved, result in a deadlock. The first condition is that a Leaf Node 12L cannot inherit Line 24 ownership until it has completed its promotion transaction to write access. The second condition is that an evicting Owner Node 12O will not allow a Node 12 in a Prepention Queue 32 make forward progress through its requested transaction, or through the Prepention Queue 32, until the Owner Node 12O determines that it cannot pass Line 24 ownership to any of the currently existing Leaf Nodes 12L.

According to the CBV methods and mechanisms of the present invention, these conflicting conditions are resolved by having the Owner Node 12O create a mirrored copy of the Vector 30V directory, referred to and illustrated in FIG. 2A as an Eligible Leaf Node 12L Mask (EL Mask) 30ELM, which is used in conjunction with the Vector 30V directory to resolve all ownership transferal races. Initially, the EL Mask 30ELM and Vector 30V directory values will be the same. However, as the Owner Node 12O tries to pass ownership to the Leaf Nodes 12L it will iteratively clear bits in the EL Mask 30ELM for Node 12s which respond to a request to transfer ownership with an indication that they are in a race with the Owner Node 12O. As bits in the EL Mask 30ELM are progressively cleared, the Owner Node 12O progressively selects a new Leaf Node 12L to attempt to pass ownership to based on the remaining bits set in the EL Mask 30ELM.

Therefore, and as long as at least one Leaf Node 12L is not trying to promote its access rights to write access, a Leaf Node 12L will eventually be found to accept ownership of the Line 24 and the evicting Owner Node 12O will complete the eviction transaction by performing such Prepention Queue 32 requests that may be required. In this case, the racing write access promotion requests from the Leaf Node 12L(s) will ultimately reach the new Owner Node 12O of the Line 24 and will be resolved accordingly. If, however, all of the current Leaf Nodes 12L are racing to promote their access rights to write access, none of the Leaf Nodes 12L can accept ownership for the Line 24. The evicting Owner Node 12O will detect this case when all of the bits in the EL Mask 30ELM have been cleared but there is least one non-zero bit in the Line 24's Vector 30V directory. To resolve this condition, the evicting Owner Node 12O will cease attempts to pass ownership to the Leaf Nodes 12L, and instead will "stall" while waiting for a request from the Node 12 at the head of the Prepention Queue 32. Upon receiving the request from the Node 12 heading the Prepention Queue 32, the Owner Node 12O completes the eviction transaction by providing a response to the request indicating that the requesting Node 12 heading the Prepention Queue 32 is now the Owner Node 12O, wherein the response will include a copy of the current Vector 30V directory and, if requested by the Node 12 at the head of the Prepention Queue 32, a copy of the Line 24.

It will also be readily recognized by those of ordinary skill in the relevant arts that the present invention as described herein above may be modified or extended without changing the nature or operation of the present invention. It will also be apparent to those of ordinary skill in the relevant arts that the present invention may be implemented in any form of system comprised of multiple processing units wherein at least some of the processing units may share data. For example, and in addition to an the illustrative example of an System 10 as described herein, the present invention may be implemented in a multiple disk drive/multiple processor file server system, including a networked file server system, wherein clients of the server are serviced by different processors of the server. In this example, the processors of the server would comprise Nodes 12 of the system while the clients of the server would comprise agents of the server processors. Also, and as discussed previously herein, while a "Line 24" is typically of a fixed size corresponding to a unit of data convenient to operations of the Processors 16 and Nodes 12, Lines 24 may be of any selected size, ranging from a single bit to an entire file or group of files, or may be of variable sizes, and the data residing in a "Line 24" may comprise any form of data.

D. Brief Description of Node 12 Cache Coherency Mechanisms (FIG. 16)

As has been described herein above, the CBV coherency methods and mechanisms of the present invention are implemented in a System 10 on a per node basis and may be implemented in all or only some of the nodes of a system, but is required only in those Nodes 12 which are to participate in line sharing. Also, the functions and roles of each Node 12 in a System 10 are determined on a per Line 24 basis and typically will change during operations of the System 10, so that any Node 12 may assume the roles of a Home Node 12H, a Leaf Node 12L or an Owner Node 12. As such, the mechanisms of the present invention that are implemented in any Node 12 of a System 10 are typically identical for all Nodes 12 in which they are implemented. It will be recognized and understood by those of ordinary skill in the relevant arts, however, that selected Nodes 12 may be assigned specific roles in a System 10 and that, for example, such assignments may be permanent or until such time as the System 10 is reconfigured. For example, one or more Nodes 12 may be designated as Home Nodes 12H while the other Nodes 12 of the System 10 may be assigned to function only as Owner Nodes 12O and Leaf Nodes 12L, so that the designated Home Nodes 12H function as "file servers" to the remaining Nodes 12 of the System 10. In such instances, it will be understood that only the elements of the mechanisms and methods of the present invention that are necessary to the assigned role of a Node 12 need be implemented in the Node 12, and the adaptation of the methods and mechanisms of the present invention to such circumstances will be well understood by those of ordinary skill in the relevant arts.

Figure 16:
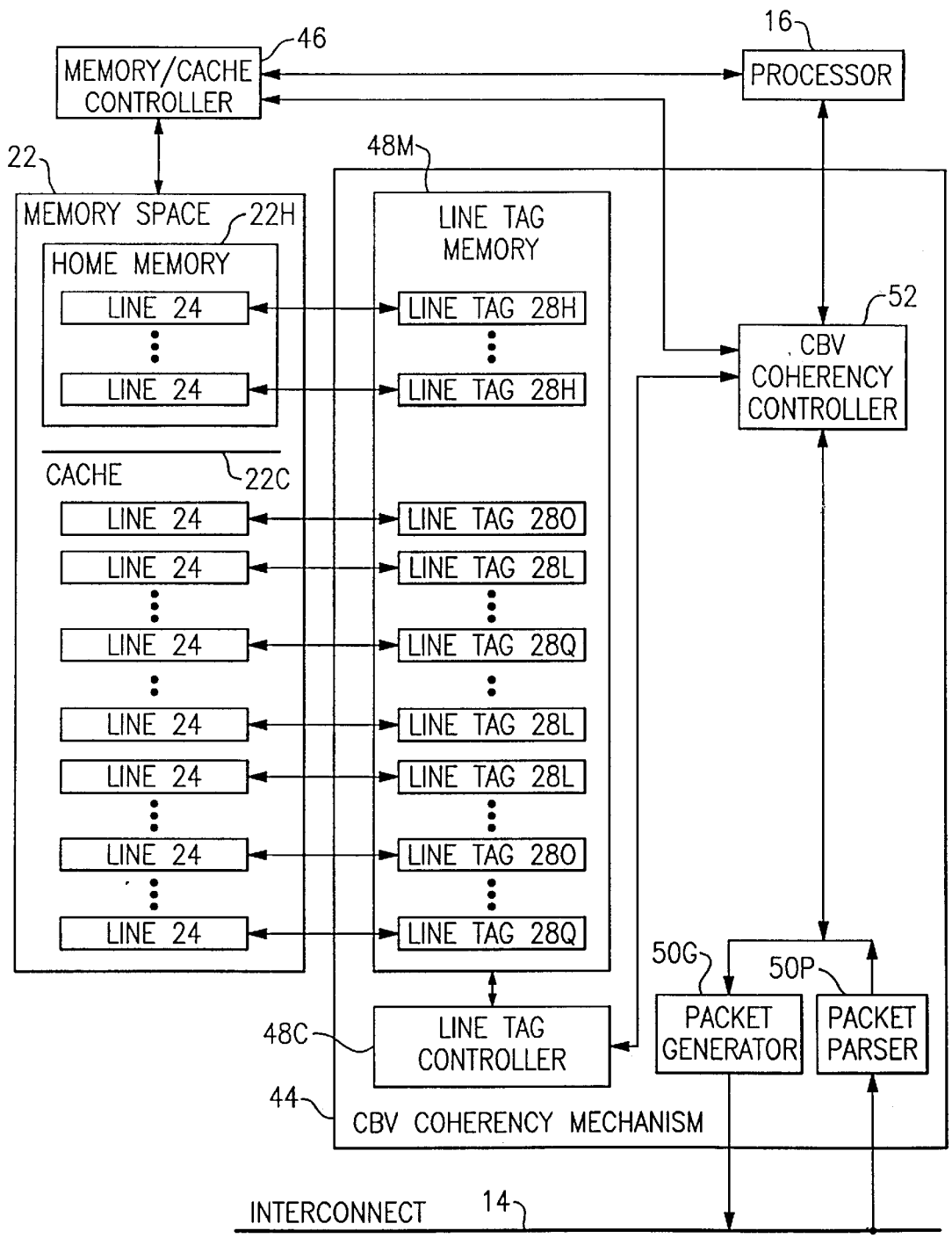
FIG. 16 is a diagrammatic representation of a cache coherency mechanism in a node.

Referring to FIG. 16, therein is shown a diagrammatic representation of a CBV Coherency Mechanism 44 implementing the methods of the present invention. The implementation of CBV Coherency Mechanism 44 illustrated in FIG. 16 represents a full implementation of CBV Coherency Mechanism 44, that is, an implementation for a Node 12 capable of fulfilling the roles of a Home Node 12H, an Owner Node 12 and a Leaf Node 12L. As discussed above, the adaptation of the implementation of CBV Coherency Mechanism 44 as illustrated in FIG. 16 for a Node 12 that is to perform a limited selection of roles will be apparent to those of ordinary skill in the relevant arts.

As illustrated in FIG. 16, and as described herein above with respect to FIG. 1, a Node 12 typically includes one or more Processors 16, an I/O Sub-System 18 and a Memory Sub-System 20 which may include both dynamic memory and storage devices. The Memory Sub-System 20 of each Node 12, together with the dynamic memory space associated with each Processor 16, comprises a Node Memory Space 22 for storing or encaching Lines 24 and the Memory Spaces 22 of Nodes 12, in turn, comprise a Global Memory Space 26 containing all shared Lines 24 resident in the System 10. As represented in FIG. 16, the Memory Space 22 of each Node 12 may be regarded as comprised of a Home Line Memory Space (Home Memory) 22H for storing the Lines 24 for which the Node 12 is the Home Node 12H and a Cache Memory Space (Cache) 22C for storing encached copies of Lines 24 for which the Node 12 is an Owner Node 12O or a Leaf Node 12L.

In the presently preferred embodiment, a CBV Coherency Mechanism 44 is implemented in a Node 12 as designated storage spaces in the Memory Space 22 of the Node 12 and as program controlled mechanisms existing and executing in the Processors 16 and Memory Space 22 of the Node 12. An exemplary embodiment of a CBV Coherency Mechanism 44 is illustrated in FIG. 16 for an implementation capable of performing the full range of possible roles of a Node 12 according to the present invention, that is, as a Home Node 12H, an Owner Node 12O and a Leaf Node 12L.

As represented therein, the CBV Coherency Mechanism 44 resident in a Node 12 is associated with a Home Memory 22H for storing the Lines 24 for which the Node 12 is the Home Node 12H and a Cache 22C for storing encached copies of Lines 24 for which the Node 12 is an Owner Node 12O or a Leaf Node 12L. As described, a given Node 12 may concurrently be a Home Node 12 to none, one or a plurality of Lines 24, an Owner Node 12O of none, one or a plurality of Lines 24, and a Leaf Node 12L of none, one or a plurality of Lines 24. As also indicated in FIG. 16, a Memory/Cache Controller 46 is associated with Home Memory 22H and Cache 22C and performs memory and cache administrative functions, such as the reading, writing, modification, validation, invalidation and eviction of Lines 24, under the control of Processors 16 and the CBV Coherency Mechanism 44. As the specific details of the construction and operation the construction and operation of a Home Memory 22H, Cache 22C and Memory/Cache Controller 46 will be dependent upon the specific design of the Node 12, and will be well known and understood and by those of ordinary skill in the relevant arts, these elements will not be discussed in further detail herein. In this regard, however, it should be noted that in certain implementations of a Node 12 and of a CBV Coherency Mechanism 44 the Cache 22C and Memory/Cache Controller 46 may be included as elements of the CBV Coherency Mechanism 44, rather than associated with the memory and processor elements of the Node 12. The adaptations of design necessary for such implementations will, however, be well understood by those of ordinary skill in the relevant arts.

As illustrated in FIG. 16, the CBV Coherency Mechanism 44 in a Node 12 further includes a Line Tag Memory 48M for storing the Line Tag 28H, 28O, 28L or 28Q of each Line 24 resident or encached in the Node 12, depending upon whether the Node 12 is the Home Node 12H or Owner Node 12O or a Leaf Node 12L of the Line 24 and whether the Node 12 is represented in a Prepention Queue 32 of the Line 24 because of a request directed to the Line 24 by the Node 12. A given Node 12 will contain a Line Tag 28H for and corresponding to each Line 24 for which it is the Home Node 12H, a Line Tag 28O for and corresponding to each Line 24 for which it is an Owner Node 12O, and a Line Tag 29L for and corresponding to each Line 24 for which it is a Leaf Node 12L. Associated with Line Tag Memory 48 is a Line Tag Controller 48C, which reads, writes and modifies the Line Tags 28H, 28O, 28L or 28Q of each Line 24 residing in the Node 12 according to the current state of a Line 24 in the Node 12, as described herein above.

The CBV Coherency Mechanism 44 of a Node 12 further includes a Packet Generator 50G and a Packet Parser 50P connected to and from Interconnect 14 to respectively generate and transmit and to receive and parse, or decode, Request Packets 36A, Response Packets 36B and Forwarded Request Packets 36C as described herein above and as required by the operations of the Node 12 and of other Nodes 12 that are communicating with the Node 12. The design, construction and operation of a Packet Generator 50G or a Packet Parser 50P will be well understood by those of ordinary skill in the relevant arts, and in particular after the above descriptions of the present invention, so that Packet Generator 50G and Packet Parser 50P will not be described in further detail herein.

Lastly, the CBV Coherency Mechanism 44 of a Node 12 includes a CBV Coherency Controller 52 to control the operations of the CBV Coherency Mechanism 44 as a function of current and pending Line 24 operations being performed by the Node 12 and CBV Coherency Mechanism 44, the state of the Line 24 and Node 12, and the states and operations of other Nodes 12, as described herein above. Coherency Controller 52 may be implemented, for example, as a state machine or as functionally equivalent alternate mechanisms, such as program control of Processors 16 and, as the design, construction and operation of such controller are well understood by those of ordinary skill in the relevant arts, Coherency Controller 52 will not be discussed further herein. It will also be understood that the functions and operations elements of a CBV Coherency Mechanism 44 that have been represented individually above, such as Line Tag Controller 48C, Packet Generator 50G and Packet Parser 50P, may be incorporated into and implemented as part of the CBV Coherency Controller 52, depending upon the specific implementation of a CBV Coherency Mechanism 44.

Finally, Appendix A hereto describes encodings, commands, states and state transitions of the mechanisms and method of the present invention in further detail.

It will be apparent that the Nodes 12 of a System 10 that participate in line sharing may be readily expanded by adding Nodes 12 in which the mechanisms of the present invention are implemented, or by adding the mechanisms of the present invention to the existing nodes of a System 10.

It will also be apparent that the mechanisms of the present invention are effectively independent of the specific form of the nodes of a System 10 and of the configuration and operation of other mechanisms of a System 10, including the Interconnection 14, so that the present invention may be readily implemented into any System 10. It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. In a system including a plurality of nodes sharing lines of information wherein each line is an element of information residing in an associated home node, a shared line coherency mechanism for sharing lines among the nodes while maintaining coherency of shared lines, comprising:

for each shared line,
a single associated home node of the system for storing the line,
a plurality of leaf nodes wherein each leaf node shares the line and contains an encached copy of the line, and
a single associated owner node for storing a vector directory, wherein
the owner node operates to track all leaf nodes of the line,
the vector directory contains an entry for each possible leaf node of the line and each entry indicates whether the corresponding node is a leaf node having a valid copy of the line, and
the current owner node is
the first node to access the line, and subsequently the last node to modify the line.

2. The shared line coherency mechanism of claim 1, wherein:

a home node of a line includes
the associated line, and
a line tag representing
a current home node state, and
an identifier of a current node to which the home node is to direct communications,
a leaf node of a line includes
an encached copy of the line, and
a line tag representing
a current leaf node state, and
an identification of a current node to which the leaf node is to direct communications, and
an owner node of a line includes
an encached copy of the line, and
a line stage representing
a current owner node state, and
a vector directory including an entry corresponding to each possible sharing node of the system and indicating each current leaf node of the line.

3. The shared line coherency mechanism of claim 2, wherein:

the current node to which the home node is to direct communications is the current owner node of the associated line.

4. The shared line coherency mechanism of claim 2, wherein:
the current node to which the home node is to direct communications is a node requesting access to the associated line.

5. The shared line coherency mechanism of claim 2, wherein:
the current node to which the leaf node is to direct communications is a suspected current owner node of the associated line.

6. The shared line coherency mechanism of claim 1, wherein:
all requests directed to a shared line are directed to the home node of the line,
a home node receiving a request directed to a shared line will
provide a copy of the line to the requesting node, and will
forward the request to the owner node of the line for completion of the request.

7. The shared line coherency mechanism of claim 1, further comprising a prepention queue mechanism for ordering pending requests for access to a line, comprising:
the home node of the line,
wherein the home node is responsive to a request by a requesting node for access to a line while a preceding request is uncompleted by adding the requesting node to a prepention queue containing at least one preceding node having an uncompleted request for access to the line by directing the requesting node to communicate one or more retry requests to the immediately preceding node in the prepention queue, and
each requesting node in the prepention queue, wherein
each requesting node in the prepention queue is responsive to placement in the prepention queue by
spin looping retry requests against the immediately preceding node until the immediately preceding node exits the prepention queue upon completion of a request by the immediately preceding node,
communicating a next retry request to the owner node, and
exiting the prepention queue upon completion of the request.

8. In a system including a plurality of nodes sharing lines of information wherein each line is an element of information residing in an associated home node, a method for providing nodes with access to lines while maintaining coherency of shared lines, comprising the steps of:
in a requesting node, communicating a request for access to a line and including a requesting node identifier to a home node of the line,
in the home node,
communicating a response including a copy of the line and an owner node identifier to the requesting node, and
concurrently communicating the request and requesting node identifier to an owner node of the line, and
in the requesting node,
encaching the copy of the line and
storing the owner node identifier, and in the owner node,
setting a vector directory bit identifying the requesting node as a leaf node of the line.

9. The method of claim 8, further comprising the steps of:
in the owner node and at the completion of the request, communicating a response to the requesting node including an identifier of the home node and indicating completion of the request.

10. The method of claim 8, wherein:
a shared line will have
a single associated home node wherein the line resides, and
a single associated owner node having an encached copy of the line and which performs functions for tracking encached copies of the line, and
a shared line may have
a plurality of leaf nodes wherein each leaf node will have an encached copy of the line and will be identified in the owner node.

11. The method of claim 8, wherein:
a home node of a line includes
the associated line, and
a line tag representing
a current home node state, and
an identifier of a current node to which the home node is to direct communications,
a leaf node of a line includes
an encached copy of the line, and
a line tag representing
a current leaf node state, and
an identification of a current node to which the leaf node is to direct communications, and
an owner node a line includes
an encached copy of the line, and
an line tag representing
a current owner node state, and
a vector directory including an entry corresponding to each possible sharing node of the system and indicating each current leaf node of the line.

12. The method of claim 11, wherein:
the identifier of the current node to which the home node is to direct communications is an identifier of the current owner node of the associated line.

13. The method of claim 11, wherein:
the identifier of the current node to which the home node is to direct communications is an identifier of a node requesting access to the associated line.

14. The method of claim 11, wherein:
the identifier of the current node to which the leaf node is to direct communications is an identifier of the suspected owner node of the associated line.

15. The method of claim 11, wherein:
the identifier of the current node to which the leaf node is to direct communications is an identifier of a non-home node.

16. The method of claim 8, further including a method for communicating information pertaining to requests among the nodes, comprising the steps of:
communicating a request from a requesting node to another node in a request packet wherein a request packet contains information pertaining to the request,
communicating a response to a request packet from a node receiving a request packet to another node in a response packet wherein a response packet contains information pertaining to the performance of the request, and
communicating a request from a node receiving a request packet to a node to which the request packet is directed in a forwarded request packet wherein a forwarded request packet contains information pertaining to the request and is communicated concurrently with a corresponding response packet.

17. The method of claim 16, wherein a request packet includes:
an identifier of a node to which the request is directed,
an identifier of a node sending the packet,
and identifier of a node originating the request,
a transaction identifier assigned by the node originating the request and identifying the request transaction,
an identifier of a target of the request,
a command pertaining to the request, and
a command qualifier representing a specific requested action.

18. The method of claim 17, wherein a request packet further includes:
an identification of possible current leaf nodes of a line that is a target of the request.

19. The method of claim 17, wherein a request packet further includes:
an identifier of a node to which communications are to be directed.

20. The method of claim 16, wherein a response packet includes:
an identifier of a node to which the response is directed,
an identifier of a node which originated a request to which the response packet contains a response,
a transaction identifier assigned by the node originating the request and identifying the request transaction,
a command, and
a command qualifier representing a specific requested action.

21. The method of claim 20, wherein a response packet further includes:
an identification of possible current leaf nodes of a line that is a target of the request.

22. The method of claim 20, wherein a response packet further includes:
an identifier of a node to which communications are to be directed.

23. The method of claim 20, wherein a forwarded request packet includes:
an identifier of a node to which the request is directed,
an identifier of a node sending the packet,
and identifier of a node originating the request,
a transaction identifier assigned by the node originating the request and identifying the request transaction,
an identifier of a target of the request,
a command pertaining to the request, and
a command qualifier representing a specific requested action.

24. The method of claim 23, wherein a forwarded request packet further includes:
an identification of possible current leaf nodes of a line that is a target of the request.

25. The method for maintaining coherency of shared lines of claim 23, wherein a forwarded request packet further includes:
an identifier of a node to which communications are to be directed.

26. The method of claim 8, further comprising a method for ordering performance of pending requests for access to a line, comprising the steps of:
in the home node,
when a request for access to a line is received while a preceding request is uncompleted, adding the requesting node to a prepention queue containing at least one preceding node having an uncompleted request for access to the line by responding to the requesting node with a retry response directing the requesting node to communicate a retry request to the immediately preceding node in the prepention queue, and
in the requesting node,
spin looping retry requests against the immediately preceding node until the immediately preceding node exits the prepention queue upon completion of a request by the immediately preceding node,
communicating a retry request to the owner node, and
exiting the prepention queue upon completion of the request.

27. The method of claim 8, further comprising a method for ordering pending requests for access to a line, comprising the steps of:
in the home node,
when a request for access to a line by a requesting node is received by the home node of the line while a preceding request for access to the line by a preceding node is uncompleted,
adding the requesting node to a prepention queue containing at least one node having an uncompleted request for access to the line by
communicating a copy of the line, an identifier of the preceding node and a request retry command to the requesting node, and
storing an identifier of the requesting node as an identifier of a next preceding node,
in the requesting node,
encaching the copy of the line and the identifier of the preceding node, and
communicating a retry request to the preceding node,
and in the preceding node and upon receiving a retry request from the requesting node,
while the preceding request is uncompleted,
communicating a request retry command to requesting node, and
when the preceding request is completed,
communicating an identifier of a current owner node and a retry command to the requesting node, and
leaving the prepention queue, and
in the requesting node,
communicating a retry request to the current owner node, and
upon completion of the request the requesting node, leaving the prepention queue.

28. In a system including a plurality of nodes sharing lines of information wherein each line is an element of information residing in an associated home node, a method for providing nodes with access to lines while maintaining coherency of shared lines, comprising the steps of:
in a requesting node, communicating a request for access to a line and including a requesting node identifier to the home node,
when an owner node does not exist,
in the home node,
providing a response including a copy of the line and a home node identifier to the requesting node, and
storing the requesting node identifier as an owner node identifier, and
in the requesting node,
encaching the copy of the line, and storing an identifier of the home node, and
storing a vector directory having an entry for each potential sharing node of the system, and
when an owner node exists,
in the home node,
providing a response including a copy of the line and an owner node identifier to the requesting node, and
concurrently providing the request and requesting node identifier to the owner node,
in the requesting node,
encaching the copy of the line and
storing the owner node identifier, and
in the owner node,
setting a vector directory bit identifying the requesting node as a leaf node.

29. The method of claim 28, wherein:
a shared line will have
a single associated home node wherein the line resides, and
a single associated owner node having an encached copy of the line and which performs functions for tracking leaf nodes of the line, and
a shared line may have
a plurality of leaf nodes wherein each leaf node will have an encached copy of the line and will be identified in the owner node.

30. In a system including a plurality of nodes sharing lines of information wherein each line is an element of information residing in an associated home node, a method for providing a requesting node with access to a currently unshared line while maintaining coherency of shared lines, comprising the steps of:
in the requesting node, communicating a read request directed to the line to the home node, the read request including a requesting node identifier,
in the home node,
providing a response including a copy of the line and a home node identifier to the requesting node, and
storing the requesting node identifier as an owner node identifier, and
in the requesting node,
encaching the copy of the line,
storing an identifier of the home node,
beginning operation of an owner node of the line, and
storing a vector directory having an entry for each potential sharing node of the system.

31. In a system including a plurality of nodes sharing lines of information wherein each line is an element of information residing in an associated home node, a method for providing a requesting node with read access to a currently read shared line while maintaining coherency of shared lines, comprising the steps of:
in the requesting node, communicating a read request directed to the line to the home node, the read request including a requesting node identifier,
in the home node,
storing the requesting node identifier,
providing a response including a copy of the line and an owner node identifier, to the requesting node, and
concurrently forwarding the request, including the requesting node identifier, to an owner node of the line,
in the requesting node,
encaching the copy of the line and
storing the owner node identifier, and
in the owner node,
setting a vector directory bit identifying the requesting node as a leaf node of the line.

32. In a system including a plurality of nodes sharing lines of information wherein each line is an element of information residing in an associated home node, a method for providing a requesting node with modification access to a currently read shared line while maintaining coherency of shared lines, comprising the steps of:
in the requesting node, communicating a read-invalidate request directed to the line to the home node, the read-invalidate request including a requesting node identifier,
in the home node,
invalidating the copy of the line resident in the home node,
storing the identifier of the requesting node as a new owner node,
concurrently forwarding the request, including the requesting node identifier and an indicator that the line is being invalidated, to a current owner node of the line, and
providing a response, including a copy of the line and an indicator that the request was forwarded to the current owner node, to the requesting node,
in the current owner node,
invalidating the copy of the line encached in the current owner node, and
sending a response containing a copy of the current vector directory to the requesting node,
in the requesting node,
storing the copy of the current vector directory, and
sending an invalidate leaf request to each leaf node identified in the current vector directory, each invalidate leaf request including an identifier of the requesting node,
in each leaf node receiving an invalidate leaf request,
when the leaf node does not have an encached copy of the line,
providing to the requesting node a response indicating whether node has encached copy of the line, and
when the leaf node has a copy of the line, invalidating the encached copy of the line, and
in the requesting node,
modifying the line, and
beginning operation as the current owner node of the line.

33. The method of claim 32, further including a method for providing a requesting leaf node having an invalidated copy of a modified line with read access to the modified line, comprising the steps of:
in the leaf node, communicating a speculative read request for the modified line to the current owner node of the line as identified by the node identifier provided to the leaf node in the invalidate leaf request,
in the current owner node,
setting a vector directory bit identifying the requesting leaf node as a leaf node having a valid copy of the modified line, and
sending a response containing a copy of the modified line to the requesting leaf node, in the leaf node,
    encaching the copy of the modified line.

34. In a system including a plurality of nodes sharing lines of information wherein each line is an element of information residing in an associated home node, a method for promoting a read access of a requesting node of a read-only encached line to a write access to the line while maintaining coherency of shared lines, comprising the steps of:
    in the requesting node, communicating an access promotion request to the home node of the line, the request including an identifier of the requesting node,
    in the home node,
        invalidating the copy of the line encached in the home node, and
        forwarding the promotion request to the owner node of the line, and in the owner node,
    if the requesting node is the owner node,
        sending invalidate requests to all leaf nodes indicated in a vector directory of nodes having an encached valid copy of the line, and
        assuming write access to the line, and if the requesting node is a leaf node,
        invalidating the copy of the line encached .in the owner node, and
        sending a response containing a copy of the current vector directory to the requesting leaf node, and
    in the requesting leaf node,
        storing the copy of the current vector directory, and
        sending an invalidate leaf request to each leaf node identified in the current vector directory, each invalidate leaf request including an identifier of the requesting node as a new owner node,
        beginning operation as the owner node of the line, and assuming write access to the line.

35. The method of claim 34 for promoting a read access of a requesting node to a read-only encached line to a write access to the line while maintaining coherency of shared lines, further comprising the steps of:
    if the promotion request is preceded by one or more presently uncompleted requests for access to the line,
    in the home node,
        forwarding the promotion request to a queue of pending requests,
    in the owner node,
        receiving and completing each request in order from the queue,
            receiving the promotion request from the queue, and
            if the requesting node is the owner node, and
                if the preceding requests did not modify the line, completing the promotion request, and
                if at least one preceding request modified the line, updating the promotion request by generating a request for write access to the line.

36. The method of claim 35, further comprising a method for ordering performance of pending requests for access to a line, comprising the steps of:
    in the home node,
        when a request for access to a line is received while a preceding request is uncompleted, forwarding the requesting node to a queue containing at least one preceding node having an uncompleted request for access to the line, and
    in each requesting node in the queue,
        spin looping retry requests against the immediately preceding node in the queue until the immediately preceding node exits the queue upon completion of a request by the immediately preceding node, and communicating a retry request to the owner node.

37. The method of claim 36, further comprising the steps of:
    in the home node,
        including in each request forwarded to the queue a first indicator when the line is read shared only and a second indicator when the line has been modified, and
    in the owner node,
        when a request is received by the owner node, determining whether the request includes a first indicator or a second indicator, and
        completing the request when the request includes the first indicator, and
        sending a retry response to a node identified in the request when the request includes the second indicator.

38. In a system including a plurality of nodes sharing lines of information wherein each line is an element of information residing in an associated home node and wherein a shared line will have a single associated home node wherein the line resides and a single associated owner node having an encached copy of the line and which performs functions for tracking leaf nodes of the line and wherein a shared line may have a plurality of leaf nodes wherein each leaf node will have an encached copy of the line, will be identified in a vector directory in the owner node and will contain an identifier of the suspected owner node, a method for evicting a line from a leaf node while maintaining coherency of shared lines, comprising the steps of:
    in the evicting leaf node,
        communicating an eviction request to the suspected owner node, and
        evicting the encached copy of the line,
    in the suspected owner node,
        if the suspected owner node is the current owner node of the line,
            removing the leaf node from the vector directory of leaf nodes, and
            sending a response that the request is completed to the evicting leaf node.

39. In a system including a plurality of nodes sharing lines of information wherein each line is an element of information residing in an associated home node and wherein a shared line will have a single associated home node wherein the line resides and a single associated owner node having an encached copy of the line and which performs functions for tracking leaf nodes of the line and wherein a shared line may have a plurality of leaf nodes wherein each leaf node will have an encached copy of the line, will be identified in a vector directory in the owner node and will contain an identifier of the suspected owner node, a method for evicting a line from the owner node while maintaining coherency of shared lines, comprising the steps of:
    in the owner node,
        reading the vector directory to determine whether the current vector directory contains a leaf node indicated as containing a valid copy of the line, and
        when the current vector directory contains a leaf node indicated as containing a valid copy of the line,
            selecting a leaf node indicated as containing a valid copy of the line as a potential owner node, and
            sending a request to assume ownership of the line to the selected leaf node, the request including a copy of the current vector directory,
    in the selected leaf node,
        if the selected leaf node contains a valid copy of the line, assuming ownership of the line,
storing the current copy of the vector directory, and
sending a response accepting ownership of the line to the evicting owner node, and
if the selected node does not contain a valid copy of the line,
sending a response declining ownership of the line to the evicting owner node,
in the owner node,
when a response accepting ownership of the line is received from the selected leaf node,
evicting the encached copy of the line, and
sending a request to the home node containing an identifier of the selected leaf node as the owner node of the line, and
when a response declining ownership of the line is received from the selected leaf node,
removing the selected leaf node from the current vector directory, and
returning to the step of repeating the step of determining whether the current vector directory contains a leaf node indicated as containing a valid copy of the line, and
when the current vector directory does not contain a leaf node indicated as containing a valid copy of the line,
sending a request to the home node indicating that the line is unshared.

40. In a system including a plurality of nodes sharing lines of information wherein each line is an element of information residing in an associated home node and wherein each node includes a processor for performing operations on lines, a memory for storing lines for which the node is the home node, a cache for storing shared lines, a memory/cache manager for performing memory and cache functions, a shared line coherency mechanism residing in each node participating in line sharing for maintaining coherency of shared lines, comprising:
a line tag memory for storing a line tag for each line resident in the node,
a packet generator and parser for communicating requests and responses to requests pertaining to lines among the nodes of the system, and
a coherency controller responsive to line operations of the node and communications pertaining to lines among the nodes of the system and for controlling operation of the memory/cache manager, wherein
the line tag associated with a line resident in the node includes
a state value representing a state of the line with respect to the node, wherein the state value may represent
that the node is the single associated home node of the line and the current state of the line in the line home node,
that the node is a leaf node of the line containing an encached copy of the line and the current state of the line in the leaf node, and
that the node is a single associated owner node of the line and the state of the line in the line owner node, and
an identifier of a node relevant to the current state of the line, wherein
when the node is the home node or a leaf node of the line, the identifier indicates a current node to which the node is to direct communications pertaining to the line, and
when the node is the owner node of the line, the identifier is vector directory containing an entry for each possible leaf node of the line and each entry indicates whether the corresponding node is a leaf node contains a valid copy of the line.

41. The shared line coherency mechanism of claim 40, wherein:
when the node is the home node of the line, the current node to which the home node is to direct communications is the current owner node of the associated line.

42. The shared line coherency mechanism of claim 40, wherein:
when the node is the home node of the line, the current node to which the home node is to direct communications is a node requesting access to the associated line.

43. The shared line coherency mechanism of claim 40, wherein:
when the node is a leaf node of the line, the current node to which the leaf node is to direct communications is a suspected current owner node of the associated line.

44. The shared line coherency mechanism of claim 40, wherein:
all communications that are requests directed to a shared line are directed to the home node of the line, and
a home node receiving a request directed to a shared line will
provide a copy of the line to the requesting node, and will
forward the request to the owner node of the line for completion of the request.

45. The shared line coherency mechanism of claim 40, further comprising a prepention queue mechanism for ordering pending requests for access to a line, comprising:
the shared line coherency mechanism of the home node of the line, wherein
the shared line coherency mechanism of the home node is responsive to a request by a requesting node for access to a line while a preceding request is uncompleted by adding the requesting node to a prepention queue containing at least one preceding node having an uncompleted request for access to the line by directing the requesting node to communicate one or more retry requests to the immediately preceding node in the prepention queue, and
the shared line coherency mechanism of each requesting node in the prepention queue, wherein
each requesting node in the prepention queue is responsive to placement in the prepention queue by
spin looping retry requests against the immediately preceding node until the immediately preceding node exits the prepention queue upon completion of a request by the immediately preceding node,
communicating a next retry request to the owner node, and
exiting the prepention queue upon completion of the request.

46. The prepention queue mechanism of claim 45, wherein:
the shared line coherency mechanism of the home node adds a requesting node to a prepention queue by communicating to the requesting node a response including an identifier of the immediately preceding node in the prepention queue and an indication that the requesting queue is to enter the prepention queue, and the shared line coherency mechanism of the requesting node is responsive to the home node of the line by writing the identification of the immediately preceding node in the prepention queue into the identifier of the line tag corresponding to the line, and writing a state value indicating that the requesting node is to communicate a retry request to the node identified by the identifier.

47. The prepention queue mechanism of claim 46, wherein:

the shared line coherency mechanism of the requesting node is responsive to completion of the request by writing the identification of the home node of the line into the identifier of the line tag corresponding to the line, and writing a state value representing the current state of the line in the requesting node into the state value of the line tag corresponding to the line.

48. The shared line coherency mechanism of claim 40, wherein the line tag associated with a line resident in the node may further include:

a state value representing that the node is in a prepention queue of pending requests with respect to the line and is to direct retry requests to an immediately preceding node in the prepention queue, and an identifier of the immediately preceding node in the prepention queue.

\* \* \* \* \*